(12) United States Patent
Kim et al.

(10) Patent No.: US 12,519,571 B2
(45) Date of Patent: Jan. 6, 2026

(54) COMMUNICATION METHOD AND APPARATUS USING MULTIPLE PANELS

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Daejeon (KR); Sung Hyun Moon, Daejeon (KR); Jung Hoon Lee, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 714 days.

(21) Appl. No.: 17/873,564

(22) Filed: Jul. 26, 2022

(65) Prior Publication Data
US 2023/0042048 A1 Feb. 9, 2023

(30) Foreign Application Priority Data

| | | |
|---|---|---|
| Jul. 27, 2021 | (KR) | 10-2021-0098736 |
| Aug. 27, 2021 | (KR) | 10-2021-0114114 |
| Oct. 1, 2021 | (KR) | 10-2021-0131204 |
| Oct. 29, 2021 | (KR) | 10-2021-0147303 |
| Jan. 11, 2022 | (KR) | 10-2022-0004350 |
| Feb. 4, 2022 | (KR) | 10-2022-0014920 |
| Feb. 14, 2022 | (KR) | 10-2022-0019158 |
| Apr. 25, 2022 | (KR) | 10-2022-0050947 |

(Continued)

(51) Int. Cl.
*H04L 1/1812* (2023.01)
*H04L 1/08* (2006.01)
*H04L 1/1829* (2023.01)
*H04W 72/1268* (2023.01)

(52) U.S. Cl.
CPC ............ *H04L 1/1812* (2013.01); *H04L 1/08* (2013.01); *H04L 1/1854* (2013.01); *H04W 72/1268* (2013.01)

(58) Field of Classification Search
CPC ....... H04L 1/1812; H04L 1/08; H04L 1/1854; H04W 72/1268
See application file for complete search history.

(56) References Cited

U.S. PATENT DOCUMENTS

| | | |
|---|---|---|
| 11,038,559 B2 | 6/2021 | Kim et al. |
| 2020/0178239 A1* | 6/2020 | Yi .................. H04L 5/0055 |
| 2020/0229008 A1 | 7/2020 | Islam et al. |

(Continued)

OTHER PUBLICATIONS

Apple Inc. "Views on URLLC HARQ Feedback enhancements", 3GPP TSG RAN WG1 Meeting #105-e, e-Meeting, May 10-27, 2021, R1-2105097 (Year: 2021).*

(Continued)

*Primary Examiner* — Joseph A Bednash
(74) *Attorney, Agent, or Firm* — Rabin & Berdo, P.C.

(57) ABSTRACT

A method of a terminal may comprise: receiving, from a base station, DCI including a first field indicating HARQ-ACK retransmission and a second field indicating a priority; identifying first HARQ-ACK information having a priority identical to the priority indicated by the second field; and transmitting, to the base station, a first HARQ-ACK codebook including the first HARQ-ACK information based on the indication of the first field.

20 Claims, 21 Drawing Sheets

(30) Foreign Application Priority Data

Jun. 23, 2022 (KR) .......................... 10-2022-0076713
Jul. 21, 2022 (KR) .......................... 10-2022-0090437

(56) References Cited

U.S. PATENT DOCUMENTS

| | | |
|---|---|---|
| 2020/0288359 A1 | 9/2020 | Kim |
| 2021/0014931 A1 | 1/2021 | Noh et al. |
| 2021/0105725 A1 | 4/2021 | Karjalainen et al. |
| 2021/0235433 A1 | 7/2021 | Onggosanusi et al. |
| 2021/0243779 A1 | 8/2021 | Takeda et al. |
| 2021/0258894 A1 | 8/2021 | Yao et al. |
| 2022/0167274 A1 | 5/2022 | Wang |

OTHER PUBLICATIONS

Qualcomm Incorporated, "HARQ-ACK enhancement for IOT and URLCC", 3GPp TSG RAN WG1 #106-3, e-meeting, Aug. 16- 27, 2021, R1-2107336 (Year: 2021).*
MediaTek Inc., "On UE feedback enhancements for HARQ-ACK", 3GPP TSG RAN WG1 Meeting #106-3, e-Meeting, Aug. 16-27, 2021, R1-2107491 (Year: 2021).*
Moderator (Nokia, "Final moderator summary on HARQ-ACK feedback enhancements for NR Rel-17 URLCC/IIoT", 3GPP TSG-RAN WG1 Meeting #105-e, e-meeting, May 19-27, 2021, R1-2106249 (Year: 2021).*
Moderator (Nokia), "Moderator summary #2 on HARQ-ACK feedback enhancements for NR Rel-17 URLLC/IIoT", 3GPP TSG-RAN WG1 Meeting #106-e, e meeting, Aug. 16-27, 2021, R1-2108440 (Year: 2021).*

* cited by examiner starting position of information for TRP(s) including TRP i and TRP j

COMMUNICATION METHOD AND APPARATUS USING MULTIPLE PANELS

CROSS-REFERENCE TO RELATED APPLICATIONS

This application claims priority to Korean Patent Applications No. 10-2021-0098736 filed on Jul. 27, 2021, No. 10-2021-0114114 filed on Aug. 27, 2021, No. 10-2021-0131204 filed on Oct. 1, 2021, No. 10-2021-0147303 filed on Oct. 29, 2021, No. 10-2022-0004350 filed on Jan. 11, 2022, No. 10-2022-0014920 filed on Feb. 4, 2022, No. 10-2022-0019158 filed on Feb. 14, 2022, No. 10-2022-0050947 filed on Apr. 25, 2022, No. 10-2022-0076713 filed on Jun. 23, 2022, and No. 10-2022-0090437 filed on Jul. 21, 2022 with the Korean Intellectual Property Office (KIPO), the entire contents of which are hereby incorporated by reference.

BACKGROUND

1. Technical Field

The present disclosure relates to a communication technique using multiple panels, and more particularly, to a technique using multiple panels in a communication system including one or more transmission reception points (TRPs).

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, a plurality of transmission reception points (TRPs) may be introduced into the communication system. In this case, a terminal may be connected to a plurality of TRPs, and may perform communication with the plurality of TRPs. The plurality of TRPs may provide communication services to the terminal based on various communication schemes. For coherent communication in the communication system including the plurality of TRPs, a method for synchronizing the plurality of TRPs and/or a method for sharing a channel state information (CSI) report may be required.

SUMMARY

Accordingly, exemplary embodiments of the present disclosure are directed to providing a communication method and a communication apparatus using multiple panels in a communication system including one or more TRPs.

According to a first exemplary embodiment of the present disclosure, a method of a terminal may comprise: receiving, from a base station, downlink control information (DCI) including a first field indicating hybrid automatic repeat request-acknowledgement (HARQ-ACK) retransmission and a second field indicating a priority; identifying first HARQ-ACK information having a priority identical to the priority indicated by the second field; and transmitting, to the base station, a first HARQ-ACK codebook including the first HARQ-ACK information based on the indication of the first field.

The method may further comprise identifying second HARQ-ACK information having a priority identical to the priority indicated by the second field, wherein a second HARQ-ACK codebook including the second HARQ-ACK information may be transmitted to the base station together with the first HARQ-ACK codebook.

The first HARQ-ACK codebook may be a retransmission HARQ-ACK codebook, the second HARQ-ACK codebook may be an initial transmission codebook, and the second HARQ-ACK codebook may be arranged before the first HARQ-ACK codebook within a HARQ-ACK bitstream.

The method may further comprise: identifying second HARQ-ACK information having a priority identical to the priority indicated by the second field; and identifying third HARQ-ACK information having a priority identical to the priority indicated by the second field, wherein a second HARQ-ACK codebook including the second HARQ-ACK information and a third HARQ-ACK codebook including the third HARQ-ACK information may be transmitted to the base station together with the first HARQ-ACK codebook.

The first HARQ-ACK codebook may be a retransmission HARQ-ACK codebook, the second HARQ-ACK codebook may be an initial transmission codebook, the third HARQ-ACK codebook may be a deferred semi-persistent scheduling (SPS) HARQ-ACK codebook, the second HARQ-ACK codebook may be arranged first within a HARQ-ACK bit stream, the third HARQ-ACK codebook may be arranged after the second HARQ-ACK codebook within the HARQ-ACK bitstream, and the first HARQ-ACK codebook may be arranged after the third HARQ-ACK codebook within the HARQ-ACK bitstream.

A cell in which the first HARQ-ACK codebook is transmitted may be determined based on a format of the DCI.

When the DCI is fallback DCI, the first HARQ-ACK codebook may be transmitted in a PCell.

The method may further comprise receiving, from the base station, configuration information of a physical uplink control channel (PUCCH) serving cell, wherein when the DCI is non-fallback DCI, the first HARQ-ACK codebook may be transmitted in the PUCCH serving cell according to the configuration information.

The method may further comprise receiving, from the base station, configuration information of a PUCCH serving cell, wherein when the DCI is non-fallback DCI and the DCI includes a third field indicating a cell in which PUCCH transmission is performed, the first HARQ-ACK codebook may be transmitted in a PCell or the PUCCH serving cell based on a value of the third field.

The DCI may be non-scheduling DCI.

According to a second exemplary embodiment of the present disclosure, a method of a base station may comprise: generating downlink control information (DCI) including a first field indicating whether to perform hybrid automatic repeat request-acknowledgement (HARQ-ACK) retransmission and a second field indicating a priority; transmitting the DCI to a terminal; and in response to that the first field indicates the HARQ-ACK retransmission, receiving, from the base station, a first HARQ-ACK codebook including first HARQ-ACK information having a priority identical to the priority indicated by the second field.

A second HARQ-ACK codebook including second HARQ-ACK information having a priority identical to the priority indicated by the second field may be received from the terminal together with the first HARQ-ACK codebook, the first HARQ-ACK codebook may be a retransmission HARQ-ACK codebook, the second HARQ-ACK codebook may be an initial transmission codebook, and the second HARQ-ACK codebook may be arranged before the first HARQ-ACK codebook within a HARQ-ACK bitstream.

A second HARQ-ACK codebook including second HARQ-ACK information having a priority identical to the priority indicated by the second field and a third HARQ-ACK codebook including third HARQ-ACK information having a priority identical to the priority indicated by the second field may be received from the terminal together with the first HARQ-ACK codebook, the first HARQ-ACK codebook may be a retransmission HARQ-ACK codebook, the second HARQ-ACK codebook may be an initial transmission codebook, the third HARQ-ACK codebook may be a deferred semi-persistent scheduling (SPS) HARQ-ACK codebook, the second HARQ-ACK codebook may be arranged first within a HARQ-ACK bit stream, the third HARQ-ACK codebook may be arranged after the second HARQ-ACK codebook within the HARQ-ACK bitstream, and the first HARQ-ACK codebook may be arranged after the third HARQ-ACK codebook within the HARQ-ACK bitstream.

A cell in which the first HARQ-ACK codebook is received may be determined based on a format of the DCI, the first HARQ-ACK codebook may be received in a PCell when the DCI is fallback DCI, and the first HARQ-ACK codebook may be received in the PCell or a physical uplink control channel (PUCCH) serving cell when the DCI is non-fallback DCI.

The method may further comprise transmitting configuration information of a PUCCH serving cell to the terminal, wherein the PUCCH serving cell may be used for transmission and reception of the first HARQ-ACK codebook.

According to a third exemplary embodiment of the present disclosure, a terminal may comprise: a processor; a memory electronically communicating with the processor; and instructions stored in the memory, wherein when executed by the processor, the instructions cause the terminal to: receive, from a base station, downlink control information (DCI) including a first field indicating hybrid automatic repeat request-acknowledgement (HARQ-ACK) retransmission and a second field indicating a priority; identify first HARQ-ACK information having a priority identical to the priority indicated by the second field; and transmit, to the base station, a first HARQ-ACK codebook including the first HARQ-ACK information based on the indication of the first field.

The instructions may further cause the terminal to identify second HARQ-ACK information having a priority identical to the priority indicated by the second field, wherein a second HARQ-ACK codebook including the second HARQ-ACK information may be transmitted to the base station together with the first HARQ-ACK codebook, the first HARQ-ACK codebook may be a retransmission HARQ-ACK codebook, the second HARQ-ACK codebook may be an initial transmission codebook, and the second HARQ-ACK codebook may be arranged before the first HARQ-ACK codebook within a HARQ-ACK bitstream.

The instructions may further cause the terminal to: identify second HARQ-ACK information having a priority identical to the priority indicated by the second field; and identify third HARQ-ACK information having a priority identical to the priority indicated by the second field, wherein a second HARQ-ACK codebook including the second HARQ-ACK information and a third HARQ-ACK codebook including the third HARQ-ACK information may be transmitted to the base station together with the first HARQ-ACK codebook, the first HARQ-ACK codebook may be a retransmission HARQ-ACK codebook, the second HARQ-ACK codebook may be an initial transmission codebook, the third HARQ-ACK codebook may be a deferred semi-persistent scheduling (SPS) HARQ-ACK codebook, the second HARQ-ACK codebook may be arranged first within a HARQ-ACK bit stream, the third HARQ-ACK codebook may be arranged after the second HARQ-ACK codebook within the HARQ-ACK bitstream, and the first HARQ-ACK codebook may be arranged after the third HARQ-ACK codebook within the HARQ-ACK bitstream.

A cell in which the first HARQ-ACK codebook is transmitted may be determined based on a format of the DCI, the first HARQ-ACK codebook may be transmitted in a PCell when the DCI is fallback DCI, and the first HARQ-ACK codebook may be transmitted in the PCell or a physical uplink control channel (PUCCH) serving cell when the DCI is non-fallback DCI.

The instructions may further cause the terminal to receive, from the base station, configuration information of a PUCCH serving cell, wherein the PUCCH serving cell may be used for transmission and reception of the first HARQ-ACK codebook.

According to the present disclosure, a base station may transmit DCI including a field indicating hybrid automatic repeat request-acknowledgement (HARQ-ACK) retransmission to a terminal. The terminal may receive the DCI from the base station, and may retransmit a HARQ-ACK codebook to the base station based on a field included in the DCI. In this case, the terminal may multiplex a plurality of HARQ-ACK codebooks, and may transmit the multiplexed HARQ-ACK codebooks to the base station. The HARQ-ACK codebooks may be arranged within a HARQ-ACK bit stream according to a preset order. Accordingly, the performance of the communication system can be improved.

DETAILED DESCRIPTION OF THE EMBODIMENTS

Figure 1:
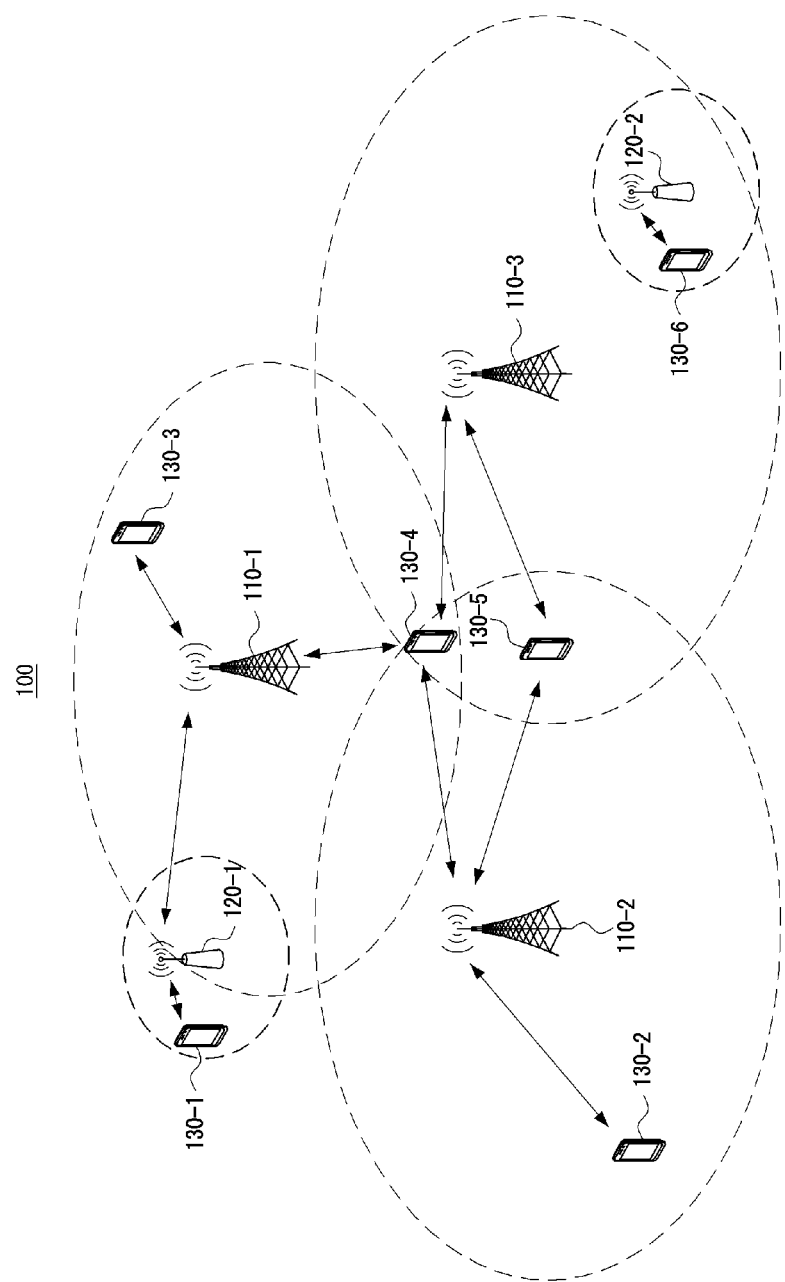
FIG. 1 is a conceptual diagram illustrating a first exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items. In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
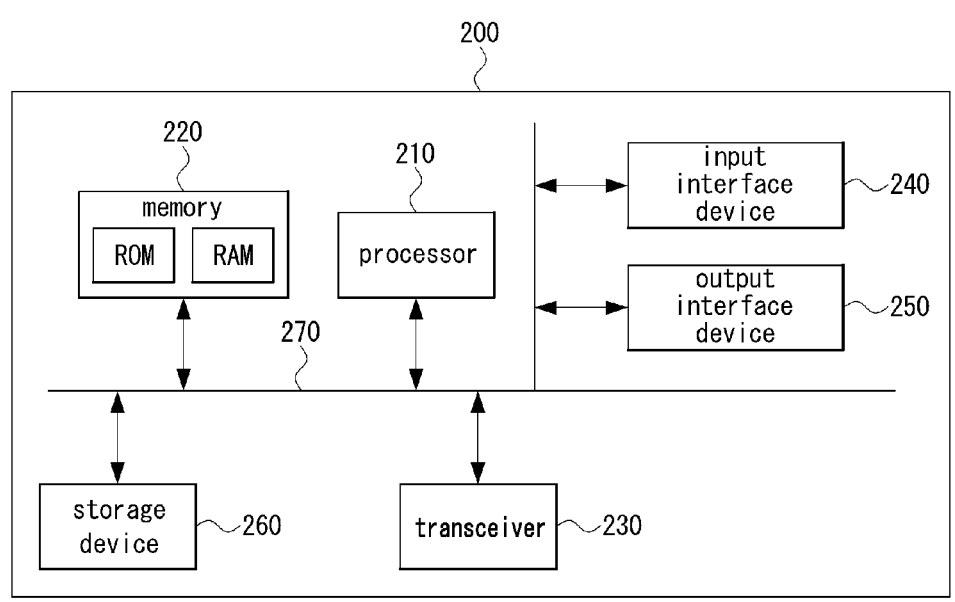
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

A scenario to which communication is applied may be an Enhanced Mobile BroadBand (eMBB) scenario, a massive Machine-Type Communication (mMTC) scenario, an Ultra-Reliable and Low Latency Communication (URLLC) scenario, and/or a Time Sensitive Communication (TSC) scenario. The mMTC scenario, URLLC scenario, and/or TSC scenario may be applied in Internet of Things (IoT) communication. One communication network (e.g., one communication system) may support all of the above-mentioned scenarios or some of the above-mentioned scenarios. In a communication network supporting the mMTC scenario, IMT-2020 requirements can be satisfied using narrowband (NB)-IoT and LTE-MTC technologies. A lot of discussions may be needed for a communication system supporting the URLLC scenario to satisfy the requirements.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic, a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or a DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG).

In order to support URLLC traffic, it may be preferable for the terminal to perform frequent reception operations in downlink (DL) resources and/or frequent transmission operations in uplink (UL) resources. In a time division duplex (TDD) system, the terminal may operate based on a half-duplex scheme. Accordingly, a time of supporting DL traffic and/or UL traffic may increase according to a slot pattern. On the other hand, in a frequency division duplex (FDD) system, the terminal may utilize DL resources and UL resources at the same time. Accordingly, the above-described problem in the TDD system may not occur in the FDD system. The FDD system may use two or more carriers. When two or more serving cells are configured to the terminal in the TDD system, the terminal may utilize DL resources and UL resources.

In a communication system including at least one carrier to which the FDD is applied (hereinafter, referred to as 'FDD carrier'), there may be no problem with respect to a latency of the terminal. In a communication system including only carrier(s) to which the TDD is applied (hereinafter, referred to as 'TDD carrier(s)'), there may be a problem with respect to a latency of the terminal. In order to solve the above problem, slots in the TDD carriers may be configured according to different patterns.

Carrier aggregation (CA) may be configured in the terminal, and a PCell and SCell(s) may be activated. Depending on whether a common search space (CSS) set is included, a cell may be classified into a PCell or an SCell. For example, the PCell may include a CSS set, and the SCell may not include a CSS set. In order to reduce a latency in a communication system supporting URLLC traffic, slots having different patterns may be configured and/or indicated to the terminal.

Since a latency occurs when the URLLC traffic is repeatedly transmitted, it may not be appropriate to repeatedly transmit the URLLC traffic. However, when a sufficiently low MCS is used, a latency for decoding the URLLC traffic may be reduced. That is, when a sufficiently low MCS is used, the number of resource elements (REs) to which the URLLC traffic is mapped may increase, and the base station (e.g., a decoder of the base station) should wait until all the REs are received. In this case, the latency for decoding the URLLC traffic may be reduced.

However, when a PUSCH to which a rather high MCS is applied is repeatedly transmitted, the base station may perform the decoding only with some REs. Therefore, a timing at which decoding is successful in the repeated PUSCH transmission (e.g., repeated transmission of the PUSCH to which a somewhat high MCS is applied) may be earlier than a timing at which decoding is successful in the non-repeated PUSCH transmission (e.g., transmission of the PUSCH to which a low MCS is applied). When the PUSCH repetition type A is used, an unnecessary latency may occur, and a PUSCH repetition type B may be introduced to reduce the latency due to the repeated transmission. When the PUSCH repetition type B is used, a PUSCH allocated on a mini-slot basis may be repeatedly transmitted. When the PUSCH repetition type B is used, a time resource may be configured by an RRC message and/or DCI. A combination of a reference time resource of a PUSCH instance and the number of repeated transmissions may be indicated by the DCI (e.g., in case of Type 2 CG and/or dynamic grant) or the RRC message (e.g., in case of Type 1 CG).

In order to control a transmission power of a sounding reference signal (SRS) resource indicated by an SRS resource indicator (SRI), the base station may estimate a path loss for each SRS resource. The base station may control a transmission power of SRS resource(s) by using DCI. The transmission power of the SRS resource(s) may be controlled based on the estimated path loss. The DCI may be scheduling DCI (e.g., DCI format 0_0, DCI format 0_1, DCI format 0_2, DCI format 1_0, DCI format 1_1, or DCI format 1_2) or group-common (GC)-DCI (e.g., DCI format 2_2 or DCI format 2_3). The DCI may include a field indicating a transmit power control (TPC) command, and the TPC command may be used to control a transmission power of the terminal. For example, the transmission power of the terminal may be increased or decreased based on the TPC command included in the DCI. In order to determine a transmission power of a PUSCH, the terminal may consider a value obtained based on a path loss, a value according to the TPC command included in the DCI, and/or a PUSCH bandwidth indicated by the DCI.

The base station may configure two or more sets to the terminal using higher layer signaling. The terminal may receive configuration information of the two or more sets from the base station. Element(s) constituting each of the two or more sets may be transmission power parameter(s), and may be indicated to be suitable for different scenarios (e.g., URLLC scenario, eMBB scenario). The terminal may receive scheduling DCI or activating DCI for allocating a PUSCH resource from the base station, and the scheduling DCI or the activating DCI may indicate a set for interpreting transmission power parameter(s). When a set of transmission power parameter(s) is different, a magnitude of increasing or decreasing the transmission power indicated by the same TPC command may be different.

When Type 1 CG or Type 2 CG is used, a transmission power may be determined based on a DCI format 2_3 for an SRI associated with a PUSCH instance. When Type 2 CG is used, activating DCI may indicate a set of transmission power parameter(s) applied to a PUSCH occasion. The PUSCH occasion may mean a PUSCH instance. The terminal may obtain a TPC command for an SRI by receiving GC-DCI, and may interpret the TPC command to be suitable to the set of transmission power parameter(s) indicated by the base station, and may derive a transmission power to be applied to the PUSCH instance based on a result of the interpretation.

In transmitting a dynamically-scheduled PUSCH, the terminal may derive a transmission power applied to a PUSCH instance based on a combination of GC-DCI and scheduling DCI. By receiving the GC-DCI, the terminal may identify a TCP command of an SRI and store the identified TCP command. In transmitting a dynamically-scheduled PUSCH, a set of transmission power parameter(s) and/or a TPC command applied to a PUSCH occasion may be indicated by scheduling DCI. The terminal may derive a transmission power to be applied to a PUSCH instance based on a transmission power of an SRI associated with the PUSCH instance.

Repeated HARQ-ACK transmission may be indicated (or configured) by higher layer signaling for each physical uplink control channel (PUCCH) format. The number of repeated transmissions for a PUCCH format i may be independently configured. i may be 1, 3, or 4. The terminal may repeatedly transmit a PUCCH format through slots. In this case, the PUCCH format may be transmitted using the same time resource in the respective slots.

The type of uplink control information (UCI) may be classified according to a type of information included in the UCI. The UCI may include at least one of a scheduling request (SR), L1-reference signal received power (L1-RSRP), HARQ-ACK, channel state information (CSI), or combinations thereof. In exemplary embodiments, UCI and UCI type may be used with the same meaning. In a repeated transmission operation of UCI, only one UCI type may be transmitted. In order to support this operation, a priority of each UCI type may be defined in the technical specification. One UCI type may be selected, and a PUCCH including the one UCI type may be repeatedly transmitted. In this case, the terminal may assume that no other UCI type is transmitted before the transmission of the corresponding UCI type is completed. In order to support this operation, the base station may instruct the terminal to transmit UCI (e.g., SR or HARQ-ACK) after transmission of the corresponding PUCCH is completed. A waiting time for the UCI transmission may be large, and the waiting time may act as a constraint on scheduling of the base station.

When it is indicated to transmit HARQ-ACKs in the same slot (or the same subslot) or when PUCCH time resources indicated by DCI(s) and/or RRC message(s) for allocating physical downlink shared channel(s) (PDSCH(s)) overlap each other, the terminal may generate a HARQ codebook so as to be transmitted on one PUCCH (e.g., one PUCCH time resource). In the HARQ codebook, HARQ-ACK bits may be arranged according to an order defined in the technical specification. Information bits may be generated by the above-described operation. The terminal may generate coded bits by performing an encoding operation thereon.

In the encoding operation, a Reed-Muller code or a polar code may be used. A code rate applied in the encoding operation may be indicated by higher layer signaling. For example, one value in the PUCCH format may be the code rate and may be indicated to the terminal.

One codeword may be mapped to one PUCCH. In a repeated PUCCH transmission operation, one UCI type may be generated as a codeword. When a PUCCH is transmitted once, information bits of one UCI type or two or more UCI types may be concatenated, and the terminal may generate one codeword by performing the same encoding operation on the information bits. When a Reed-Müller code or a polar code is used, it may be difficult to implement a soft combining operation. Accordingly, even when the PUCCH is repeatedly transmitted, the same codewords may be transmitted, and the base station may perform a chase combining operation on the same codewords. The coded bit or codeword may mean a bit stream in which a plurality of code blocks are concatenated. A modulation operation may be performed on the codeword, and a result of the modulation operation may be mapped to resource elements (REs).

Meanwhile, the same UCI types may be regarded as different information. The same UCI types considered as different information may be mapped. For example, UCIs may be generated to support traffic having different priorities. A UCI (e.g., SR or HARQ-ACK) supporting eMBB traffic may be regarded as information different from a UCI (e.g., SR or HARQ-ACK) supporting URLLC traffic. In this case, even when the UCI types are the same, they may be distinguished as different information.

The coded UCI may be mapped to a PUCCH. In a PUCCH transmission operation, the same preprocessing scheme (e.g., spatial information, spatial relation) may be maintained. Alternatively, in the PUCCH transmission operation, use of a different preprocessing scheme for each PUCCH may be allowed by RRC signaling of the base station.

In exemplary embodiments, two or more terminals may receive data from one or more TRPs, and may transmit data to one or more TRPs. It may be assumed that one base station or one server performs a management operation and/or a scheduling operation for one or more TRPs among a plurality of TRPs. The TRPs may be directly connected with each other. Alternatively, the TRPs may be connected through the base station. The above-described connections may be connections according to Xn interfaces or wireless interfaces (e.g., interfaces of the 3GPP NR).

A shadow area may occur between areas supported by the TRPs. Therefore, the TRPs may resolve the shadow area through cooperative transmissions. The cooperative transmissions may be performed for a terminal located between the TRPs. Even when a shadow area does not occur, a quality of radio links may be improved by installing many TRPs (or base stations) to transmit and receive a lot of data.

According to a cooperative transmission and a cooperative reception of the TRPs, a communication scheme may be classified into dynamic point selection (DPS) and joint transmission (JT). For a specific physical resource block (PRB) set, the DPS may be a scheme of receiving data through one TRP, and the JT may be a scheme of receiving data through two or more TRPs. A dynamic point blanking (DPB) scheme may be a type of the JT. When the DPB is used, the terminal may not receive data from some TRPs and may receive data from the remaining TRPs. The JT may be classified into coherent JP and noncoherent JP. Depending on whether a coherent combining operation is performed on signals received from TRPs, the coherent JP or the non-coherent JP may be used.

When synchronization between TRPs is acquired and a CSI report is shared between the TRPs, a performance gain may occur by a coherent combining operation performed in the terminal. When the above-described condition(s) is not satisfied, it may be advantageous in terms of performance that a non-coherent combining operation is performed in the terminal.

When the terminal is mounted on a vehicle, restrictions on the size and/or weight of the terminal may be small. For a terminal directly used by a person, portability may be considered.

Chapter 1 UL Transmission Method Considering Multiple Panels 1.1 Multi-Panel Support The terminal may communicate with one or more TRPs. The terminal may communicate with one TRP in order to transmit and receive eMBB traffic. The terminal may communicate with two or more TRPs in order to transmit and receive URLLC traffic. Each of the above-described TRPs may support one or more traffic types. For example, the TRP may support eMBB traffic, URLLC traffic, or both eMBB and URLLC traffic. The terminal may support the same type of traffic (e.g., eMBB traffic or URLLC traffic) or different types of traffic (e.g., eMBB traffic and URLLC traffic) according to a configuration indicated by scheduling DCI and/or RRC signaling. The same type of traffic may be eMBB traffic or URLLC traffic. The same type of traffics may have different quality of service (QoS). For example, traffic derived from XR services may be classified into traffic having I-frame(s) and traffic having P-frame(s), and the traffic having I-frame(s) and the traffic having P-frame(s) may have different QoS. The traffic having different QoS may be mapped to different data radio bearers (DRBs). The base station and/or the terminal may support the above-described operation.

Figure 3:
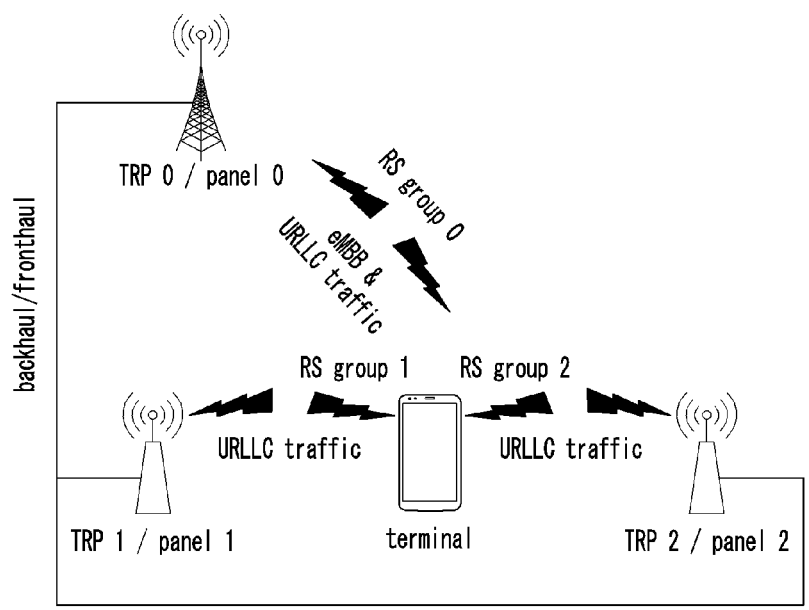
FIG. 3 is a conceptual diagram illustrating a first exemplary embodiment of a method of supporting eMBB traffic and/or URLLC traffic in a communication system including a plurality of TRPs.

FIG. 3 is a conceptual diagram illustrating a first exemplary embodiment of a method of supporting eMBB traffic and/or URLLC traffic in a communication system including a plurality of TRPs.

Referring to FIG. 3, the terminal may communicate with three TRPs. The three TRPs may be connected to one or more base stations. The terminal may have one or more panels (e.g., antenna panels, Tx panels, Rx panels). The eMBB traffic may be transmitted/received in a low frequency band (e.g., FR1), and the URLLC traffic may be transmitted/received in a high frequency band (e.g., FR2) as well as the low frequency band (e.g., FR1). Because a wide bandwidth is required to support the URLLC traffic, the URLLC traffic may not be supported in the FR1 depending on a frequency distribution. Since the FR2 has a wide bandwidth, the URLLC traffic may be supported in the FR2 when a channel state of the TRP is good. Because a blockage occurs frequently in the FR2, it may be preferable to use multiple TRPs. For example, three TRPs may support the URLLC traffic.

The terminal may have a plurality of Tx panels and a plurality of Rx panels. The number of panels (e.g., Tx panels and/or Rx panels) used by the terminal may be indicated or configured by explicit signaling or implicit signaling. For example, scheduling information (e.g., DCI) may indicate to the terminal an index of an Rx beam for PDSCH reception. Scheduling information (e.g., DCI) may indicate to the terminal an index of a Tx beam for PUSCH transmission. The terminal may use a plurality of panels to generate Rx beam(s) or Tx beam(s). In exemplary embodiments, the panel may mean an Rx panel, a Tx panel, and/or an antenna panel.

The base station may transmit to the terminal scheduling information indicating to perform a transmission operation simultaneously using a plurality of Tx beams (e.g., frequency division multiplexing (FDM)-based transmission operation or spatial division multiplexing (SDM)-based transmission operation). The base station may transmit to the terminal scheduling information indicating to perform a reception operation simultaneously using a plurality of Rx beams (e.g., FDM-based reception operation or SDM-based reception operation). The number of beams simultaneously used in the transmission operation or reception operation may correspond to the minimum number of panels simultaneously used by the terminal. The reason is that when the terminal forms a beam, one beam is usually generated by each panel. When two or more beams are generated by one panel, the number of beams simultaneously used in the transmission operation or reception operation may not correspond to the number of panels.

Method 1.1-1: The terminal may report to the base station capability information including information indicating the maximum number of Tx beams and/or the maximum number of Rx beams that can be simultaneously processed (e.g., available at the same time).

Each of the maximum number of Tx beams and the maximum number of Rx beams may be expressed as an independent parameter, and the parameters may be included in RRC signaling. A combination of the maximum number of Tx beams and the maximum number of Rx beams may be expressed as one parameter, and the parameter may be included in RRC signaling.

A reference signal may be transmitted/received through a beam (e.g., Tx beam and/or Rx beam) and/or a panel (e.g., Tx panel and/or Rx panel). In exemplary embodiments, an operation related to a Tx beam may be interpreted as an operation related to a Tx panel, and an operation related to the Tx panel may be interpreted as an operation related to the Tx beam. In exemplary embodiments, an operation related to an Rx beam may be interpreted as an operation related to an Rx panel, and an operation related to the Rx panel may be interpreted as an operation related to the Rx beam. Reference signals related to a common beam may be interpreted as belonging to the same reference signal (RS) group. The RS groups may be distinguished by different antenna ports.

Figure 4:
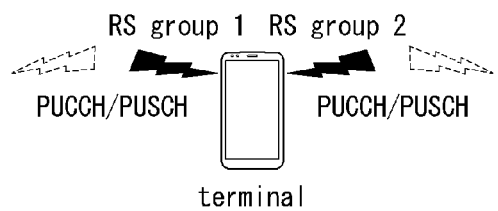
FIG. 4 is a conceptual diagram illustrating a first exemplary embodiment of a UL communication method using Tx beams (or Tx panels).

FIG. 4 is a conceptual diagram illustrating a first exemplary embodiment of a UL communication method using Tx beams (or Tx panels).

Referring to FIG. 4, the terminal may perform UL communications using two Tx beams. A PUCCH, PUSCH, and/or RS group may be transmitted through each Tx beam of the terminal. The RS group may be indicated or configured to the terminal. Alternatively, the terminal may implicitly derive the RS group.

Figure 5:
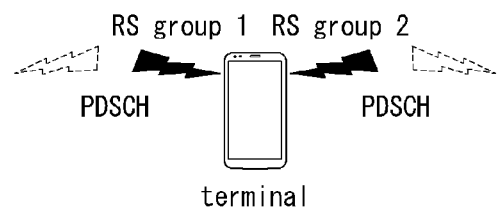
FIG. 5 is a conceptual diagram illustrating a first exemplary embodiment of a DL communication method using Rx beams (or Rx panels).

FIG. 5 is a conceptual diagram illustrating a first exemplary embodiment of a DL communication method using Rx beams (or Rx panels).

Referring to FIG. 5, the terminal may perform DL communications using two Rx beams. A PDCCH, PDSCH, and/or RS group may be received through each Rx beam of the terminal. The RS group may be indicated or configured to the terminal. Alternatively, the terminal may implicitly derive the RS group.

An RS group may be expressed by an RS index (e.g., RS resource index, synchronization signal block (SSB) index, CSI-RS ID, CSI-RS resource ID, etc.) belonging to the RS group. RS configuration information may include an RS group ID (e.g., RS group index). In exemplary embodiments, an RS index may have meaning including an RS resource index, and a CSI-RS ID may have meaning including a CSI-RS resource ID.

When another RS index (e.g., RS resource index, SSB index, CSI-RS ID, CSI-RS resource ID, etc.) that provides qcl-Type1, qcl-Type2, 'qcl-Type1 and qcl-Type2', or spatial relation information is indicated or configured, the terminal may identify an SSB index referenced by an RS. The SSB indexes may belong to different groups (e.g., different RS groups). The SSB index may be considered as one group (e.g., RS group). The SSB indexes may be managed by a separate ID.

In a DL beam management procedure, the base station may manage a transmission configuration indication (TCI) state of an RS as a valid value using a MAC control element (CE). When an RS group for one RS is indicated or configured, the RS group may be updated by MAC signaling.

Method 1.1-2: When an RS group to which an RS belongs is configured, an RS group ID (e.g., RS group index) may be changed using a MAC CE.

In order to transmit one beam, the terminal may use two or more Tx panels. In this case, an RS group to which an RS used for deriving one beam belongs may correspond to two or more Tx panels.

Method 1.1-3: The terminal may consider that the same beam is applied to RS(s) belonging to the same RS group.

Different beams may be applied to RSs belonging to different RS groups. In this case, when the RSs belonging to different RS groups are simultaneously transmitted or received, the terminal may consider that interference between the RSs is insignificant.

The terminal may consider RSs that do not belong to the same RS group as different antenna ports.

1.2 Power Control and Reporting

In a UL communication procedure, the terminal may receive transmission power configuration information from the base station. The terminal may identify a transmission power based on a value of a transmission power control (TPC) field included in scheduling DCI. As another method, the terminal may identify a transmission power based on a block at a specific position in group-common DCI. The terminal may report a power headroom to the base station. The power headroom may be 'maximum power—used power (e.g., actual transmission power)' or 'maximum power—reference format power'. When UL communication is scheduled, the used power may mean an actually-used power. When UL communication is not scheduled, the reference format power may be derived based on the technical specification.

The terminal may use one or more Tx beams (or one or more Tx panels) at the same time. In this case, the terminal may use one or more power amplifiers. When one power amplifier is used, since the terminal should use a common maximum power of the Tx beams, the UL communication procedure may not be performed according to the technical specification.

The Tx beams may have different power control parameters, and different commands may be accumulated. The power control parameters may be divided into parameters (e.g., variables) required for open-loop control and parameters required for closed-loop control. The parameters required for open-loop control may include at least a pathloss and fractional pathloss compensation. The above-described parameters may be independently configured for each Tx beam. That is, the above-described parameters may have independent values. When execution of a power control operation using a sounding reference signal (SRS) is configured to the terminal, the terminal may derive a DL RS and/or SSB index for calculating a pathloss based on an SRI included in scheduling DCI.

The same frequency resource may be scheduled for the Tx beams. In this case, in order to utilize the common maximum power, two Tx beams may be used simultaneously, and one Tx beam among the two Tx beams may be interpreted as having a high priority.

When the terminal uses two Tx beams, the use of the two Tx beams may be indicated by one scheduling information or different scheduling information. One piece of scheduling information may indicate to the terminal the use of one or more Tx beams. When two or more Tx beams are used, UL transmissions may overlap in the time domain.

A Tx beam may be interpreted as a Tx panel. The Tx panel may be configured or indicated to the terminal by explicit signaling or implicit signaling. By configuring an RS group to the terminal by RRC signaling, the Tx panel may be implicitly indicated to the terminal.

When two Tx beams are used simultaneously by one scheduling information (e.g., DCI and/or RRC signaling), a sufficient power may be allocated to one Tx beam, and the remaining power may be allocated to another Tx beam.

As a method for indicating or configuring two Tx beams to the terminal using one scheduling information, a method in which two RS indexes are derived from one index or a method in which RS indexes are directly indicated may be used. In this case, based on a method defined in the technical specification, one RS index may be considered preferentially, and a sufficient power may be allocated to the prioritized RS.

The terminal may simultaneously transmit beams derived from an RS 1 (or RS group to which the RS 1 belongs) and an RS 2 (or RS group to which the RS 2 belongs). When the RSs are derived in the order of 'RS 1→RS 2' based on the scheduling information, a sufficient power may be allocated to the beam corresponding to the RS 1.

Method 1.2-1: When scheduling information indicates two or more RSs to determine Tx beams (or Tx panels) of the terminal, a sufficient power may be allocated to an RS corresponding to an order defined in the technical specification.

One piece of scheduling information may indicate one Tx beam. The terminal may receive two pieces of scheduling information, may identify two Tx beams based on the two pieces of scheduling information, and may transmit the two Tx beams simultaneously. In this case, one RS index may be directly or indirectly derived from one scheduling information. The terminal may allocate a sufficient power to a beam by selecting one scheduling information from among the two pieces of scheduling information.

When the respective scheduling information is received in different PDCCH monitoring occasions (MOs), the terminal may compare the orders of the different PDCCH MOs. The terminal may compare the order of the PDCCH MOs in the frequency domain, and then compare the order of the PDCCH MOs in the time domain.

Method 1.2-2: One scheduling information may indicate use of one Tx beam, and the terminal may receive a plurality of scheduling information. According to the plurality of scheduling information, an operation of simultaneously transmitting a plurality of Tx beams may be indicated. In this case, the terminal may allocate a sufficient power to a Tx beam according to the scheduling information received from the earliest PDCCH MO among the PDCCH MOs in which the plurality of scheduling information has been received.

1.3 Support of Simultaneous UL Transmissions Considering RS Group

The terminal may perform UL transmissions simultaneously. In this case, the size of the transmission power and/or Tx beams available in the terminal may be considered. It may be assumed that the terminal has capability of performing two UL transmissions. If the terminal does not have the capability of performing two UL transmissions, the base station may not perform scheduling for the two UL transmissions. The terminal may multiplex uplink control information (UCI) and data in one UL transmission procedure.

Two or more UL transmissions may overlap in the time domain. In this case, the terminal may determine whether a transmission power is sufficient. Tx beams for two or more UL transmissions may be interpreted as the same.

Figure 6:
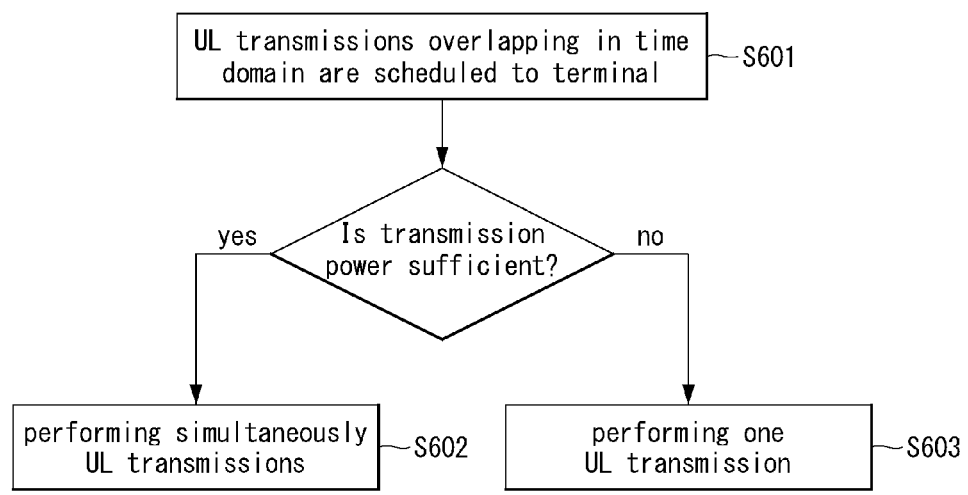
FIG. 6 is a flowchart illustrating a first exemplary embodiment of a method for performing UL transmissions overlapping in the time domain.

FIG. 6 is a flowchart illustrating a first exemplary embodiment of a method for performing UL transmissions overlapping in the time domain.

Referring to FIG. 6, the base station may schedule two or more UL transmissions overlapping in the time domain to the terminal (S601). The terminal may determine whether a transmission power is sufficient for the two or more UL transmissions. If the transmission power of the terminal is sufficient, the terminal may simultaneously perform the two or more UL transmissions (S602). If the transmission power of the terminal is not sufficient, the terminal may perform one UL transmission (S603). In step S603, necessary information may be multiplexed (e.g., piggybacked).

Since Tx beams (or Tx panels) are considered, a procedure for determining whether Tx beams for UL transmissions overlapping in the time domain are the same may be required.

Figure 7:
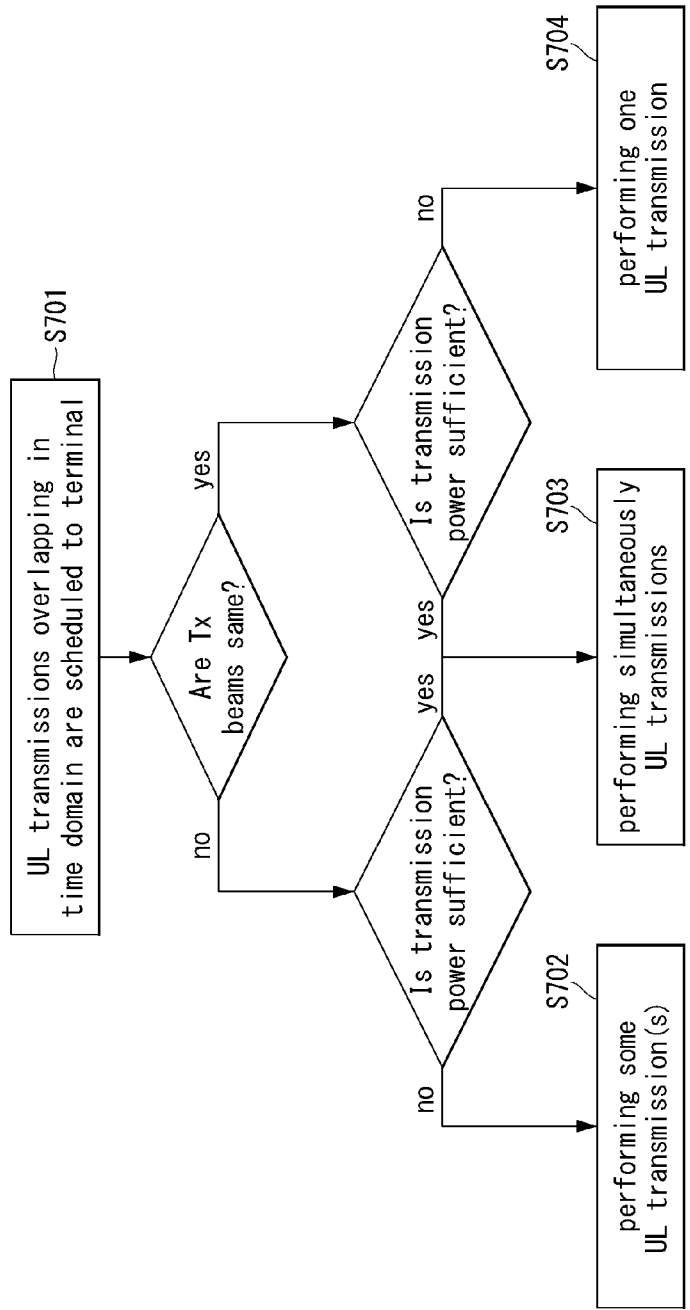
FIG. 7 is a flowchart illustrating a second exemplary embodiment of a method for performing UL transmissions overlapping in the time domain.

FIG. 7 is a flowchart illustrating a second exemplary embodiment of a method for performing UL transmissions overlapping in the time domain.

Referring to FIG. 7, the base station may schedule two or more UL transmissions overlapping in the time domain to the terminal (S701). The terminal may determine whether Tx beams (e.g., RS groups) for the two or more UL transmissions are the same. Thereafter, the terminal may determine whether a transmission power is sufficient for the two or more UL transmissions. If Tx beams for the two or more UL transmissions are different from each other and the transmission power is insufficient, the terminal may perform some UL transmission(s) among the two or more UL transmissions (S702). When Tx beams for the two or more UL transmissions are different and the transmission power is sufficient or when Tx beams for the two or more UL transmissions are the same and the transmission power is sufficient, the terminal may perform the two or more UL transmissions simultaneously (S703). When Tx beams for the two or more UL transmissions are the same and the transmission power is insufficient, the terminal may perform one UL transmission (S704). In step S704, necessary information may be multiplexed (e.g., piggybacked).

When two or more UL transmissions using two or more Tx beams are scheduled to the terminal and a transmission power of the terminal is insufficient, the terminal may select some UL transmission(s) based on priorities, and drop the remaining UL transmission(s). When two or more UL transmissions using the same Tx beam are scheduled to the terminal and a transmission power of the terminal is insufficient, the terminal may perform one UL transmission based on a piggyback scheme.

Figure 8:
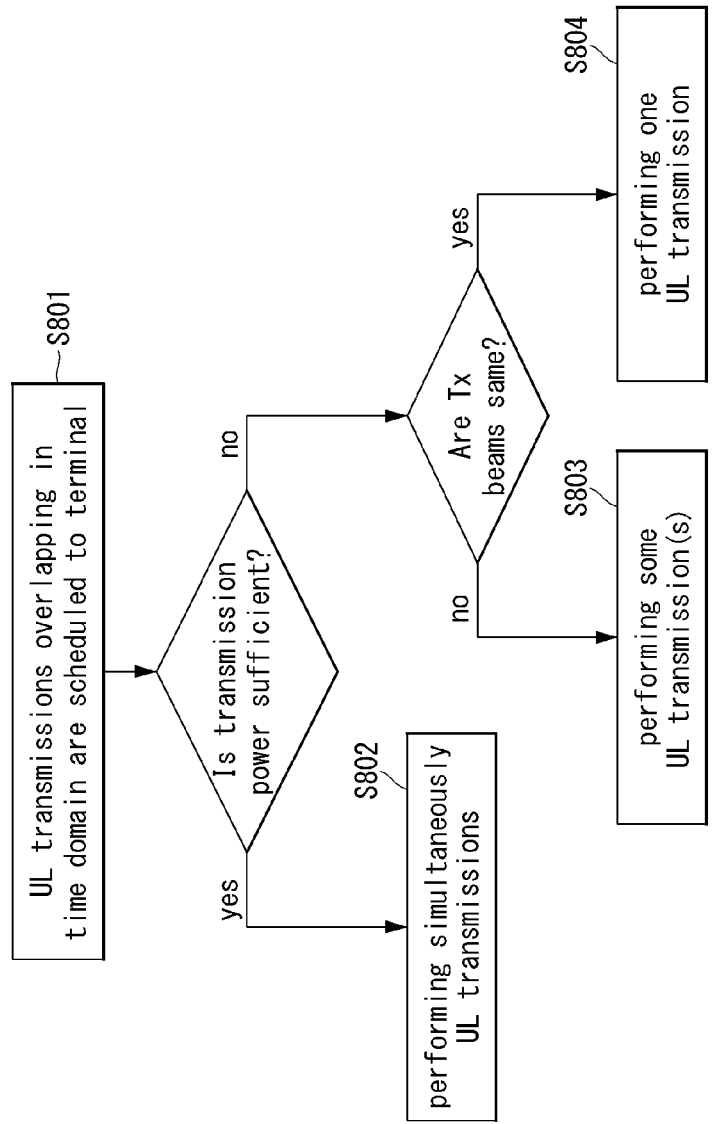
FIG. 8 is a flowchart illustrating a third exemplary embodiment of a method for performing UL transmissions overlapping in the time domain.

FIG. 8 is a flowchart illustrating a third exemplary embodiment of a method for performing UL transmissions overlapping in the time domain.

Referring to FIG. 8, the base station may schedule two or more UL transmissions overlapping in the time domain to the terminal (S801). The terminal may determine whether a transmission power is sufficient for the two or more UL transmissions. If the transmission power of the terminal is sufficient, the terminal may simultaneously perform the two or more UL transmissions (S802). If the transmission power of the terminal is not sufficient, the terminal may determine whether Tx beams (e.g., RS groups) for the two or more UL transmissions are the same. When the Tx beams for the two or more UL transmissions are different from each other, the terminal may perform some UL transmission(s) among the two or more UL transmissions (S803). When the Tx beams for the two or more UL transmissions are the same, the terminal may perform one UL transmission (S804). In step S804, necessary information may be multiplexed (e.g., piggybacked).

1.3.1 Multiplexing of PUCCHs

When UCI types have the same priority index (e.g., the same priority) and PUCCHs related to the UCI types overlap in some symbols, the terminal may multiplex the PUCCHs. When the UCI type is hybrid automatic repeat request (HARQ)-ACK and PUCCH resources do not overlap in units of slots (or subslots), the terminal may multiplex HARQ-ACKs in one HARQ codebook, and transmit the HARQ codebook on a PUCCH (e.g., PUCCH resource). In exemplary embodiments, the HARQ-ACK may mean HARQ-ACK information or a HARQ-ACK bit, and the HARQ codebook may mean a HARQ-ACK codebook.

In the UCI multiplexing procedure, spatial relation information derived from PUCCH resources may not be considered. UCI types having different spatial relation information may be multiplexed in a PUCCH. When the use of a plurality of Tx panels or a plurality of Tx beams is allowed for the terminal, the terminal may simultaneously use one or more Tx beams for PUCCH transmission.

When Tx beams for PUCCHs are the same or similar, UCI types may be multiplexed. When the Tx beams for the PUCCHs are different, UCI types may not be multiplexed. When the UCI types are not multiplexed, the terminal may transmit two or more PUCCHs at the same time.

Method 1.3-1: The terminal may identify whether Tx beams of PUCCHs associated with the respective UCI types are the same. When the Tx beams of the PUCCHs are different from each other, the terminal may not multiplex the UCI types in one PUCCH.

Method 1.3-2: In Method 1.3-1, the terminal may expect that UCI types having the same Tx beam are multiplexed in one PUCCH.

The base station may indicate or configured RSs determined as the same Tx beam to the terminal using RRC signaling. The above-described RSs may include SRS, tracking RS (TRS), CSI-RS, SSB, and/or physical random access channel (PRACH) preamble. In this case, the same Tx beam may be limited to a Tx beam applied to a PRACH preamble last used by the terminal.

Method 1.3-3: The terminal may receive configuration information of an RS group through RRC signaling, and may consider that the same Tx beam (or qcl-Type 1, qcl-Type D) is shared for RSs belonging to the RS group.

When RSs are identified by an RS group, the terminal may apply the same Tx beam to transmit RS(s) belonging to the RS group. When Method 1.3-1 is used, the terminal may identify the RS group to which the spatial relation information belongs for the PUCCH associated with the UCI type.

When the same RS group is derived for different UCI types, the terminal may consider that the same Tx beam is used. When different RS groups are derived for different UCI types, the terminal may consider that different Tx beams are used. In this case, Method 1.3-1 may be applied.

When a link recovery request (LRR)/scheduling request (SR) is considered together with another UCI type, Tx beams therefor may be different. The reason for separately considering LRR/SR is that the terminal may transmit a PUCCH in case of a positive LRR/SR but does not transmit a PUCCH in case of a negative LRR/SR. The above-described operation may be expressed by on/off shift keying. UCI may be expressed using a phase shift keying (PSK) symbol in a PUCCH for another UCI type, and the PUCCH may always be transmitted.

When a periodic CSI, semi-persistent CSI, or configured grant (CG) PUSCH is configured, the PUCCH for LRR/SR may overlap therewith in the time domain. In this case, the LRR/SR may be multiplexed with the CSI or a transport block (TB). When Method 1.3-1 is applied, the LRR/SR may not be multiplexed.

Method 1.3-4: When a Tx beam (or RS group) of a PUCCH associated with LRR/SR is different from a Tx beam associated with another UCI type, the terminal may not multiplex the LRR/SR and the another UCI type.

When the LRR/SR is not multiplexed, the LRR/SR may be considered to have a higher priority than the another UCI type. In this case, a PUCCH corresponding to the LRR/SR may be transmitted, but a PUCCH corresponding to the another UCI type may not be transmitted.

1.3.2 Multiplexing of PUSCH and PUCCH

When a PUCCH and a PUSCH overlap in some symbol(s), UCI may be multiplexed with data in the PUSCH. Alternatively, the PUSCH and the PUCCH may be transmitted simultaneously.

When the UCI is transmitted on the PUSCH, a performance of a power amplifier may be prevented from being degraded because a peak to average power ratio (PAPR) and/or inter-modulation distortion (IMD) can be avoided. Even when the performance of the power amplifier is deteriorated, if a reception performance (e.g., block error rate (BLER)) of the PUSCH and the PUCCH is maintained, the terminal may simultaneously transmit the PUSCH and the PUCCH. Whether the above-described operation is performed may be determined by the base station. The base station may determine whether the operation of simultaneously transmitting the PUSCH and the PUCCH can be performed in the terminal in consideration of capability of the terminal. The base station may generate scheduling information based on a result of the determination and may transmit the scheduling information to the terminal. As another method, the base station may transmit information indicating whether to perform simultaneous transmission of the PUSCH and the PUCCH to the terminal using RRC signaling.

In the UCI multiplexing procedure, spatial relation information may not be considered for scheduling of the PUSCH. PUCCHs having different spatial relation information may be multiplexed in the PUSCH. When the use of a plurality of Tx panels or a plurality of Tx beams is allowed for the terminal, the terminal may simultaneously use one or more Tx beams for transmission of the PUSCH.

When Tx beams for the PUSCH and the PUCCH are the same or similar, UCI (e.g., UCI types) may be multiplexed in the PUSCH. When Tx beams for the PUSCH and the PUCCH are different from each other, UCI (e.g., UCI types) may not be multiplexed in the PUSCH. When the UCI types are not multiplexed, the terminal may transmit two or more PUCCHs at the same time.

When an RS group considered for PUSCH transmission (hereinafter, referred to as 'PUSCH RS group') is the same as an RS group considered for PUCCH transmission (hereinafter referred to as 'PUCCH RS group'), the terminal may consider that Tx beams (or Tx panels) for the PUSCH and the PUCCH are the same or similar.

Method 1.3-5: When the PUSCH RS group and the PUCCH RS group are the same, the terminal may multiplex the UCI and the PUSCH associated with the same RS group, and transmit the multiplexed UCI and PUSCH. When the PUSCH RS group and the PUCCH RS group are different, the terminal may simultaneously transmit the PUSCH and the PUCCH associated with the different RS groups. The UCI may be transmitted on the PUCCH.

The terminal may additionally perform a procedure for determining whether the RS groups are the same. Whether to perform the procedure for determining whether the RS groups are the same may be based on the capability of the terminal. Accordingly, the base station may transmit information indicating whether to perform the procedure for determining whether the RS groups are the same to the terminal.

Method 1.3-6: The base station may inform the terminal of information indicating to perform a procedure for determining whether the PUSCH RS group and the PUCCH RS group are the same by using RRC signaling. The terminal may or may not perform the procedure for determining whether the RS groups are the same based on the information indicated by RRC signaling.

When the procedure for determining whether the PUSCH RS group and the PUCCH RS group are the same is performed by the terminal, the terminal may transmit the PUSCH and the PUCCH at the same time. Accordingly, PDCCH MOs in which scheduling information is transmitted may have an arbitrary order.

When the UCI is multiplexed in the PUSCH, information sufficient to transmit the PUSCH may be included in DCI for allocating the PUSCH. The DCI for allocating the PUCCH may be received by the terminal at an earlier time than the DCI for allocating the PUSCH. Alternatively, the DCI for allocating the PUCCH may be received by the terminal at the same time as the DCI for allocating the PUSCH. Specifically, times of PDCCH MOs in which the DCIs are detected may be compared, and the above-described operation may be applied even when the priority (e.g., priority index) of the PUCCH and the priority of the PUSCH are the same.

Method 1.3-7: Based on PDCCH MOs, when the DCI for allocating the PUCCH is received earlier than the DCI allocating the PUSCH or when the DCI for allocating the PUCCH is received at the same time as the DCI for allocating the PUSCH, the terminal may assume that UCI is transmitted on the PUCCH. The terminal may assume that the PUSCH and the PUCCH have different Tx beams (or different RS groups).

1.3.3 Multiplexing of PUSCHs

The terminal may simultaneously transmit PUSCHs having different Tx beams (or different RS groups) according to the capability. Two or more DCIs for allocating the PUSCHs may indicate the same priority (e.g., priority index) to the terminal. When PUSCHs having different Tx beams have different priorities, the terminal may select a PUSCH having a high priority from among the PUSCHs and may transmit the selected PUSCH. As another method, the terminal may multiplex data units having different priorities in one PUSCH according to an indication of RRC signaling.

Method 1.3-8: When PUSCHs having different priorities have different Tx beams, the terminal may transmit the PUSCHs simultaneously.

It may be assumed that scheduling information for two or more PUSCHs having the same priority and the same Tx beam is not received by the terminal. Situation(s) other than the above-described situation may be acceptable.

Method 1.3-9: When PUSCHs having different priorities have the same Tx beam, the terminal may perform an operation of transmitting one PUSCH with a higher priority or an operation of simultaneously transmitting all PUSCHs according to RRC signaling and/or DCI.

For example, the operation of simultaneously transmitting the PUSCHs may be allowed (e.g., enabled) by RRC signaling, and scheduling DCI may instruct the terminal to perform the simultaneous transmission operation or the priority-based transmission operation. When the simultaneous transmission operation is indicated, the terminal may transmit the PUSCHs simultaneously. When the priority-based transmission operation is indicated, the terminal may transmit one PUSCH having a higher priority.

1.3.4 Multiplexing of Configured Grant (CG) PUSCHs

Two or more CG PUSCHs may be activated or configured to the terminal, and the two or more CG PUSCHs may overlap in the time domain. When the CG PUSCHs have the same priority, the terminal may select a CG PUSCH having a lower CG index, and may transmit the selected CG PUSCH. When the CG PUSCHs have different priorities, the terminal may select a CG PUSCH having a higher priority and may transmit the selected CG PUSCH.

When CG PUSCHs having the same priority (e.g., the same priority index) are transmitted using the same Tx beam and the CG PUSCHs overlap in the time domain, the terminal may multiplex all data units in one CG PUSCH, and may transmit the CG PUSCH in which all the data units are multiplexed.

Based on configuration information and/or activating DCI of a CG PUSCH, frequency resources and/or time resources (e.g., some time resources) of the CG PUSCH may be determined. At least a PRB allocation and a start and length indicator value (SLIV) for the CG PUSCH may be determined. The terminal may derive the amount of resource elements (REs) allocated to it based on the PRB allocation and the SLIV, and may determine a TB size based on the derived information.

The base station may configure or indicate two or more resources (e.g., resources of two or more CG PUSCHs) to the terminal, and the terminal may multiplex all data units in the two or more PUSCHs.

Method 1.3-10: In a Type 1 CG PUSCH transmission procedure, resource list(s) may be configured to the terminal, and the terminal may select a resource from a resource list for one CG PUSCH among CG PUSCHs having overlapping Tx beams and/or time resources.

The terminal may select a CG PUSCH having the smallest index among the CG PUSCHs. The selected CG PUSCH may have two or more resources. In this case, the terminal may multiplex TBs to be transmitted on two or more CG PUSCHs in one CG PUSCH (e.g., the selected CG PUSCH).

The resource list configured to the terminal may include a CG resource 1 and a CG resource 2. The CG resource 1 and the CG resource 2 may be defined in the same slot. The size of a codeword 1 supported by the CG resource 1 and the size of a codeword 2 supported by the CG resource 2 may be compared in consideration of MCS levels, the number of REs, and/or the number of layers.

Figure 9:
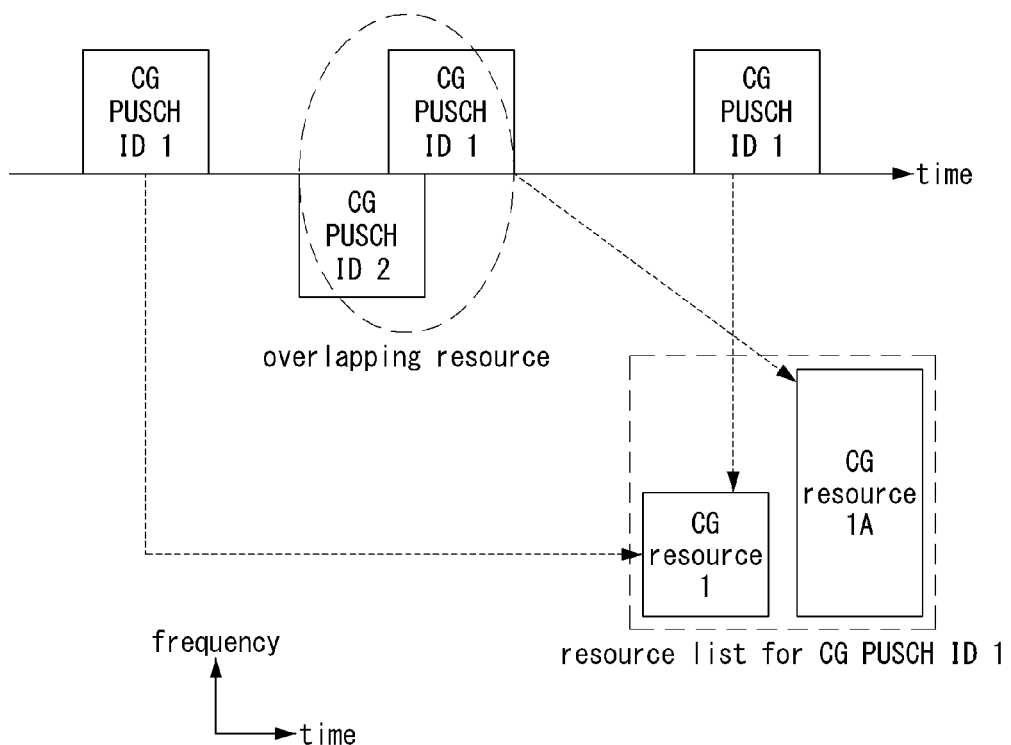
FIG. 9 is a conceptual diagram illustrating a first exemplary embodiment of a method for selecting a CG resource for a CG PUSCH.

FIG. 9 is a conceptual diagram illustrating a first exemplary embodiment of a method for selecting a CG resource for a CG PUSCH.

Referring to FIG. 9, a CG resource 1 may be used when CG PUSCHs do not collide, and a CG resource 1A may be used when CG PUSCHs collide. The size of CG resource 1A may be larger than the size of CG resource 1. A resource list for a CG PUSCH ID 1 may be configured, and the resource list may include the CG resource 1 and the CG resource 1A. At least a TB size (TBS), MCS, PRB allocation, start symbol, and number of symbols may be configured for each of the CG resource 1 and the CG resource 1A. The size of a TB transmittable in the CG resource 1 may be a TBS 1, and the size of a TB transmittable in the CG resource 1A may be a TBS 1A.

A CG PUSCH ID 2 may be configured to the terminal. The CG PUSCH ID 2 may be transmitted in the same time resource as the CG PUSCH ID 1. The transmissions of the CG PUSCH ID 2 and the CG PUSCH ID 1 may overlap in some symbols. In this case, the terminal may transmit a data unit using a resource derived from the CG resource 1A according to Method 1.3-9.

A data unit having the TBS 1A may be multiplexed in a CG resource 1B. Even when a TB 1 corresponding to the CG PUSCH ID 1 and a TB 2 corresponding to the CG PUSCH ID 2 are multiplexed, the size of (TB 1+TB 2) may not be greater than the TBS 1A.

Method 1.3-11: The same encoding operation may be performed for the TB 1 for the CG PUSCH ID 1 and the TB 2 for the CG PUSCH ID 2, and one cyclic redundancy check (CRC) (e.g., TB-level CRC) may be assigned.

The same encoding operation and the same modulation operation for the multiplexed TBs may be performed. Alternatively, different encoding operations and the same modulation operation for the multiplexed TBs may be performed. The reason is that since the TB 1 and the TB 2 may have different BLERs, it may be preferable to apply different code rates thereto. In this case, a code rate set for the CG PUSCH ID 1 may be applied to the TB 1, and a code rate set for the CG PUSCH ID 2 may be applied to the TB 2. The terminal may generate one bit stream by interleaving codebook(s) for the TB1 and codebook(s) for the TB2.

Method 1.3-12: The terminal may perform a different encoding operation for each TB for a CG PUSCH ID, and may assign a separate CRC (e.g., TB-level CRC).

A result of rate matching may vary according to the amount of resources corresponding to the CG PUSCH ID 1A. For example, UCI may have to be piggybacked in the CG PUSCH ID 1A. In order to multiplex the UCI, TB 1, and TB 2, the terminal may perform an RE mapping operation based on priorities thereof.

For example, the number of REs may be derived according to a code rate of the UCI. A rate matching operation for the UCI may be performed first. The TB 1 and the TB 2 may be mapped to REs to which the UCI is not mapped. The terminal may derive the number of REs required for the TB 1 for the CG PUSCH ID 1, and may perform the rate matching operation based on the number of REs. In REs to which the UCI and the TB 1 are not mapped, a rate matching operation for mapping of the TB 2 may be performed.

Method 1.3-13: In Method 1.3-12, the TBs and the UCI may have an order, and the rate matching operations may be performed sequentially according to the order.

When the encoding operation is completed, a result of the encoding operation may be mapped to modulation symbols. Coded bits belonging to different TBs may be mapped in the same modulation symbol. In the CG PUSCH transmission procedure, an RE-level puncturing operation may be performed. In this case, it may be preferable that only one TB is affected by the puncturing operation.

Method 1.3-14: In Method 1.3-12, the coded bits for different TBs may be mapped to different REs. For this operation, a large number of coded bits may be mapped. Alternatively, additional known bits (e.g., 0 or 1) may be added (prepended or appended) to the coded bits.

Figure 10:
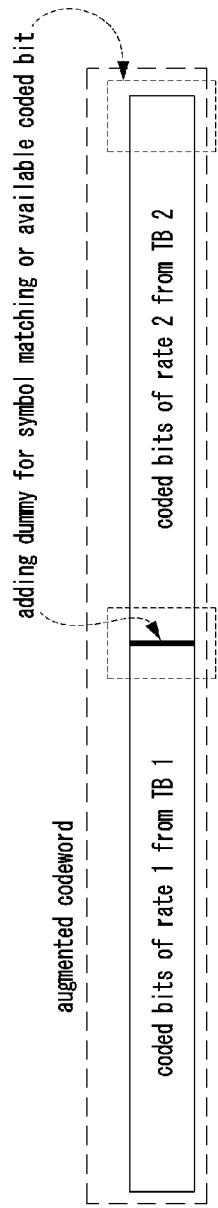
FIG. 10 is a conceptual diagram illustrating a first exemplary embodiment of a method for mapping coded bits.

FIG. 10 is a conceptual diagram illustrating a first exemplary embodiment of a method for mapping coded bits.

Referring to FIG. 10, the terminal may append many coded bits before performing a modulation operation. Alternatively, the terminal may add 0(s) or 1(s) to a codeword before performing the modulation operation. The terminal may generate an augmented codeword by concatenating the codewords, and may perform a modulation operation for the augmented codeword.

Meanwhile, when the CG PUSCH ID 1A is used to multiplex the TB 1, TB 2, and/or UCI, the size of 'TB 1+TB 2' may be smaller than the TBS 1A. In this case, it may be a waste of resources for the terminal to transmit the PUSCH using all resources of the CG PUSCH ID 1A.

To this end, the terminal may derive the minimum number of PRBs capable of transmitting (TB 1+TB 2), and may transmit the PUSCH using the derived PRB(s). Although a time resource of the CG PUSCH ID 1A is reused, a bandwidth may be reduced by using less PRBs. In this case, PRB(s) having lower indexes from among the PRBs allocated for the CG PUSCH ID 1A may be utilized first. When the DFT-s-OFDM is used for CG PUSCH transmission, the number of PRBs for the CG PUSCH transmission may be a multiple of 2, 3, or 5.

Method 1.3-15: The terminal may transmit the CG PUSCH using only the minimum number of PRBs capable of transmitting both the TB 1 and TB 2.

In order to derive the number of PRBs, the terminal may calculate the amount of resources required for each of the TB 1 and the TB 2 by using a TBS derived from the amount of scheduled resources and the code rate set by RRC signaling. With respect to the code rate $r_i$ and the TBS $s_i$ of the TB i, $s_i+O_i$ may be used as information bits in consideration of a CRC length $O_i$ of the TB or code block group (CBG). i may be a natural number.

When the code rate is applied, the length of the codeword may be given as approximately $(s_i+O_i)/r_i$. The number of REs required to transmit the TBs may be expressed by N symbols and M subcarriers. When a modulation rate is Q, $N \cdot M \cdot Q \geq \Sigma_i (s_i+O_i)/r_i$ may be established. Here, when a different modulation rates $Q_i$ is applied to the TB i, $N \cdot M \geq \Sigma_i (s_i+O_i)/(r_i \cdot Q_i)$ may be established.

In order to derive the minimum number of PRBs, the minimum value of M may be derived, and the minimum value of M may be converted into the number of PRBs (M'=M/12). When DFT-s-OFDM is used in CG PUSCH transmission, M' may be the smallest natural number among values that are multiples of 2, 3, or 5. In order to express a result of the operation as a natural number, a round-up operation or a round-down operation may be additionally performed on the result of the operation.

In order to apply the above methods, the procedure for deriving the TBS in the terminal may be changed. In order to derive the TBS, the amount of resources (e.g., the number of REs) scheduled to the terminal, the amount of overhead, and/or the code rate may be utilized.

In order to derive the TBS 1 for the CG resource of the CG PUSCH ID 1, the number of REs allocated to the CG PUSCH ID 1, the amount of overhead, and/or the code rate may be utilized. The size of the TB for the CG resource of the CG PUSCH ID 1A may be regarded as the TBS 1. Therefore, the terminal may consider that the TBS 1 or 'TBS 1+TBS 2' is derived instead of the TBS 1A for the CG PUSCH ID 1A. When the TB 2 is multiplexed, the terminal may consider that the TBS for the CG PUSCH ID 1A is 'TBS 1+TBS 2'.

Method 1.3-16: When there are two or more TBs transmittable on the CG PUSCH, the sizes (e.g., TBS 1A) of TBs to be transmitted in each CG PUSCH overlapping the corresponding CG PUSCH in the time domain may be derived from TBSs derived using different CG PUSCH resources.

Three or more CG PUSCHs may overlap each other, and the terminal may multiplex all TBs in one CG PUSCH among the three or more CG PUSCHs and transmit them on the CG PUSCH. Even in this case, Method 1.3-16 may be extended and applied. For example, in a transmission procedure of the CG PUSCH ID 1, CG PUSCH ID 2, and CG PUSCH ID 3, the TB 1, TB 2, and/or TB 3 may be multiplexed. When the TB 1, TB 2, and/or TB 3 are multiplexed and transmitted in a resource of the CG PUSCH ID 1A, the TBS may be given as 'TBS 1+TBS 2+TBS 3'. Thereafter, a common CRC or individual CRCs may be added to the TBs, and the terminal may perform a common encoding operation or individual encoding operations on the TBs. A rate matching operation may be performed by applying Method 1.3-13 in the encoding operation.

A codeword may be derived from each TB, the codewords may be concatenated, and a modulation operation on the concatenated codewords may be performed. An order for the concatenation may be the order considered in the rate matching operation.

Meanwhile, priorities (e.g., priority indexes) of the CG PUSCHs may be configured differently. According to a configuration of the base station, a priority of the CG PUSCH may be indicated or configured to the terminal by RRC signaling. The priority of the CG PUSCH may be classified into two types based on a value of 0 or 1. For example, the CG PUSCH may be classified into a low priority (LP) CG PUSCH and a high priority (HP) CG PUSCH.

In order to transmit CG PUSCH(s) in the same symbol, one CG PUSCH may be selected, and all or some TBs and/or UCIs may be multiplexed in the selected CG PUSCH. In this case, the one CG PUSCH may be selected from among CG PUSCHs having a high priority. When CG PUSCHs having the same priority overlap in the time domain, all or some TBs and/or UCIs may be multiplexed in a resource of a CG PUSCH having the lowest ID or the highest ID.

The terminal may not always transmit a TB in the CG PUSCH. If a higher layer (e.g., MAC layer) of the terminal does not deliver a TB to a physical layer, the CG PUSCH may not be transmitted. The terminal may receive a DCI, and when a UL grant is derived from the received DCI, the terminal may transmit a PUSCH. In this case, if a resource that temporally overlaps with the CG PUSCH is dynamically indicated, the CG PUSCH may not be transmitted.

When the resources for the CG PUSCH ID 1, CG PUSCH ID 2, and CG PUSCH ID 3 overlap each other, the terminal may transmit only TBs corresponding to some CG PUSCHs. For example, the CG PUSCH ID 2 may not be transmitted. In this case, since the TB 1 and TB 3 are transmitted by the terminal's selection, the above-described transmission operation may be recognized equally by the terminal and the base station. The terminal may transmit control information on the CG PUSCH, and the control information may include a list of the CG PUSCH IDs mapped to the CG PUSCH.

In an unlicensed band, a CG PUSCH including CG-UCI may be transmitted. When it is determined that a resource region is in an idle state in a listen before talk (LBT) procedure performed by the terminal and the base station, a transmission operation may be performed in the corresponding resource region. Therefore, even when a UL grant and a PUSCH are dynamically transmitted, the terminal may not be able to perform actual transmission. The terminal may inform, to the base station, that not only an initial transmission operation (e.g., initial transmission operation including a transmission operation of some control information) but also a retransmission operation (e.g., retransmission operation including a transmission operation of some control information) for a specific HARQ process number (HPN) is performed also in the CG PUSCH. Since a channel occupancy time (COT) secured by the terminal may be shared with the base station or other terminals, COT-related information may be included in the control information. The above-described control information may be referred to as CG-UCI. In a licensed band, the terminal may transmit a CG PUSCH including the CG-UCI. The above-described methods may be applied to both the unlicensed band and the licensed band.

When a PUCCH and the CG PUSCH overlap in the time domain, the same encoding operation for UCI and CG-UCI may be performed. HARQ-ACK information bits and information bits of the CG-UCI may be concatenated, and one codeword may be derived by performing the same encoding operation on the concatenated information bits. Different encoding operations may be performed for CSI and the CG-UCI, and the CSI and CG-UCI may belong to different codewords.

When a TB is not transmitted from the MAC layer of the terminal to the PHY layer, the transmission of the CG PUSCH may be skipped. Since the base station may not know whether the transmission of the CG PUSCH is skipped, the base station may perform blind detection. When the CG PUSCH corresponding to one ID has a plurality of resources or when CG PUSCH(s) corresponding to a plurality of IDs exist, the terminal may select CG PUSCH(s) so that a transmission operation is performed in temporally overlapping resources.

For example, the resources corresponding to the CG PUSCH IDs 1, 2, and 3 may overlap in time, and TB(s) corresponding to the CG PUSCH IDs 2 and 3 may be generated. The terminal may multiplex and transmit the TBs in the resource of CG PUSCH ID 1A. The base station may not know the combination of the CG PUSCH IDs and/or the resource through which the TB(s) are transmitted. Since the CG PUSCH ID 1A includes CG-UCI, the CG-UCI may include information indicating that the TBs corresponding to the CG PUSCH IDs 2 and 3 are multiplexed.

Method 1.3-17: CG-UCI may indicate a TB pattern.

Method 1.3-18: In Method 1.3-17, a specific field of the CG-UCI may be interpreted as a bitmap, the bitmap may indicate a pattern of the CG PUSCH IDs with which the TBs are associated, and CG PUSCHs corresponding to the respective bits of the bitmap may correspond to an ascending or descending order of the CG PUSCH IDs.

When the CG PUSCH IDs 1, 2, and 3 temporally overlap in the CG PUSCH ID 1A, the length of the bitmap may be given as 3. If the TBs corresponding to the CG PUSCH IDs 2 and 3 are transmitted, the bitmap may be given as 011. If another combination occurs, the bitmap may be interpreted regardless of the index of the resource through which the CG PUSCH is transmitted. Even if a transmission operation is performed in the CG PUSCH ID 2A instead of the CG PUSCH ID 1A, the resources of the CG PUSCH IDs 1, 2, and 3 may overlap in time. In this case, the CG PUSCHs corresponding to the respective bits of the bitmap may be the CG PUSCH ID 1, CG PUSCH ID 2, and CG PUSCH ID 3.

Figure 11:
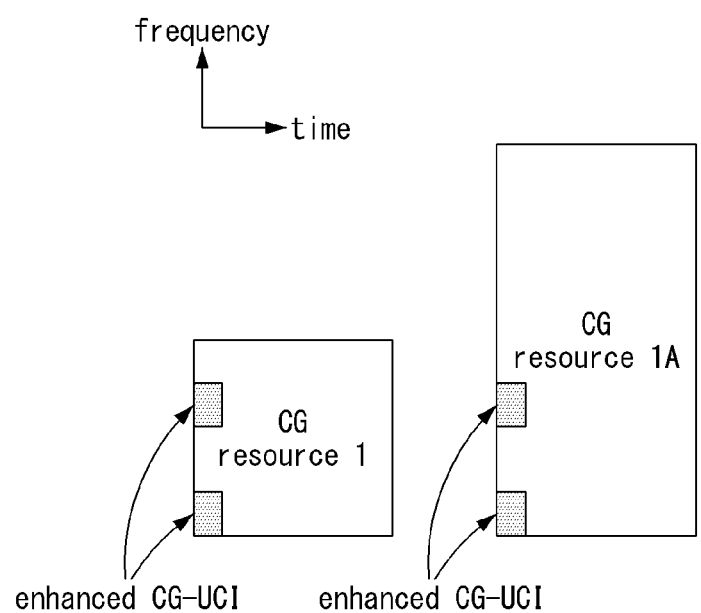
FIG. 11 is a conceptual diagram illustrating a first exemplary embodiment of a method for mapping in a CG resource.

FIG. 11 is a conceptual diagram illustrating a first exemplary embodiment of a method for mapping in a CG resource.

Referring to FIG. 11, CG-UCI may be included in the CG PUSCH ID 1 (e.g., CG resource 1) and the CG PUSCH ID 1A (e.g., CG resource 1A). Since a plurality of TBs may be transmitted in the CG PUSCH ID 1A, the CG-UCI may be included in the CG PUSCH ID 1A. For frequency multiplexing in the RE mapping procedure, the CG-UCIs may be mapped to subcarriers according to a preset interval. When only one TB is transmitted in the CG PUSCH ID 1, the CG-UCI may not be mapped to the CG PUSCH ID 1. In this case, the CG-UCI may be mapped in the CG PUSCH ID 1A. When the CG-UCI is mapped, the positions of REs to which the CG-UCI is mapped may be the same so that the base station can easily distinguish the CG PUSCH ID 1 and the CG PUSCH ID 1A.

When a plurality of TBs is transmitted in the CG PUSCH ID 1A, a HARQ process number (HPN) of each of the plurality of TBs may be determined. When one TB is transmitted, an HPN for the one TB may be derived from a time resource (e.g., slot index) in which the CG PUSCH is transmitted. When an HPN offset (e.g., harq-ProcID-Offset) is indicated to the terminal by RRC signaling, the HPN may be derived using the time resource in which the CG PUSCH is transmitted and the HPN offset.

An HPN field included in the CG-UCI may be reused. Since a TB retransmission operation in an unlicensed band may be performed in the CG PUSCH based on the terminal's determination, the HPN field may be included in the CG-UCI. In a licensed band, the HPN field of the CG-UCI may be used for other purposes. For example, in a licensed band, the HPN field may be used to represent a pattern of TBs. Most significant bits (MSBs) or least significant bits (LSBs) of the HPN field may be used to represent the pattern of TBs.

The size of the HPN field included in the CG-UCI may be limited to 4 bits. In this case, when there are 5 or more temporally overlapping resources in the CG PUSCH, up to 4 CG PUSCHs having a low ID or a high ID among CG PUSCH IDs may be selected. Alternatively, another field among fields included in the CG-UCI may be used together with the HPN field. For example, an NDI field and the HPN field may be concatenated, and the concatenated fields may be used as bits for expressing a transmission pattern of TBs. In this case, up to 5 temporally overlapping resources in the CG PUSCH may be allowed.

The HPN for the CG PUSCH may be determined without CG-UCI. In this case, the following method may be applied.

Method 1.3-19: The derived HPN may be utilized as an HPN of the first TB multiplexed in the CG PUSCH transmitted by the terminal, and HPNs of other TBs may be consecutive HPN values according to the order of the CG PUSCH IDs.

For two or more TBs transmitted in the CG PUSCH ID 1A, the HPN of each TB may be determined based on the transmission order of each TB. For example, if the CG PUSCH IDs 2 and 3 are transmitted, the HPN may be derived from the time at which CG PUSCH ID 1A is transmitted and/or the HPN offset, and the derived HPN may be used for the TB corresponding to the CG PUSCH ID 2. The HPN of the TB corresponding to the CG PUSCH ID 3 may be (the derived HPN+1).

Repeated transmissions may be configured for the CG PUSCH. The base station may indicate to the terminal the number of repeated transmissions using RRC signaling. Alternatively, the number of repeated transmissions may be derived from an index indicating a time resource of the CG PUSCH. When the CG PUSCH is repeatedly transmitted, a redundancy version (RV) may be changed in each CG PUSCH transmission. Repetitions of a PUSCH instance may constitute one PUSCH occasion. A unique RV may be derived for each PUSCH instance. When the repeated transmission operation is performed in units of slots according to an interval of the PUSCH instances (e.g., interval between first symbols of adjacent PUSCH instances), the repeated transmission operation may be referred to as type A. When repeated transmission operations are consecutively performed and the last symbol of the previous PUSCH instance is adjacent to the first symbol of the next PUSCH instance, the repeated transmission operation may be referred to as type B.

When time resources corresponding to a plurality of CG PUSCH IDs overlap, repeated transmission(s) of some CG PUSCH(s) for some CG PUSCH ID(s) may be being performed, and some CG PUSCH(s) for some CG PUSCH ID(s) may be initially transmitted. When one CG PUSCH is repeatedly transmitted, a collision between the repeated transmissions and another PUSCH may not be allowed. Alternatively, transmission of the CG PUSCH may be canceled due to transmission of a PUSCH scheduled by DCI. Alternatively, a CG PUSCH having a higher priority may be transmitted instead of a CG PUSCH (e.g., a CG PUSCH having a lower priority). Alternatively, transmission of a CG PUSCH may be canceled due to transmission of a PUSCH scheduled with DCI having a high priority.

Even when repeatedly transmitted CG PUSCHs overlap in time, the terminal may multiplex and transmit a plurality of TBs in one CG PUSCH. When the code rate and/or size of each of the TBs is derived using the above-described methods, the RV of each of the TBs may be derived.

Method 1.3-20: The RV applied to each TB may be an RV for each CG PUSCH resource.

1.3.5 Support for Simultaneous SRS Transmissions

With respect to SRS transmission, if overlapped partially or entirely with a PUSCH and/or a PUCCH in the same serving cell, the terminal may not transmit an SRS. In addition, when a plurality of SRS resources is configured and/or activated in the terminal, the base station may allocate the plurality of SRS resources so as not to overlap in time. If the terminal can transmit two or more Tx beams (or two or more RS groups), the above-described methods or a modification of the above-described methods may be applied to the SRS transmission. As an example, in a procedure for SRS resource configuration, the RS group may be additionally included in the SRS resource configuration.

In order to determine whether SRS resources are configurable at the same time, whether the Tx beams (or RS groups) are identical may be considered. When it is determined that different Tx beams (or different RS groups) are used, the terminal may transmit the SRS in SRS resources partially or entirely overlapping in time. In order to determine whether the SRS and the PUCCH (or PUSCH) can be transmitted simultaneously, whether the Tx beams (or RS groups) are identical may be considered. When it is determined that different Tx beams (or different RS groups) are used, the terminal may transmit the SRS and the PUCCH (or PUSCH) even when the SRS resources overlap partially or entirely in the time domain.

When the SRS transmission is triggered using DCI, the base station may indicate or configure an interpretation scheme of a trigger field for SRS transmission included in the DCI to the terminal through RRC signaling. There may be one interpretation scheme of the trigger field for SRS transmission.

Method 1.3-21: An index indicated by the trigger field may mean that one or more SRS resources are transmitted or configured to the terminal.

1.4 Support of Simultaneous UL Transmissions Considering Priority Index

1.4.1 Framework for Transmission of PUCCH and PUSCH

Based on UL-DCI, DL-DCI, and/or RRC signaling, the terminal may multiplex UCI 1, UCI 0, TB 1, and/or TB 0. It may be indicated to the terminal that simultaneous transmission of PUCCHs is performed without multiplexing. Information indicating whether UCI 1 and UCI 0 are multiplexed in one PUCCH and/or information indicating whether only UCI 1 is transmitted on a PUCCH may be indicated to the terminal. The base station may use a combination of RRC signaling, UL-DCI, and/or DL-DCI to indicate the above-described information to the terminal.

A method of transmitting one TB will be described in exemplary embodiments below. The exemplary embodiments below may be easily applied to a transmission method of two TB s (e.g., TB 1 and TB 0). When considering UCI 1, UCI 0, and TB, the base station may transmit DL-DCI including information indicating whether UCI 1 and UCI 0 are multiplexed to the terminal. The base station may transmit UL-DCI including information indicating whether to multiplex UCI having a priority index different from that of TB to the terminal. Alternatively, the base station may transmit UL-DCI including information indicating whether the TB and UCI 1 are multiplexed to the terminal. In the former case, the TB 1 and UCI 1 may be multiplexed, and the base station may indicate information indicating whether the UCI 0 is multiplexed to the terminal using UL-DCI and/or RRC signaling. The TB 0 and UCI 0 may be multiplexed, and the base station may indicate information indicating whether the UCI 1 is multiplexed to the terminal.

The terminal may perform a procedure for determining an uplink channel (ULCH) resource (e.g., PUCCH resource and/or PUSCH resource) before considering Tx panel(s). The above-described procedure may be divided into two procedures (e.g., procedure 1 and procedure 2). In the procedure 1, the terminal may derive one ULCH or two ULCHs for each priority index. The terminal may identify whether resources (e.g., PUCCH 1 and PUSCH 1) respectively corresponding to the UCI 1 and TB 1 overlap in time, and may identify whether resources (e.g., PUCCH 0 and PUSCH 0) respectively corresponding to the UCI 0 and TB 0 overlap in time. If the PUCCH and the PUSCH overlap in time, the UCI may be multiplexed in the PUSCH. Therefore, when the terminal performs the procedure 1, the PUCCH 1, PUSCH 1, PUCCH 0, and PUSCH 0 that do not overlap in time may be configured or indicated. According to scheduling indicated to the terminal, only some of the above-described ULCHs may be determined.

In the procedure 2, some ULCHs may be multiplexed in consideration of priority index(es) and whether ULCH(s) are multiplexed, and transmission of the remaining ULCHs may be dropped. When the procedure 1 is performed, ULCHs having the same priority index may be considered. When the procedure 2 is performed, multiplexing and/or dropping of ULCHs may be indicated differently in each of DL-DCI and UL-DCI. For example, the DL-DCI may indicate to the terminal transmission of UCI 1 and dropping of UCI 0, and the UL-DCI may indicate to the terminal multiplexing of UCI 1 and UCI 0. For another example, the DL-DCI may indicate to the terminal multiplexing of UCI 1 and UCI 0, and the UL-DCI may indicate to the terminal transmission of UCI 1 and dropping of UCI 0.

The procedure 2 may be subdivided into a procedure 2-1 and a procedure 2-2. In the procedure 2-1, a PUCCH may be determined in consideration of the UCI 1 and UCI 0. In the procedure 2-2, a PUSCH may be determined in consideration of the PUCCH (e.g., PUCCH determined in the procedure 2-1), and the terminal may map the UCI (e.g., all or part of UCI 1 and UCI 0) to the PUSCH. In the procedure 2-1, the PUCCH may be determined based on the UCI 1 and UCI 0 regardless of the TB 1 and TB 0. The DL-DCI last received from the base station may indicate to the terminal that the UCI 1 and UCI 0 are multiplexed or that the UCI 1 or UCI 0 is transmitted. When the terminal does not transmit a PUSCH, the PUCCH may be determined based on the procedure 2-1, and the terminal may transmit the PUCCH.

Each of UCI 1 and UCI 0 may correspond to PUCCH 1 and PUCCH 0 that the terminal has after performing the procedure 1. The terminal may already have multiplexed some UCIs in PUSCH 1 and PUSCH 0, and some multiplexed UCIs may not be considered in the procedure 2-1. When multiplexing of the UCI 1 and UCI 0 is performed in the procedure 2-1, PUCCH 1 corresponding to UCI 1 may be a reference. UCI 0 corresponding to PUCCH 0 overlapping with PUCCH 1 may be multiplexed. When subslot(s) are configured for a resource set corresponding to PUCCH 1, a time resource of PUCCH 1 may belong to one subslot. That is, PUCCH 1 may be transmitted in one subslot. Since PUCCH 0 may follow a separate subslot configuration, PUCCH 0 may be transmitted in one or more subslots. In this case, PUCCH 0 may overlap two or more PUCCH 1s. PUCCH 0 may be regarded as overlapping in the earliest subslot or the latest subslot among the above-described subslots. The determined subslot may be used to determine whether to overlap with PUCCH 1.

When multiplexing UCI 1 and UCI 0, a method of selecting a different subslot according to a UCI type of UCI 1 may be considered. The reason is that whether or not UCI 1 and UCI 0 are multiplexed may depend on the UCI type. For example, when UCI 0 overlaps several PUCCH 1s, a PUCCH 1 and subslot including HARQ-ACK (e.g., HARQ-ACK 1) among UCI 1 may be considered. In this case, UCI types of UCI 0 that can be multiplexed with HARQ-ACK 1 may be HARQ-ACK and SR/LRR. On the other hand, when the UCI type of UCI 1 is SR 1/LRR 1, HARQ-ACK 0 or SR0/LRR 0 among UCI 0 may not be multiplexed. When SR 1/LRR 1 is transmitted in a PUCCH format 0/1, a payload of HARQ-ACK 0 may be large. Therefore, PUCCH 1 having a PUCCH format 2/3/4 may be configured or indicated to the terminal. Since the PUCCH in which UCI 1 and UCI 0 are multiplexed may be considered to have a high priority, and UCI 1 and UCI 0 are transmitted on PUCCH 1, it may be difficult to change the PUCCH format to the PUCCH format 2/3/4.

In order to apply the above-described methods, the terminal may perform a multiplexing procedure with UCI 0 differently according to the UCI type of UCI 1. However, in terms of implementation, it may be advantageous for the terminal to perform the multiplexing procedure regardless of the UCI type. The reason is that it is simpler to multiplex or drop all of UCI 0 included in PUCCH 0 with respect to PUCCH 0 overlapping PUCCH 1 under a condition that UCI 1 transmission is not dropped. Therefore, it may be preferable that one subslot is selected irrespective of the UCI type of UCI 1.

In order to determine a PUCCH in which UCI 1 and UCI 0 are multiplexed, a method of considering PUCCH 0s overlapping with the reference PUCCH 1 may be further subdivided. Considering all PUCCH 0s overlapping the reference PUCCH 1, UCI 1 and all UCI 0s may be multiplexed. Alternatively, PUCCH 0 overlapping with PUCCH 1 may be selected one by one, multiplexing operation for UCI 1 and selected UCI 0 may be performed, and the multiplexing operation may be repeated.

A difference may exist between a case in which UCI 1 and all UCI 0s are multiplexed at once and a case in which UCI 1 and UCI 0 are sequentially multiplexed. For example, PUCCH 1 corresponding to UCI 1 may overlap PUCCH 0 corresponding to HARQ-ACK 0, and PUCCH 1 and PUCCH 0 corresponding to SR 0 may overlap. PUCCH 0 corresponding to HARQ-ACK 0 may be temporally earlier, and PUCCH 0 corresponding to SR 0 may be temporally later.

When it is considered that HARQ-ACK 0 and SR 0 are sequentially multiplexed to UCI 1, PUCCH 1 in which UCI 1 and HARQ-ACK 0 are multiplexed may be derived again. When the above-described PUCCH 1 and PUCCH 0 including SR 0 overlaps again, PUCCH 1 in which UCI 1 and SR 0 are multiplexed may be derived again. When the above-described PUCCH 1 and PUCCH 0 including SR 0 do not overlap each other, the terminal may consider transmitting all of UCI 1, HARQ-ACK 0, and SR 0, and may perform the procedure 2-2. Depending on the multiplexing method, UCI 1 and SR 0 may not be multiplexed. In this case, transmission of SR 0 may be dropped, and UCI 1 and HARQ-ACK 0 may be multiplexed in PUCCH 1.

When it is considered that HARQ-ACK 0 and SR 0 are multiplexed in UCI 1 at a time, UCI 1, HARQ-ACK 0, and SR 0 may be included in the PUCCH 1. Alternatively, transmission of SR 0 may be dropped, and PUCCH 1 including UCI 1 and HARQ-ACK 0 may be derived. After the procedure 1 is performed, SR and CSI in UC I may be treated differently. For example, if HARQ-ACK 0 and SR 0 are multiplexed in PUCCH 0 after the procedure 1 is performed, multiplexing of 'HARQ-ACK 0 and SR 0' and 'UCI 1 in which HARQ-ACK 1 and SR 1 are multiplexed' may be considered. In this case, HARQ-ACK 0 may be selected from UCI 0 for multiplexing with UCI 1, and transmission of SR 0 from UCI 0 may be dropped. The dropped SR 0 may be assumed to be a negative SR.

In the SR transmission procedure, the MAC layer of the terminal may deliver a positive SR or a negative SR to the PHY layer of the terminal. Considering a processing time required in the multiplexing procedure of UCI 1 and UCI 0, all PUSCHs and all PUCCHs scheduled to the terminal may be indicated to have sufficient processing time. The channel and/or signal indicated to the terminal may include SPS PDSCH, CG PUSCH, periodic PUCCH, semi-persistent PUCCH, and/or SR.

The sufficient processing time may be derived from the technical specification according to the capability of the terminal. For example, the terminal may perform the procedures 1 and 2 by applying a release-15 timeline. Therefore, the terminal may already know the existence and/or time resources of all PUSCHs and all PUCCHs before performing the procedures 1 and 2.

In the SR transmission procedure, since the MAC layer of the terminal delivers SR 1 and SR 0 to the PHY layer of the terminal early enough, it may be assumed that there is no unnecessary positive SR. For example, a case in which a positive SR 1 is transmitted after a positive SR 0 is transmitted may be excluded.

If a positive SR is not delivered, since a PUCCH is not transmitted in the PHY layer when an SR is configured to be transmitted in a PUCCH format 0/1, the procedures 1 and 2 may be simplified. When an SR is multiplexed with CSI and/or HARQ-ACK, the SR may be transmitted in a PUCCH format 0/1 as well as PUCCH format 2/3/4. When two or more SRs overlap in time and are multiplexed with CSI and/or HARQ-ACK, bit(s) in the PUCCH format 2/3/4 may represent an index in which a positive SR occurs. If all SRs are positive SRs, the above-described bit(s) may be set to 0. The dropping of SR transmission in consideration of multiplexing with UCI 1 may mean that the above-described bit(s) are dropped.

Unlike SR, periodic CSI/semi-persistent CSI may occur periodically in the PHY layer of the terminal and may be classified as UCI 0. According to the procedure 1, CSI may be multiplexed in PUCCH 0, and according to the procedure 2, CSI may be multiplexed with UCI 1 in PUCCH 1. Alternatively, according to the procedure 2, transmission of CSI may be dropped in PUCCH 1. In the procedure 2, the terminal may drop transmission of some UCI types. Therefore, in PUCCH 0 obtained by performing the procedure 1, it may be preferable to classify UCI according to a UCI type rather than a UCI index (e.g., UCI 0, UCI). Since all UCI types are transmitted in UCI 1, the UCI types may not be distinguished.

When the terminal performs the procedure 2-1 and/or procedure 2-2, the UCI types may not be distinguished for the UCI 1, and the UCI types may be distinguished for the UCI 0. For the UCI 1, the procedure 2-1 may be performed according to the format of PUCCH 1. A case in which the format of PUCCH 1 considered during the procedure 2-1 is PUCCH formats 0 and 1 and a case in which the format of PUCCH 1 are PUCCH formats 2, 3, and 4 may be distinguished. Since all or part of UCI 1 and UCI 0 are multiplexed in PUCCH 1, when the format of PUCCH 1 is PUCCH format 0 and/or 1, a sum of sizes of UCI 1 and UCI 0 may not exceed 2 bits. The size of UCI 1 may be 1 bit, the size of UCI 0 may be 1 bit, and UCI 1 and UCI 0 may be multiplexed in PUCCH 1. When the amount of UCI 0 is large, the sum of the sizes of UCI 1 and UCI 0 may exceed a boundary value supported by the PUCCH 1 format. Alternatively, when the format of PUCCH 0 is PUCCH format 2, 3, and/or 4, all of UCI 0 may be dropped. In this case, the UCI type of UCI 0 may be HARQ-ACK, SR, and/or CSI. In this case, the procedure 2-1 and/or the procedure 2-2 may be performed without considering the UCI types of UCI 1 and UCI 0.

When the format of PUCCH 1 is PUCCH formats 2, 3, and/or 4, a positive SR or negative SR in UCI 1 may be expressed as a value of bit(s). In this case, whether to multiplex UCI 1 and UCI 0 may be determined according to values of some UCI types of UCI 1. Transmission of UCI 0 may be dropped. Alternatively, UCI 0 may be multiplexed with UCI 1. It may not be preferable for the procedure performed by the terminal to be determined based on a payload value. Therefore, according to the format of PUCCH 1 in which UCI 1 and UCI 0 are multiplexed, all of UCI 0 may be dropped.

In the procedure 2-2, PUCCH 0 to which only UCI 0 is mapped, PUCCH 1 to which only UCI 1 is mapped, PUCCH 1 to which both UCI 0 and UCI 1 are mapped, PUSCH 1 to which only TB 1 is mapped, PUSCH 0 to which only TB 0 is mapped, PUSCH 0 to which both UCI 0 and TB 0 are mapped, and/or PUSCH 1 to which both UCI 1 and TB 1 are mapped may be considered. Since multiplexing of SR and TB is not supported, a case of distinguishing UCI types may occur. When a positive SR 1 occurs in the terminal, since the terminal cannot multiplex SR 1 in PUSCH 0, PUSCH 0 may be dropped. When a positive SR 0 occurs in the terminal, since the terminal cannot multiplex SR 0 in PUSCH 1, SR 0 may be dropped. In this case, even when two or more UCI types (e.g., SR, HARQ-ACK) are included in UCI 1, since SR is included in UCI 1, transmission of PUSCH 0 may be dropped, and PUCCH 1 may be transmitted.

When a negative SR occurring in the terminal is included in UCI 1 (e.g., when UCI 1 includes two or more UCI types), the terminal may drop PUSCH 0 overlapping PUCCH 1, and transmit PUCCH 1. When UCI 1 includes only the SR, the negative SR may not be delivered to the PHY layer of the terminal. Therefore, in the procedure 1 and/or procedure 2, the negative SR may not be considered in the multiplexing procedure with UCI 1, UCI 0 and/or TB 0. In the procedure 2-2, the PUSCH may be determined by considering 'TB 1 and TB 0' as well as 'UCI 1 and UCI 0'. Here, the last received UL-DCI may indicate to the terminal that UCI 1 and UCI 0 are multiplexed with TB, that UCI 1 is multiplexed with TB, or that UCI 0 is multiplexed with TB.

Method 1.4-1: When the terminal transmits only the PUCCH, the terminal may determine a 'PUCCH resource' and that all or part of UCI is transmitted, based on the last received DL-DCI (e.g., HP DL-DCI).

Method 1.4-2: When the terminal transmits the PUSCH, the terminal may determine a 'PUSCH resource' and that all or part of UCI is transmitted, based on the last received UL-DCI (e.g., HP UL-DCI).

When the procedure 2-1 is performed, some or all of UCI may be dropped. In UCI 1, HARQ-ACK and SR may be considered, and in UCI 2, HARQ-ACK, SR, and/or CSI may be considered. In this case, at least CSI transmission may be dropped in the procedure 2-1. The reason is that the number of encoding chains that the terminal can execute simultaneously is limited. For example, the number of encoding chains that can be executed simultaneously may be two or three.

Method 1.4-3: The procedure 2-2 may be performed for UCIs determined to be transmitted in the procedure 2-1. In this case, the UCI dropped in the procedure 1 and/or procedure 2-1 may not be considered in the procedure 2-2.

When the terminal applies Method 1.4-3, if the CSI is dropped, the terminal may not map the CSI to the PUSCH. The CSI may be CSI (e.g., periodic CSI or semi-persistent CSI) transmitted on a PUCCH. When the procedure 1, procedure 2-1, and/or procedure 2-2 is performed, the terminal may not store the dropped UCI. In this case, the terminal may utilize a small-sized storage device. If some UCIs are dropped, the performance of the system may not be improved. In order to prevent such the problem, even when UCI is dropped, whether or not the UCI is multiplexed may be determined again in a subsequent procedure.

Method 1.4-4: The procedure 2-2 may be performed for all UCIs considered in the procedure 1. In this case, the UCI dropped in the procedure 1 and/or procedure 2-1 may be considered again in the procedure 2-2.

When the terminal applies Method 1.4-4, if the CSI is dropped, the terminal may map the CSI to the PUSCH. The CSI may be CSI (e.g., periodic CSI or semi-persistent CSI) transmitted on the PUCCH. Since the UCI that can be multiplexed in the PUSCH is considered in the procedure 2-2, other UCIs other than the UCI included in the PUCCH obtained in the procedure 2-1 may also be considered.

For example, since aperiodic CSI or semi-persistent CSI may be transmitted on a PUSCH, the multiplexing operation of UCI and TB may be considered in the procedure 1. Since only UCI included in the PUCCH is considered in the procedure 2-1, aperiodic CSI or semi-persistent CSI may not be considered in the procedure 2. Since multiplexing of UCI and TB included in the PUSCH is considered in the procedure 2-2, when Method 1.4-4 is applied, the aperiodic CSI or semi-persistent CSI may be multiplexed with TB. When Method 1.4-3 is applied, the aperiodic CSI or semi-persistent CSI may not be multiplexed with TB because the aperiodic CSI or semi-persistent CSI is excluded in the procedure 2-1.

Meanwhile, considering a case in which PUCCH and PUSCH can be simultaneously transmitted in different serving cells, when only the procedure 1 is applied, a PUSCH (e.g., PUSCH with UCI) may be derived for each priority index. In this case, the terminal may not perform the procedure 2, and may transmit PUSCHs (e.g., PUSCHs having UCI) in different serving cells.

Method 1.4-5: The terminal may perform the procedure 1, one PUSCH may be derived for each priority index, and PUSCHs may be scheduled in different serving cells. In this case, the terminal may simultaneously transmit the PUSCHs without performing the procedure 2.

For a PUCCH and a PUSCH scheduled in different serving cells, the procedure 1 may be performed, and the PUCCH and the PUSCH may be simultaneously transmitted according to a result of the procedure 2. The serving cells may belong to different frequency bands.

When PUSCHs are scheduled to the terminal in a plurality of serving cells, one PUSCH that can be multiplexed with a PUCCH may be selected from among the PUSCHs. When the terminal selects one PUSCH, the terminal may multiplex UCI in the selected PUSCH and may not multiplex UCI in another PUSCH. When the terminal cannot select a PUSCH, the terminal may transmit the PUSCHs and the PUCCH at the same time.

For example, UCI may be multiplexed in a PUSCH transmitted in a serving cell having the lowest index among the serving cells in which the PUSCHs are scheduled. For another example, the multiplexing procedure for UCI may be performed only in a serving cell in which simultaneous transmission of PUCCH and PUSCH is not allowed (e.g., a serving cell belonging to the same frequency band). When the procedure 2-2 is performed, PUCCH and PUSCH may be transmitted simultaneously in some serving cells, but PUCCH and PUSCH may not be transmitted simultaneously in other serving cells. A multiplexing operation of UCI in other serving cells may be considered.

In this case, it may be determined whether PUCCH and PUSCH are multiplexed in the same frequency band. Based on a result of the determination, the terminal may multiplex UCI in the PUSCH. Alternatively, transmission of PUSCH may be dropped. The PUCCH with UCI may be simultaneously transmitted with a PUSCH scheduled in another frequency band.

Method 1.4-6: When simultaneous transmission of PUSCH and PUCCH is indicated, in the procedure 2-2, it may be determined whether UCI is multiplexed in a PUSCH in serving cell(s) in which PUSCH and PUCCH cannot be simultaneously transmitted, among a plurality of PUSCHs to which UCI can be multiplexed.

Repeated transmission for UCI 1 or UCI 0 may be indicated. The number of repeated transmissions for the format of the PUCCH in which UCI is transmitted may be indicated. Alternatively, the number of repeated transmissions for a resource of PUCCH may be indicated. A multiplexing procedure for UCI for which the number of repeated transmissions is indicated and a multiplexing procedure for UCI for which the number of repeated transmissions is not indicated may be distinguished.

When UCI and/or TB for one priority index is scheduled for the terminal, the terminal may assume that PUCCH corresponding to one UCI type is repeatedly transmitted. Different UCI types may be interpreted as having different priorities. Repeated transmissions for a UCI type having a high priority may be performed, and repeated transmissions for a UCI type having a low priority may be dropped. HARQ-ACK may have the highest priority, a positive SR may have a lower priority than HARQ-ACK, and CSI may have a lower priority than a positive SR.

In the procedure 2-1 in which UCI 1 and UCI 0 are multiplexed, repeated transmissions for UCI 1 or UCI 0 may be performed. In this case, both the priority and the priority of the UCI type may be considered. When UCI 1 is repeatedly transmitted, the subslot considered in the procedure 2-1 may be the second subslot in which UCI 1 is transmitted or a subslot after the second subslot. In this case, PUCCH 1 including UCI 1 may not additionally include other UCIs (e.g., UCI 1 or UCI 0). Therefore, when PUCCH 0 and PUCCH 1 overlap, only PUCCH 1 may be transmitted.

When UCI 1 is not repeatedly transmitted, the second transmission among the repeated transmissions of UCI 0 may overlap the subslot considered in the procedure 2-1. In this case, PUCCH 0 including UCI 0 may not additionally include other UCIs (e.g., UCI 1 or UCI 0). Therefore, when PUCCH 0 and PUCCH 1 overlap, the terminal may transmit only PUCCH 1.

The multiplexing procedure in the first transmission among repeated transmissions of UCI may be different from the proposed method. In the procedure 2-1, UCI 1 and UCI 0 may be multiplexed, and when the number of repeated transmissions associated with PUCCH 1 obtained in the procedure 2-1 is greater than 1, it may be the first transmission. The reason is that an additional multiplexing procedure cannot be performed for UCI that has already been repeatedly transmitted. When an additional multiplexing procedure is performed, since a code rate applied to UCI is changed, the base station may not perform a soft combining operation.

In the procedure 2-1, a procedure of determining multiplexing/selection only with untransmitted UCIs may be performed, and one PUCCH 1 may be determined. If the procedure 2-1 is performed only with UCIs that have not been transmitted, the terminal may perform a multiplexing procedure for UCI 1 and UCI 0, multiplex two or more UCI types for UCI 1, and multiplex two or more UCI types for UCI 0. According to the number of repeated transmissions associated with the resource of PUCCH 1 or the number of repeated transmissions associated with the format of PUCCH 1, PUCCH 1 may be transmitted.

Thereafter, a procedure for determining overlap with UCI (e.g., PUCCH) being repeatedly transmitted may be performed. The high priority of the repeatedly transmitted UCI may mean that the priority (e.g., priority index) of the UCI is high or that the priority of UCI type having the same priority index is high. When the priority of UCI is the same and the priority of the UCI type is the same, it may be determined that the priority of the PUCCH transmitted in an earlier slot or an earlier symbol within the same slot is high. Thereafter, the terminal may perform a multiplexing procedure with the PUSCH by performing the procedure 2-2 using the determined PUCCH 1.

Meanwhile, when the number of encoding chains used by one ULCH or the number of codewords mapped to the ULCH exceeds a predetermined number (e.g., n), the terminal may drop transmission of some UCI. For example, a value of n may be 3 or 2.

Method 1.4-7: The terminal may drop some of the codewords when the number of encoding chains used in one ULCH exceeds a boundary value.

When one priority index is considered and the terminal transmits UCI and TB on one ULCH, HARQ-ACK, CSI part1, and/or SR may constitute one encoding chain (or one codeword), CSI part2 may constitute another encoding chain (or another codeword), and TB may constitute yet another encoding chain (or yet another codeword). Considering two priority indexes, since codewords increase as the priority indexes increase, a larger number of encoding chains may be required. When HARQ-ACK 1 and HARQ-ACK 0 are multiplexed in a PUCCH, CSI may be dropped. The CSI may be CSI part1 and/or CSI part2.

When only one of HARQ-ACK 1 and HARQ-ACK 0 is multiplexed in PUCCH, CSI (e.g., periodic CSI or semi-persistent CSI) may not be dropped. In addition, when the terminal transmits a PUSCH, 'aperiodic CSI and semi-persistent CSI' as well as HARQ-ACK 1, 'HARQ-ACK 0 and periodic CSI', or semi-persistent CSI may be additionally considered in the multiplexing procedure. In this case, the terminal may drop periodic CSI or semi-persistent CSI, and may multiplex 'aperiodic CSI and semi-persistent CSI' with HARQ-ACK 1 or HARQ-ACK 0 in the PUSCH.

When HARQ-ACK 1, HARQ-ACK 0, aperiodic CSI, and/or semi-persistent CSI are multiplexed, UCIs having the same priority index may be generated as one codeword. A priority index of aperiodic CSI may be indicated by UL-DCI, and a priority index of semi-persistent CSI may be indicated by UL-DCI or RRC signaling. When CSI is divided into a CSI part1 and a CSI part2, HARQ-ACK and CSI part1 may be generated as one codeword, and CSI part2 may be generated as another codeword. Alternatively, HARQ-ACK and CSI may be generated as different codewords.

UL-DCI may indicate to the terminal that a TB is not transmitted. In this case, both HARQ-ACK 1 and HARQ-ACK 0 may be multiplexed together with aperiodic CSI or semi-persistent CSI. The reason is that, when Method 1.4-7 is followed, an encoding chain allocated to a TB by the terminal may be allocated to the CSI. 'CSI and HARQ-ACK' or 'CSI, HARQ-ACK, and TB' may be multiplexed in the PUSCH. In this case, a code rate applied to the case of 'periodic CSI and semi-persistent CSI' and a code rate applied to the case of 'aperiodic CSI and semi-persistent CSI' may be indicated to the terminal in different manners.

A procedure for simultaneous transmission of PUSCH and PUCCH after performing the procedure 2-1 will be described. In order to support simultaneous transmission of PUSCH and PUCCH, simultaneous transmission of PUSCH and PUCCH may be configured to the terminal by RRC signaling. The PUSCH and PUCCH may correspond to different priority indexes, the PUSCH and PUCCH may be transmitted in different serving cells, and the terminal may assume that the serving cells support inter-band carrier aggregation (CA) in different bands. After the procedure 1 ends, the terminal may compare a priority of PUCCH 1 (e.g., high priority (HP)), a priority of PUSCH 0 (e.g., low priority (LP)), and a priority of TB (e.g., HP or LP). The terminal may generate one ULCH by selecting or dropping some of PUCCH 1, PUSCH 0, and TB.

When the procedure 2-1 ends, the terminal may multiplex UCI 1 and UCI 0 in a HP PUCCH 1 and transmit the HP PUCCH 1. Thereafter, the terminal may perform the procedure 2-2, which is a multiplexing procedure for a PUSCH corresponding to the TB. Simultaneous transmission of PUSCH and PUCCH may be configured to the terminal by RRC signaling. In this case, the terminal may perform a multiplexing procedure or a simultaneous transmission procedure for the PUSCH and the PUCCH 1 according to the priority of the PUSCH corresponding to the TB (e.g., LP PUSCH 0 or HP PUSCH 1).

When the PUSCH is a PUSCH 0, simultaneous transmission of PUSCH 0 and PUCCH 1 may be allowed. When the PUSCH is a PUSCH 1, simultaneous transmission of PUSCH 1 and PUCCH 1 may not be allowed. In this case, a multiplexing procedure for PUSCH 1 and PUCCH 1 may be performed. If the above-described condition for simultaneous transmission is not satisfied, the PUCCH may be multiplexed in the PUSCH, and the PUSCH may be transmitted.

Method 1.4-8: The simultaneous transmission procedure for PUSCH 0 and PUCCH 1 in which HP UCI and LP UCI are multiplexed may be performed, and the multiplexing procedure for PUSCH 1 and PUCCH 1 in which HP UCI and LP UCI are multiplexed may be performed.

A method of dropping some of codewords when the number of encoding chains exceeds a boundary value will be described. Aperiodic CSI reporting may be divided into CSI part1 and CSI part2. If the number of encoding chains is insufficient, CSI part2 may be dropped. The terminal may allocate encoding chains to the respective UCI types according to a predetermined order for UCI to be multiplexed, and may drop UCI types to which the encoding chains are not allocated. HARQ-ACK 1, HARQ-ACK 0, aperiodic CSI part1, and/or aperiodic CSI part2 may be considered. DCI may indicate to the terminal that an aperiodic CSI reporting has a HP. If three coding chains are available, one of the three encoding chains may be dropped.

Method 1.4-9: The terminal may compare priorities of HP UCI and LP UCI, and may use the number of encoding chains as a criterion for selecting/dropping the HP UCI and/or LP UCI.

In an example, the terminal may drop aperiodic CSI part2, and may multiplex HARQ-ACK 1, HARQ-ACK 0, and aperiodic CSI part1 in a PUCCH. In the case of dropping the aperiodic CSI part2, since the base station cannot know the entire CSI report, there may be no meaning for the terminal to transmit the CSI report. In a proposed method, HARQ-ACK and CSI part1 having the same priority may be jointly encoded. An operation of jointly encoding HARQ-ACK and CSI part1 having different priorities may not be supported.

Method 1.4-10: HARQ-ACK 0 may be dropped, and HARQ-ACK 1, aperiodic CSI part1, and aperiodic CSI part2 may be multiplexed in a PUCCH. Thereafter, a multiplexing procedure for PUCCH and PUSCH may be performed.

When Method 1.4-10 is applied in the PUCCH transmission procedure, HARQ-ACK 1 may be encoded according to the HARQ-ACK encoding operation specified in the release-15, aperiodic CSI part1 may be encoded according to the CSI part1 encoding operation specified in the release-15, and aperiodic CSI part2 may be encoded according to the CSI part2 encoding operation specified in the release-15. Here, the encoding operation may refer to a rate matching procedure, a puncturing procedure, and/or an RE mapping procedure.

The HARQ-ACK 0 whose transmission is canceled by the terminal may be retransmitted later according to an indication of the base station. The corresponding HARQ-ACK 0 may be reported to the base station through a TB retransmission procedure, a HARQ codebook retransmission procedure, or a specific HARQ codebook transmission procedure. A TB be scheduled. Alternatively, a TB may not be scheduled. Methods 1.4-9 and 1.4-10 may be applied prior to performing the procedure 2-2. The terminal having performed both the procedures 2-1 and 2-2 may perform a PUSCH transmission operation, a PUCCH transmission operation, or a simultaneous PUSCH and PUCCH transmission operation. Reception of an uplink cancellation indicator (ULCI) (e.g., DCI format 2_4) may be configured to the terminal.

The ULCI may not cancel a PUCCH and all ULCHs related to initial access. The ULCI may cancel PUSCH 0 or PUSCH 1. Even when PUSCH 0 includes UCI, PUSCH 0 may be canceled by ULCI. In UCI, only LP UCI may be multiplexed. In a proposed method, even in PUSCH 0, UCI 1 and/or UCI 0 may be multiplexed. When a resource region indicated by the ULCI overlaps a resource region of PUSCH 0, the terminal may cancel all or part of PUSCH 0. PUSCH 0 including UCI 1 may also be canceled by the ULCI. In a proposed method, when PUSCH 0 includes UCI 1, PUSCH 0 including UCI 1 may be regarded as PUSCH 1. The terminal may not cancel PUSCH 0 even when ULCI is received.

Method 1.4-11: When ULCI is received from the base station, the terminal may not cancel PUSCH 0 including UCI 1.

1.4.2 Another Exemplary Embodiment of Multiplexing of PUCCHs

A priority index for a PUCCH or PUSCH transmitted by the terminal may be indicated. Scheduling DCI may indicate the priority index to the terminal. Alternatively, RRC signaling may configure the priority index to the terminal. For example, when URLLC traffic is supported, the priority index may be indicated or configured to 1. When eMBB traffic is supported, the priority index may be indicated or configured to 0. The above-described simultaneous transmission may be interpreted as a case of having the same priority index in consideration of the RS group (or Tx panel). If priority indexes are explicitly different, a condition for simultaneous transmission may be different.

RRC signaling and/or DCI may indicate or configure simultaneous transmission of PUCCH and PUSCH to the terminal. If the terminal can transmit the PUCCH and the PUSCH at the same time, the PUCCH and the PUSCH may be transmitted in different serving cells. If the terminal has only one active serving cell, the PUCCH and PUSCH may be multiplexed. UCI may be multiplexed in the PUSCH. If the terminal can transmit two ULCHs (e.g., PUCCH and PUSCH) at the same time, the terminal can transmit PUCCHs at the same time. Whether to perform the above-described operation may be determined based on the capability of the terminal. The base station may configure the simultaneous transmission operation to the terminal by using separate RRC signaling.

Method 1.4-12: The terminal may perform simultaneous transmission of PUCCHs.

The PUCCHs may be respectively transmitted in different serving cells. Alternatively, the PUCCHs may be transmitted in the same serving cell. The serving cell may be a PCell (e.g., SpCell, PSCell, PUCCH-SCell) or a PUCCH serving cell. When the PUCCHs are transmitted in different serving cells, the PUCCHs may be transmitted by the same Tx panel or different Tx panels.

Method 1.4-13: In Method 1.4-12, simultaneous transmission for PUCCHs corresponding to different priority indexes may be performed.

The HP DCI and/or the LP DCI may indicate to the terminal information indicating whether to perform a multiplexing operation with UCI having different priority indexes. For example, when a PDSCH is allocated by the HP DCI (or LP DCI) and HARQ-ACK 1 (or HARQ-ACK 0) is transmitted, a multiplexing operation with UCI 0 (or UCI 1) may be indicated.

It may be preferable that a PUCCH resource in which UCI 1 and UCI 0 are multiplexed has a high priority. Therefore, it may be preferable that multiplexing-related information is derived from information (e.g., DCI) for allocating UCI 1. Since a DCI format that the LP DCI can have and a DCI format that the HP DCI can have are not distinguished, the LP DCI may also indicate to the terminal the multiplexing operation of UCI 1 and UCI 0. In this case, the terminal may interpret that UCI 1 and UCI 0 are multiplexed in a PUCCH indicated by the last received HP DCI.

DCI (or RRC signaling) for allocating UCI 1 may indicate to the terminal that multiplexing operation with UCI 0 is not performed. Each of the PUCCHs may include only UCI 1. Alternatively, each of the PUCCHs may include only UCI 0. A serving cell in which the PUCCH is transmitted may be explicitly indicated by RRC signaling or DCI. For example, when it is assumed that two serving cells are activated, the terminal may select a PUCCH serving cell indicated by DCI. Each of the PUCCHs may be determined after the multiplexing procedure for the PUCCH resources having the same priority index is performed. PUCCH 1 may correspond to a priority index 1 and may be transmitted in a serving cell associated with the priority index 1. PUCCH 0 may correspond to a priority index 0 and may be transmitted in a serving cell associated with the priority index 0. A PUCCH 1 resource may be determined by a second PUCCH-config (or second PUCCH resource set), and a PUCCH 0 resource may be determined by a first PUCCH-config (or first PUCCH resource set).

Figure 12:
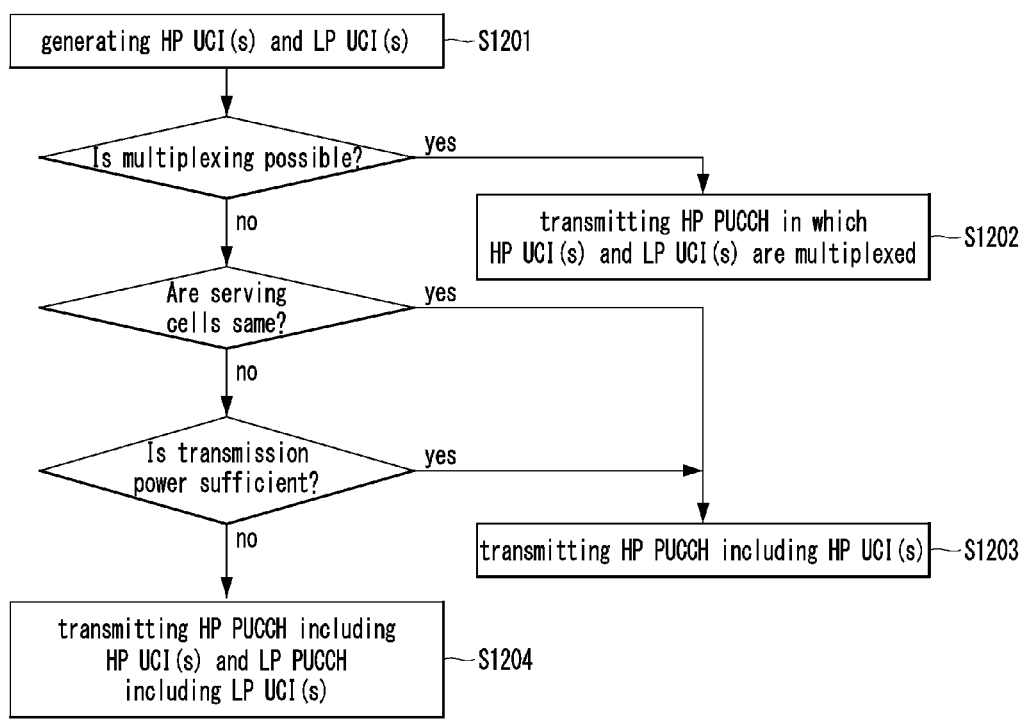
FIG. 12 is a flowchart illustrating a first exemplary embodiment of a method of transmitting PUCCHs when UCI 1 and UCI 0 occur.

FIG. 12 is a flowchart illustrating a first exemplary embodiment of a method of transmitting PUCCHs when UCI 1 and UCI 0 occur.

Referring to FIG. 12, when the simultaneous transmission operation for PUCCHs is supported, the terminal may generate HP UCI(s) and LP UCI(s) (S1201). If multiplexing of the HP UCI(s) and the LP UCI(s) is possible, the terminal may multiplex the HP UCI(s) and LP UCI(s) in an HP PUCCH and transmit the HP PUCCH (S1202). If multiplexing of the HP UCI(s) and the LP UCI(s) is not possible, the terminal may determine whether a serving cell of the HP PUCCH and a serving cell of an LP PUCCH are the same. When the serving cell of the HP PUCCH and the serving cell of the LP PUCCH are the same, the terminal may transmit the HP PUCCH having the HP UCI (S1203). When the serving cell of the HP PUCCH and the serving cell of the LP PUCCH are different, the terminal may determine whether a transmission power is sufficient. If the transmission power is sufficient, the terminal may transmit the HP PUCCH having the HP UCI (S1203). If the transmission power is insufficient, the terminal may transmit the LP PUCCH having the LP UCI and the HP PUCCH having the HP UCI (S1204).

Meanwhile, the terminal may transmit at least a PUCCH 1. The PUCCH 1 may include only UCI 1. Alternatively, the PUCCH 1 may include both UCI 1 and UCI 0. When it is indicated to the terminal that UCI 1 and UCI 0 are not multiplexed, the terminal may transmit UCI 1 on the PUCCH 1 and may determine whether UCI 0 may be transmitted on a PUCCH 0. If the transmission power is sufficient for the terminal, the PUCCH 1 may be transmitted in a serving cell having an index 1 (e.g., priority index 1), and the PUCCH 0 may be transmitted in a serving cell having an index 0 (e.g., priority index 0).

Thereafter, the terminal may perform a simultaneous transmission procedure in consideration of the Tx panel (or RS group) to transmit the PUCCH 1 and/or PUCCH 0. Here, an independent preprocessing operation may be applied to each of the PUCCH 0 and PUCCH 1. Each of the PUCCH 0 and PUCCH 1 may have an independent beam. When the terminal transmits two PUCCHs at the same time, the same antenna port 2000 may be applied to the PUCCH 0 and PUCCH 1. The preprocessing operation or beam applied by the terminal may be configured by RRC signaling (e.g., PUCCH-SpatialRelationInfo). The terminal may apply values configured by RRC signaling to each serving cell. PUCCHs simultaneously transmitted by the terminal may be transmitted using the same Tx panel or in different Tx panels.

Method 1.4-14: When two or more priority indexes are considered, the simultaneous transmission operation of PUCCHs considering the priority indexes may be considered first, and then the simultaneous transmission operation of PUCCHs considering the Tx panels may be considered.

1.4.3 Another Exemplary Embodiment of Multiplexing of PUSCH and PUCCH

In order to support traffic for two or more priority indexes for the terminal, a multiplexing procedure may be supported not only in a PUCCH but also in a PUSCH. UCI corresponding to a priority index 1 may be expressed as UCI 1, and UCI corresponding to a priority index 0 may be expressed as UCI 0. A UL-SCH (or TB) may also have a priority index expressed by a TB 1 and a TB 0. The base station may transmit information indicating whether UCI 1 and UCI 0 are multiplexed to the terminal by using RRC signaling and/or DCI. In addition, the base station may transmit information indicating whether PUCCH and PUSCH are multiplexed to the terminal by using RRC signaling and/or DCI. The terminal may receive the above-described information from the base station.

Method 1.4-15: A PUCCH on which UCI 1 and UCI 0 are transmitted may be determined, and a PUSCH on which TB 1 and TB 0 are transmitted may be determined.

The terminal may perform procedures for PUCCH and PUSCH, respectively. Here, a PUCCH 1 (or PUCCH 1 and PUCCH 0) may be determined, and a PUSCH 1 (or PUSCH 1 and PUSCH 0) may be determined. The MAC layer of the terminal may deliver only one TB to the PHY layer of the terminal. Even when the MAC layer of the terminal delivers two TBs to the PHY layer of the terminal, only TB 1 may be transmitted according to a procedure in the PHY layer. The method considering one TB may be easily extended and applied. In Table 1 below, the operation of the terminal (e.g., the operation of multiplexing ULCHs) may be classified into four cases.

TABLE 1

|  | One of UCI 1 and UCI 0 is selected | UCI 1 and UCI 0 are multiplexed |
|---|---|---|
| PUCCH and PUSCH are simultaneously transmitted | Case 1 | Case 2 |
| One of PUCCH and PUSCH is selected | Case 3 | Case 4 |

In Case 1, UCI 1 and UCI 0 may not be multiplexed, and simultaneous transmission for PUCCH and PUSCH may be allowed. In this case, the PUCCH 1, PUCCH 0, and PUSCH may be considered. The PUCCH 1 and PUCCH 0 may be transmitted in different serving cells (e.g., serving cell index1, serving cell index0). The serving cell in which a PUSCH is transmitted may be the same as or different from the serving cell(s) in which the PUCCH 1 and PUCCH 0 are transmitted. The terminal may transmit the PUCCH 1, PUCCH 0, and PUSCH in three serving cells. One channel may be transmitted in one serving cell. When two serving cells are the same, the terminal may multiplex UCI and TB in the same serving cell and transmit the multiplexed UCI and TB. For example, the terminal may transmit the PUCCH 1 and PUSCH in different serving cells, and TB and UCI 0 may be multiplexed in the PUSCH. For another example, the terminal may transmit the PUCCH 0 and PUSCH in different serving cells, and TB and UCI 1 may be multiplexed in the PUSCH. Thereafter, the terminal may perform a procedure considering Tx panels.

In Case 2, UCI 1 and UCI 0 may be multiplexed, and simultaneous transmission for PUCCH and PUSCH may be allowed. In this case, the PUCCH 1 and PUSCH may be considered. In an example, the terminal may determine one PUCCH 1 in which UCI 1 and UCI 0 are multiplexed. The PUCCH 1 and PUSCH may be transmitted in the same serving cell or in different serving cells. The terminal may transmit PUCCH 1 and PUSCH in two serving cells. When the serving cells are the same, the terminal may transmit UCI 1, UCI 0, and TB in the same serving cell by multiplexing them. Thereafter, the terminal may perform a procedure considering Tx panel(s). In another example, the terminal may consider the PUSCH 1 in which UCI 1 is multiplexed and the PUCCH 0 to which UCI 0 is mapped. When the PUSCH 1 and PUCCH 0 are scheduled in different serving cells, the terminal may simultaneously transmit the PUSCH 1 and PUCCH 0. The terminal may consider the PUSCH 0 in which UCI 0 is multiplexed and the PUCCH 1 to which UCI 1 is mapped. In different serving cells, the terminal may transmit the PUSCH 0 and PUCCH 1 simultaneously.

In Case 3, UCI 1 and UCI 0 may not be multiplexed, and simultaneous transmission for PUCCH and PUSCH may not be allowed. In this case, the PUCCH 1, PUCCH 0, and PUSCH may be considered. The operation of the terminal may be subdivided. Since the PUSCH and PUCCH are not transmitted simultaneously, UCI and TB may be multiplexed in the PUSCH, and the corresponding PUSCH may be transmitted. UCI 1 and UCI 0 may not be multiplexed. For example, the terminal may multiplex UCI having the same priority as a TB and the corresponding TB in a PUSCH, and may transmit the corresponding PUSCH. In this case, another UCI (e.g., UCI having a priority different from that of TB) may not be transmitted. As another example, the terminal may define a TB and a specific priority (e.g., HP), may multiplex UCI 1 having the specific priority and the corresponding TB in the PUSCH, and may transmit the corresponding PUSCH. In this case, UCI 0 may not be transmitted. Thereafter, the terminal may perform a procedure considering Tx panel(s).

In Case 4, UCI 1 and UCI 0 may be multiplexed, and simultaneous transmission for PUCCH and PUSCH may not be allowed. In this case, the PUCCH 1, PUCCH 0, and PUSCH may be considered. The terminal may determine one PUCCH by multiplexing UCI 1 and UCI 0. One PUCCH may be the PUCCH 1. Since the PUCCH 1 and PUSCH cannot be transmitted simultaneously, both UCI 1 and UCI 0 may be multiplexed in the PUSCH. Alternatively, some UCIs may be multiplexed in the PUSCH. The latter method may be further subdivided. For example, TB and UCI 1 may be multiplexed in the PUSCH, the corresponding PUSCH may be transmitted, and UCI 0 may not be transmitted. As another example, UCI having the same priority as a TB and the corresponding TB may be multiplexed in the PUSCH, the corresponding PUSCH may be transmitted, and other UCIs may not be transmitted.

In the above-described cases, when the terminal performs simultaneous transmission, it may be preferable to secure a transmission power necessary for PUCCH or PUSCH. Thereafter, the remaining transmission power may be allocated as a transmission power required for PUCCH 0. The base station may configure Case 1 and Case 3 to the terminal using RRC signaling. A case in which the above-described operation is supportable may be limited to a case in which serving cells in which the PUCCH and PUSCH are transmitted are different from each other. When the serving cells belong to different frequency bands (e.g., inter-band CA), the above-described RRC signaling operation may be supported. The above-described RRC signaling may be received by the terminal.

When the inter-band CA is configured, the serving cell of PUCCH and the serving cell of PUSCH may belong to different timing advance groups (TAGs). In this case, a time of multiplexing ULCHs may be configured in consideration of the first symbol of the PUSCH, the first symbol of the PUCCH, and different TAs.

1.5 Support of Simultaneous UL Transmission(s) Considering Sidelink

A case in which two or more scenarios are supported by one terminal may be considered. When both device-to-device communication and communication between the terminal and the base station are supported, the terminal may perform direct communication in a resource scheduled by the base station. The terminal may communicate with the base station to perform URLLC communication. This may mean a scenario in which the terminal supports both sidelink and IIoT.

The terminal may perform simultaneous transmission of PUCCH and PUSCH, but the above-described operation may be allowed in a limited scenario. In another scenario, the PUCCH may not be transmitted, and UCI may be transmitted by being multiplexed in the PUSCH. In a limited scenario, the PUCCH and PUSCH may correspond to different priority indexes, and a serving cell to which the PUCCH is to be transmitted and a serving cell to which the PUSCH is to be transmitted may belong to different frequency bands (e.g., inter-band).

When the terminal is configured to perform the sidelink mode 1 resource allocation, the base station may allocate a time resource and a frequency resource to the terminal. The terminal may transmit a physical sidelink control channel (PSCCH) and a physical sidelink shared channel (PSSCH) to another terminal by using the allocated resources. The terminal may receive a decoding result of the PSSCH. Alternatively, the terminal may assume that the decoding result of the PSSCH is a specific value. The terminal may generate HARQ-ACK, which is the decoding result of the PSSCH, and may feedback the HARQ-ACK to the base station. In this case, the terminal may generate a sidelink HARQ codebook using one or more HARQ-ACK bits, and may transmit the sidelink HARQ codebook to the base station using a PUSCH or PUCCH.

In the transmission procedure of the sidelink HARQ codebook, the sidelink HARQ codebook may be multiplexed with other UCI type(s) in the PUSCH. Considering all PUCCHs overlapping in time, the terminal may transmit UCIs on one PUCCH. For transmission of the sidelink HARQ codebook, the terminal may not multiplex the sidelink HARQ codebook with Uu UCI. The Uu UCI may include an SR for PUSCH transmission, HARQ-ACK for a PDSCH, periodic CSI, semi-persistent CSI, aperiodic CSI, and/or LRR. The base station may perform scheduling so that the sidelink HARQ codebook is not transmitted in a time resource in which Uu UCI is to be transmitted. That is, the base station may perform scheduling so that Uu UCI and the sidelink HARQ codebook are not transmitted on the same PUCCH and/or PUSCH.

When the sidelink HARQ codebook and an HP PUSCH (e.g., PUSCH having the priority index 1) overlap in the time domain, the terminal may drop the transmission of the sidelink HARQ codebook. That is, the sidelink HARQ codebook may not be multiplexed in the HP PUSCH. The terminal may transmit only the HP PUSCH. When the sidelink HARQ codebook and an LP PUSCH (e.g., PUSCH having the priority index 0) overlap in the time domain, the terminal may multiplex the sidelink HARQ codebook in the LP PUSCH and transmit the LP PUSCH. In this case, Uu UCI may not be included in the LP PUSCH.

The terminal may support all of inter-band CA, sidelink communication, and URLLC communication. In this case, since the terminal can perform simultaneous transmission of PUSCH and PUCCH, multiplexing with UCI or sidelink HARQ codebook and/or dropping may not be considered. In order to support simultaneous transmission of PUSCH and PUCCH, the terminal may determine whether a serving cell to which a PUSCH is to be transmitted and a serving cell to which the sidelink HARQ codebook is to be transmitted belong to the same frequency band.

When the serving cell to which the PUSCH is to be transmitted and the serving cell to which the sidelink HARQ codebook is to be transmitted belong to different frequency bands, the terminal may identify whether the serving cell to which Uu UCI is to be transmitted is within the frequency band to which the serving cell to which the sidelink HARQ codebook is to be transmitted belongs. This may have a purpose of avoiding the multiplexing of Uu UCI and the sidelink HARQ codebook. The base station may perform scheduling so that the serving cell to which Uu UCI is to be transmitted and the serving cell to which the sidelink HARQ codebook is to be transmitted do not belong to the same frequency band. Even if the serving cell to which the PUSCH is to be transmitted and the serving cell to which the sidelink HARQ codebook is to be transmitted belong to the same frequency band, the base station may indicate the priority of the sidelink HARQ codebook to be higher than that of Uu UCI, so that the sidelink HARQ codebook is selected by the terminal. Here, in the former method, a procedure of identifying whether the serving cells are the same may be performed by the terminal, and in the latter method, the procedure of identifying whether the serving cells are the same may not be performed by the terminal.

Method 1.5-1: When the terminal performs simultaneous transmission, for a PUCCH on which the sidelink HARQ codebook is to be transmitted and a PUSCH in which the sidelink HARQ codebook is multiplexed with a TB, it may be considered that the TB and Uu UCI are multiplexed in the PUSCH or PUSCH for which simultaneous transmission is allowed.

When the terminal transmits a PUCCH in one frequency band and a sidelink HARQ codebook is included in the PUCCH, a PUSCH transmitted in a different frequency band may include a combination of at least one of a priority, TB, or Uu UCI.

Figure 13:
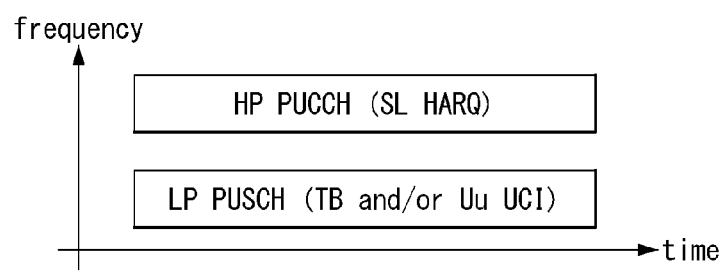
FIG. 13 is a conceptual diagram illustrating a first exemplary embodiment of a method for simultaneous transmission of PUCCH and PUSCH, to which a sidelink HARQ codebook is involved.

FIG. 13 is a conceptual diagram illustrating a first exemplary embodiment of a method for simultaneous transmission of PUCCH and PUSCH, to which a sidelink HARQ codebook is involved.

Referring to FIG. 13, the terminal may transmit an HP PUCCH in a frequency band 1 and an LP PUSCH in a frequency band 2. A sidelink HARQ codebook may be included in the HP PUCCH, and a TB and/or Uu UCI may be included in the LP PUSCH.

Figure 14:
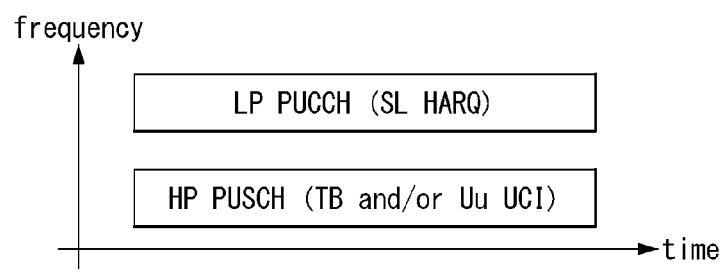
FIG. 14 is a conceptual diagram illustrating a second exemplary embodiment of a method for simultaneous transmission of PUCCH and PUSCH, to which a sidelink HARQ codebook is involved.

FIG. 14 is a conceptual diagram illustrating a second exemplary embodiment of a method for simultaneous transmission of PUCCH and PUSCH, to which a sidelink HARQ codebook is involved.

Referring to FIG. 14, the terminal may transmit an LP PUCCH in a frequency band 1 and may transmit an HP PUSCH in a frequency band 2. A sidelink HARQ codebook may be included in the LP PUCCH, and a TB and/or Uu UCI may be included in the HP PUSCH.

When the terminal transmits a PUSCH in one frequency band and a sidelink HARQ codebook is included in the PUSCH, a PUCCH transmitted in another frequency band may include Uu UCI.

Figure 15:
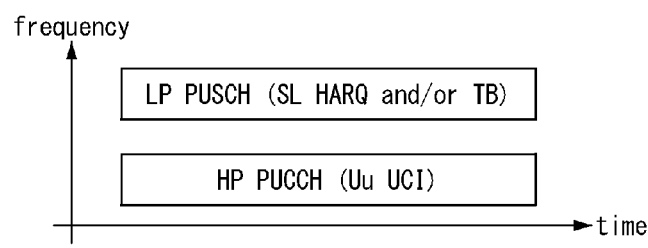
FIG. 15 is a conceptual diagram illustrating a third exemplary embodiment of a method for simultaneous transmission of PUCCH and PUSCH, to which a sidelink HARQ codebook is involved.

FIG. 15 is a conceptual diagram illustrating a third exemplary embodiment of a method for simultaneous transmission of PUCCH and PUSCH, to which a sidelink HARQ codebook is involved.

Referring to FIG. 15, the terminal may transmit an LP PUSCH in a frequency band 1 and may transmit an HP PUCCH in a frequency band 2. A sidelink HARQ codebook and/or TB may be included in the LP PUSCH, and Uu UCI may be included in the HP PUCCH.

A priority of the sidelink HARQ codebook may be distinguished from a sidelink priority and a sidelink priority index. Assuming that the priority of the sidelink HARQ codebook is determined, the priority index may be regarded as 0 or 1 through comparison between a boundary value indicated by RRC signaling to the terminal and the priority of the sidelink HARQ codebook. The priority of the sidelink HARQ codebook may follow the highest priority among priorities of sidelink HARQ-ACK bits constituting the sidelink HARQ codebook. When the priority index is 0, the PUCCH may be regarded as an LP PUCCH. When the priority index is 1, the PUCCH may be regarded as an HP PUCCH.

Chapter 2 Group-Common DCI Reception Method

Considering a communication system operating in the FR2, a control channel or a data channel may be transmitted/received based on beam(s). The terminal and the base station (or TRP) may have one or more antenna panels, and in the technical specifications, the antenna panel may be expressed by a QCL relation or a TCI state index.

Search space sets received by the terminal may be classified into various types. For example, the search space set may be classified into a Type 0-PDCCH CSS set, a Type 0A-PDCCH CSS set, a Type 1-PDCCH CSS set, a Type 2-PDCCH CSS set, and a Type 3-PDCCH CSS set (e.g., Type 3 CSS). set), and a USS set. In the Type 3 CSS set, group-common DCI may be searched.

The terminal may perform a transmission/reception of control channels and data channels with multiple TRPs. A TCI state index for multiple TRPs may be appropriately indicated, and the terminal may not be able to distinguish between a single TRP and multiple TRPs. Alternatively, the terminal may implicitly distinguish between a single TRP and multiple TRPs. A CORESET pool may be configured to the terminal by RRC signaling. Two or more pieces of QCL information may be derived from the TCI state index applied when receiving a PDCCH and/or PDSCH. Two or more pieces of QCL information may be derived from an SRI or TCI state index applied when transmitting a PUSCH and/or PUCCH. Here, one piece of QCL information may correspond to modulation for one radio channel.

Group-common DCI may include information transmitted to a plurality of terminals. For example, in the NR system, a DCI format 2_0 may represent a slot format indicator (SFI) or a channel occupancy time (COT). A DCI format 2_1 may represent a downlink preemption indication (DLPI). A DCI format 2_2 may represent a transmit power control (TPC) PUSCH/PUCCH. A DCI format 2_3 may represent a TPC SRS. A DCI format 2_4 may represent an uplink cancellation indication (ULCI). The above-described indications and/or information may be configured in other DCI formats. Information on a plurality of terminals or a plurality of serving cells may be configured as one information word (e.g., information bits), and one information word may be included in the GC-DCI. The information word may be generated as one codeword through a common encoding operation. Information useful to a specific terminal may correspond to a part of the information word, and a position of the useful information within the information word may be indicated to the terminal by RRC signaling.

In the FR2, the GC-DCI may be transmitted based on beam(s). The beam(s) respectively formed by Tx panel(s) and Rx panel(s) may be properly aligned, and it may be preferable for a good quality (e.g., SINR) to be obtained in the Rx panel(s). In a DL transmission procedure, the beam(s) of the Tx panel(s) of the TRP and the beam(s) of the Rx panel(s) of the terminal may be paired. In a UL transmission procedure, the beam(s) of the Tx panel(s) of the terminal and the beam(s) of the Rx panel(s) of the TRP may be paired. The TRP may refer to a beam. Depending on the use of the GC-DCI, the TRP may refer to a Tx panel or an Rx panel.

2.1 Method for Supporting a GC-PDCCH in Multiple TRPs

A specific terminal may dynamically receive scheduling information from a plurality of TRPs, and another terminal may receive scheduling information from one TRP. A specific terminal may transmit/receive URLLC traffic, another terminal may transmit/receive eMBB traffic, and yet another terminal may transmit/receive both eMBB traffic and URLLC traffic.

According to specific scheduling, interference may occur between a terminal transmitting and receiving URLLC traffic and a terminal transmitting and receiving eMBB traffic. According to another scheduling, interference between a terminal transmitting and receiving URLLC traffic and a terminal transmitting and receiving eMBB traffic may be insignificant. That is, the corresponding interference may be ignored.

GC-DCI may be received from one or more CORESET pools. The GC-DCI may have information to be received by two or more terminals, and a terminal may transmit/receive information to and from two or more TRPs. One terminal receiving the GC-DCI may require information on only one TRP, and another terminal receiving the GC-DCI may require information on both TRPs. This may be applied to the same serving cell. When two or more serving cells are configured, the GC-DCI may include information for each serving cell.

Method 2.1-1: For a serving cell, information may be obtained from only one position within the GC-DCI.

The GC-DCI may include information on only one TRP. Alternatively, the GC-DCI may include information on TRPs. The information on the TRPs may be concatenated with each other, and may be expressed as information having a length of two or more times based on a starting position. The starting position may be set by RRC signaling, and information on the length may be explicitly configured by RRC signaling. Alternatively, the information on the length may be implicitly derived by RRC signaling.

Method 2.1-2: The number of TRPs (or the number of beams, the number of panels) observed by the terminal may be indicated to the terminal by RRC signaling. Alternatively, the number of TRPs observed by the terminal (or the number of beams, the number of panels) may be implicitly derived.

Figure 16:
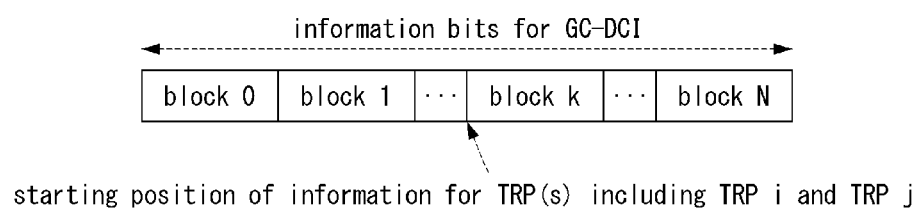
FIG. 16 is a conceptual diagram illustrating a first exemplary embodiment of a method for identifying information on a plurality of TRPs at one position within GC-DCI.

FIG. 16 is a conceptual diagram illustrating a first exemplary embodiment of a method for identifying information on a plurality of TRPs at one position within GC-DCI.

Referring to FIG. 16, all information necessary for the terminal may be concatenated and may be mapped to one position. Method 2.1-2 may be extended, and even when two or more serving cells are configured for the terminal, the information may be identified from the same position.

Method 2.1-2: In Method 2.1-1, the information may be mapped within the GC-DCI in the order of TRPs (or beams, RS groups, panels), and then the information may be mapped within the GC-DCI in the order of serving cell indexes.

Method 2.1-3: The method shown in FIG. 17 below may be applied.

Figure 17:
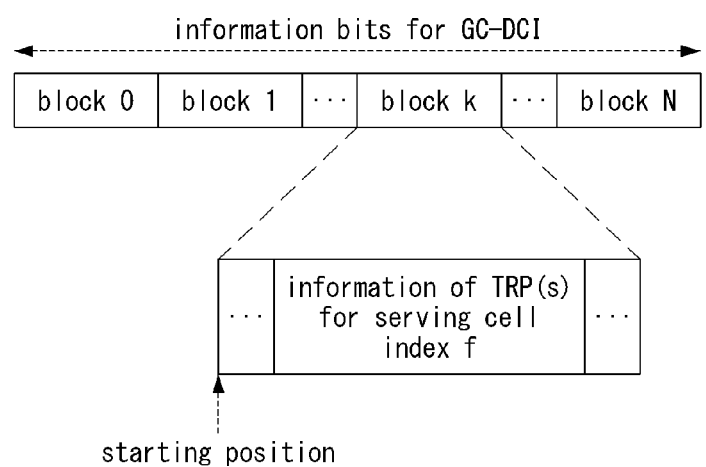
FIG. 17 is a conceptual diagram illustrating a first exemplary embodiment of a method of identifying information on a plurality of serving cells and a plurality of TRPs at one position within GC-DCI.

FIG. 17 is a conceptual diagram illustrating a first exemplary embodiment of a method of identifying information on a plurality of serving cells and a plurality of TRPs at one position within GC-DCI.

Referring to FIG. 17, information on TRPs belonging to the same serving cell may be located as being concatenated with each other. Based on a combination of Method 2.1-2 and Method 2.1-3, the terminal may identify the position of information on a required serving cell index and a required TRP within the GC-DCI. Alternatively, the order of the serving cell indexes and TRPs (or beams, RS groups, panels) may be reversed. That is, the information may be mapped within the GC-DCI in the order of the serving cell indexes, and then the information may be mapped within the GC-DCI in the order of the TRPs. According to the above-described method, the length of a block in the GC-DCI may be determined according to Method 2.1-2. According to another method (e.g. Method 2.1-4), the length of the same block may be identified at each of different positions.

Method 2.1-4: According to the number of TRPs (or beams, RS groups, panels), two or more positions for one serving cell may be informed to the terminal.

The GC-DCI may include information on two or more TRPs. The terminal may receive the position(s) within the GC-DCI through RRC signaling. The RRC signaling may indicate to the terminal two or more positions for the GC-DCI. According to Method 2.1-4, a starting position in which information for each TRP is located may be indicated to the terminal. This operation may be illustrated in FIG. 18 below.

Figure 18:
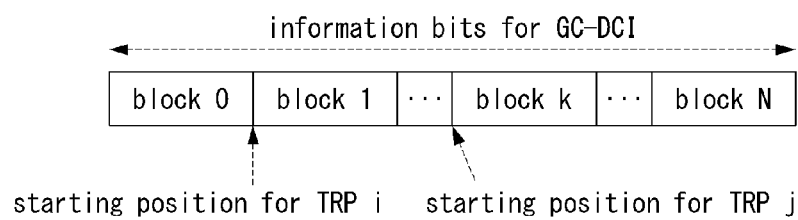
FIG. 18 is a conceptual diagram illustrating a first exemplary embodiment of a method for acquiring information at two or more positions within GC-DCI.

FIG. 18 is a conceptual diagram illustrating a first exemplary embodiment of a method for acquiring information at two or more positions within GC-DCI.

Referring to FIG. 18, the base station may indicate to the terminal a starting position of information on each of a TRP i and a TRP j within GC-DCI by using RRC signaling. In an example, the terminal may receive from the base station an RRC parameter indicating the starting position of the information for each TRP. The above-described methods may be applied to the DCI format 2_2 and/or format 2_3.

2.2 DLPI Reception Method

When puncturing of an eMBB PDSCH occurs by transmission of a URLLC PDSCH, the base station may transmit a downlink preemption indicator (DLPI) to the terminal. The DLPI may be transmitted to the terminal through GC-DCI. For example, the terminal may receive a DCI format 2_1 including the DLPI.

The DLPI may be a bitmap indicating a puncturing pattern for a reference numerology in a given serving cell. The terminal may interpret the bitmap (e.g., DLPI) according to a method defined by the technical specification. One bit within the bitmap may indicate a time and frequency resource. The terminal may compare a resource indicated by scheduling information of the PDSCH with the resource indicated by the DLPI. When the resource indicated by the scheduling information and the resource indicated by the DLPI overlap, the terminal may not perform a decoding operation on the PDSCH.

The DLPI may be given differently for each beam or TRP. A URLLC PDSCH may be transmitted through each TRP or beam, and an eMBB PDSCH may be transmitted in different TRPs or beams. For the same time resource and frequency resource, puncturing for one beam may occur and puncturing for another beam may not occur. If it is determined that interference does not occur between beams, the base station may express the puncturing pattern differently.

The puncturing may be performed in a Tx panel (or Tx beam) of the base station (or TRP). A terminal receiving an eMBB PDSCH in a Tx beam of the base station may receive the DLPI. On the other hand, puncturing may not occur in a terminal receiving the eMBB PDSCH in another Tx beam. A method for allowing the terminal to interpret the DLPI by limiting a scheduled Tx beam may be required. A terminal may have a plurality of Rx panels (or a plurality of Rx beams).

A beam management procedure may be performed before scheduling of a PDSCH. The base station (or TRP) may determine a Tx beam, and information necessary for the terminal to determine an Rx beam may be included in scheduling information. Since a DLPI may occur based on the Tx beam of the base station, the Rx beam of the terminal may be derived based on a TCI state index included in the scheduling information (e.g., DCI or RRC signaling). In addition, the TCI state index may be configured by RRC signaling to the terminal. Therefore, even when it is assumed that the Tx beam of the base station can be derived from the TCI state index, a different TCI state index may be required for each terminal in order to express the same Tx beam.

When the Tx beam of the base station is interpreted as a Tx panel, the DLPI may additionally include information that may implicitly inform the Tx panel as well as the bitmap. For example, it may be considered that an index of the Tx panel is included in the DLPI. In a method, a block constituting the DLPI may include the index of the Tx panel as well as the bitmap. Tx panel(s) utilized by the base station may be defined in the technical specification. In this case, the terminal receiving the DLPI may recognize the Tx panel and may identify whether the DLPI is applied. When the Tx panel scheduled for the terminal matches the Tx panel included in the DLPI, the terminal may compare a PDSCH region with the resource indicated by the bitmap of the DLPI.

It may be assumed that a Tx panel generates one Tx beam, but a different Tx beam may be used for each specific symbol(s). In this case, it may be preferable for one or more Tx panels to be represented. This may mean that information of a plurality of Tx panels is included, and overhead may increase. Since the DLPI is transmitted through GC-DCI, information for each terminal may not be included in the DLPI (e.g., GC-DCI). The DLPI (e.g., GC-DCI) may include information useful for a plurality of terminals. Information on the Tx panels may not be defined in the technical specifications.

In another method, as a method of representing a Tx panel or a Tx beam, an index applicable to a plurality of terminals may be introduced. For example, an SS/PBCH block index (e.g., SSB index) may be considered. An SSB index may indicate a Tx beam of the base station and/or an Rx beam of the terminal. The SSB index may be indicated to the terminal by RRC signaling. The SSB index, which is information common to terminals, rather than the index of the Tx panel used by the base station, may be included in the DLPI along with the bitmap.

Method 2.2-1: The DLPI may include an SSB index.

According to a TCI state index received by the terminal, a Tx beam estimated to be used by the base station may be derived. From the TCI state index, qcl-Type1 and qcl-Type2 may be derived, and an RS or SSB index that provides qcl-TypeA may be derived from qcl-Type1. When an RS is derived from qcl-Type 1, an SSB index providing fine time synchronization and fine frequency synchronization for the RS may be derived. If the above-described operation is repeated, the terminal may identify an SSB index x providing qcl-Type 1 associated with a PDSCH DM-RS.

The terminal may identify whether the SSB index included in the DLPI is identical to the index x. When the SSB index included in the DLPI is the same as the index x, the terminal may consider that puncturing has occurred in the same Tx beam as the SSB index x. When the SSB index included in the DLPI is different from the index x, the terminal may consider that puncturing has not occurred in the same Tx beam as the SSB index x.

Method 2.2-2: In Method 2.2-1, a block of the DLPI may include the bitmap and the SSB index.

If different Tx beams are used in a specific symbol(s), the DLPI may include a plurality of SSB indexes. When the DLPI includes SSB index(es), a block of the DLPI may include a plurality of SSB indexes. Alternatively, a separate block may include the SSB indexes, and puncturing may be determined based on a combination with the block configured to be referenced by the terminal.

According to another method, information on a change of the Tx beam may be transmitted instead of accurate information of the Tx beam in which puncturing occurs. Comparing this operation with Method 2.2-1, overhead generated as the DLPI includes a plurality of SSB indexes may be reduced.

Method 2.2-3: The DLPI may include information on the change of the Tx beam.

The change of the Tx beam may mean a change of the Tx panel (or Tx beam) of the base station (or TRP). Changing the Tx beam may mean not using the Tx beam (or Tx panel) planned to be used for the terminal in the scheduling step. The information on the change of the Tx beam may indicate changing of the beam or maintaining of the beam. The size of the information on the change of the Tx beam may be 1 bit. Since a plurality of Tx beams may be punctured, a plurality of bits may be required for the information on the change of the Tx beam.

Method 2.2-4: In Method 2.2-3, the DLPI (e.g., a block of the DLPI) may include the bitmap and the information on the change of the Tx beam. Alternatively, the bitmap may include the information on the change of the Tx beam.

The minimum unit to which puncturing is applied in the Tx beam may be the number of symbols representing a time unit of the DLPI. The minimum unit to which puncturing is applied in the Tx beam may be the same as the number of bits representing a time in the DLPI. The reason is that the Tx beam is formed in a wideband, so there is no need to additionally express a frequency. Method 2.2-4 may be illustrated in FIG. 19.

Figure 19:
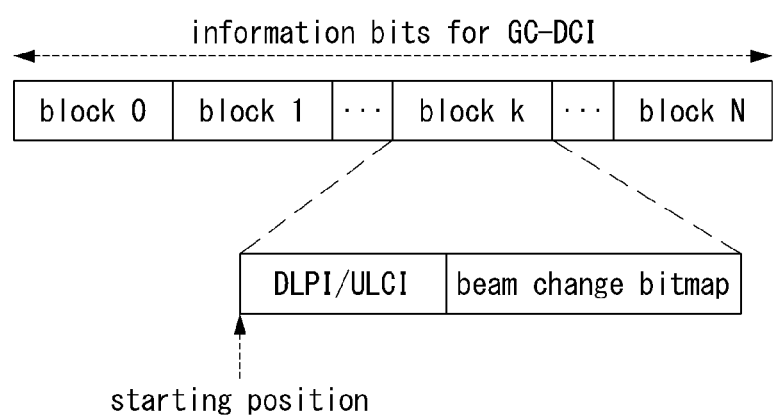
FIG. 19 is a conceptual diagram illustrating a first exemplary embodiment of GC-DCI including beam information.

FIG. 19 is a conceptual diagram illustrating a first exemplary embodiment of GC-DCI including beam information.

Referring to FIG. 19, the terminal may receive DLPI, and may use both a bitmap indicating a change of a Tx beam (e.g., a beam change bitmap) and a bitmap indicating puncturing in a block related to the DLPI. If a Tx beam is maintained while puncturing occurs, the terminal may recognize that puncturing has occurred. If puncturing has occurred and it is determined that a Tx beam has been changed, the terminal may determine that puncturing has not occurred in the Tx beam (or Tx panel, resource) of the base station (or TRP).

2.3 ULCI Reception Method

When interference on an eMBB PUSCH is expected by transmission of a URLLC PUSCH, the base station may transmit an uplink cancellation indicator (ULCI) to the terminal. The ULCI may be transmitted to the terminal through GC-DCI. For example, the terminal may receive a DCI format 2_4 including the ULCI.

According to the technical specification, the ULCI may be a bitmap indicating a cancellation pattern for a reference numerology in a given serving cell. The terminal may interpret the bitmap according to a method defined by the technical specification. One bit may indicate a time and frequency resource, and the terminal may compare the resource indicated by the bitmap with a resource indicated by scheduling information received from the base station. When the resource indicated by the bitmap overlaps the resource indicated by the scheduling information, the terminal may not perform PUSCH transmission.

The ULCI may be configured differently for each beam, TRP, or Rx panel. The base station may receive a URLLC PUSCH through each TRP or Rx beam, and may receive an eMBB PUSCH through different TRPs or Rx beams. With respect to the same time resource and frequency resource, interference may occur in one beam, but may not occur in another beam. It may be preferable for the base station to express a cancellation pattern differently when it is determined that interference does not occur between beams.

Since interference occurs in an Rx panel (or Rx beam) of the base station (or TRP), the ULCI may be received by a terminal transmitting an eMBB PUSCH to the Rx panel (or Rx beam) of the base station. On the other hand, there may be little or no interference in other Rx beams of the base station through which the eMBB PUSCH is received. A method for interpreting the ULCI by limiting to terminals transmitting a signal and/or a channel through the Rx beam that the base station plans to use may be required. The terminal may have a plurality of Tx panels (or Tx beams).

A beam management procedure may be performed before a PUSCH scheduling procedure. The base station may determine an Rx beam, and may transmit scheduling information including information for determining a Tx beam of the terminal (e.g., a TX beam of the terminal corresponding to the Rx beam of the base station) to the terminal. The terminal may receive the scheduling information from the base station and may identify the information included in the scheduling information. Since the ULCI may occur based on the Rx beam of the base station, the Tx beam of the terminal may be derived based on an SRI (or TCI state index) included in the scheduling information (e.g., DCI or RRC signaling). Since the SRI is configured by RRC signaling to the terminal, it may be assumed that the Rx beam of the base station can be derived from the SRI. Even in this case, in order to express the same Rx beam, a different SRI may be required for each terminal.

When the Rx beam of the base station is interpreted as an Rx panel, the ULCI may include information that may implicitly indicate the Rx panel as well as the bitmap. For example, an index of the Rx panel may be considered as the information implicitly indicating the Rx panel. The Rx panel(s) utilized by the base station may be defined in the technical specification. The above definition may not be preferable because a different Rx beam may be used for each specific symbol(s). As another method of expressing the Rx panel or the Rx beam, an index applied to a plurality of terminals may be considered. As an example, an SSB index may be considered to represent the Rx panel or the Rx beam. The SSB index may indicate the Rx beam of the base station and may indicate the Tx beam of the terminal. The SSB index may be indicated to the terminal by RRC signaling. The SSB index, which is information common to terminals, rather than the index of the Rx panel used by the base station, may be used, and the ULCI may include the SSB index together with the bitmap.

Method 2.3-1: The ULCI may include the SSB index.

The terminal may derive the Tx beam estimated to be used by the base station based on the SRI (or TCI state index) received from the base station. The Tx beam (or spatial relation) applied to the corresponding SRS resource may be derived from the SRI. The Tx beam of the SRS resource may be derived based on an Rx beam used for reception of a DL RS. Alternatively, the Tx beam of the SRS resource may be derived based on a Tx beam of an SRS resource having a different SRI. The DL RS may be a CSI-RS or an SSB, and the Rx beam of the CSI-RS may refer to an Rx beam for another CSI-RS or SSB. By repeating the above-described operation, the terminal may identify an SSB index x providing a Tx beam associated with a PUSCH DM-RS. In this case, when the terminal transmits a PUSCH corresponding to the SRI, the base station may use the Rx beam derived based on the Tx beam through which the SSB index x is transmitted.

The terminal may identify whether the SSB index included in the ULCI is the same as the SSB index x. When the SSB index included in the ULCI is the same as the SSB index x, the terminal may consider that interference is scheduled to occur in the Rx beam corresponding to the SSB index x. When the SSB index included in the ULCI is different from the SSB index x, the terminal may consider that interference does not occur in the Rx beam corresponding to the SSB index x.

Method 2.3-2: In Method 2.3-1, a block for the ULCI may include the bitmap and the SSB index.

When different Rx beams are used in a specific symbol(s), the ULCI may include a plurality of SSB indexes. In this case, the block of the ULCI may include the plurality of SSB indexes. As another method, a separate block in DCI may include the SSB indexes, and whether interference occurs may be identified based on a combination with the block configured to be referenced by the terminal. According to another method, information on a change of the Rx beam may be transmitted instead of information accurately indicating the Rx beam in which interference occurs. Comparing this method with Method 2.3-1, overhead caused by the DCI (e.g., ULCI) including the plurality of SSB indexes may be reduced.

Method 2.3-3: The ULCI may include the information on the change of the Rx beam.

The change of the Rx beam may mean changing the Rx panel (or Rx beam) of the base station (or TRP). The change of the Rx beam may mean not using the Rx beam (or Rx panel) planned to be used for the terminal in the scheduling step. The information on the change of the Rx beam may indicate changing of the beam or maintaining of the beam. The size of the information on the change of the Rx beam may be 1 bit. Since a condition for interference may be changed when a plurality of Rx beams are used, a plurality of bits may be required for the information on the change of the Rx beam.

Method 2.3-4: In Method 2.3-3, the ULCI (e.g., a block of the ULCI) may include the bitmap and the information on the change of the Rx beam. Alternatively, the bitmap of the ULCI may include the information on the change of the Rx beam.

The minimum unit for estimating whether interference exists or not in the Rx beam may be the number of symbols representing a time unit of the ULCI. The minimum unit for estimating whether interference exists or not in the Rx beam may be the same as the number of bits representing a time in the ULCI. The reason is that the Rx beam is formed in a wideband, so there is no need to additionally express a frequency. Method 2.3-4 may be illustrated in FIG. 19.

The terminal may receive the ULCI, and may use both the bitmap indicating the change of the Rx beam (e.g., beam change bitmap) and the bitmap indicating interference in the block related to the ULCI. If it is interpreted that the Rx beam is maintained even when PUSCH transmission is allowed in the resource indicated by the ULCI, the terminal may determine that interference occurs in the Rx beam (or Rx panel, resource) of the base station. Therefore, the terminal may not transmit a PUSCH. If it is interpreted that the Rx beam is changed when PUSCH transmission is allowed in the resource indicated by the ULCI, the terminal may determine that interference does not occur in the Rx beam (or Rx panel, resource) of the base station. If two or more Rx beams (or Rx panels, resources) can be processed according to capability of the base station, the terminal may transmit the PUSCH (i.e., the first operation of the terminal). If the base station can process one Rx beam (or Rx panel, resource), since the base station cannot receive the PUSCH of the terminal, the terminal may not transmit the PUSCH (i.e., the second operation of the terminal). In an example, the operation of the terminal may be defined as one of the above-described first operation and second operation in the technical specification. In another example, the base station may configure one of the above-described first operation and second operation to the terminal by using higher layer signaling. The terminal may perform one operation (e.g., the first operation or the second operation) configured by higher layer signaling.

2.3.1 Priority Interpretation Method

Using the ULCI, an LP PUSCH may be canceled and a PUCCH may be transmitted. The LP PUSCH may include LP UCI and/or an LP UL-SCH. For transmission of HP UCI and/or an HP UL-SCH, the terminal may multiplex UCI and/or UL-SCH having the same priority. When multiplexing for UCI and/or UL-SCH having different priorities is performed, the terminal may not cancel PUCCH transmission even when the ULCI is received. When the LP UL-SCH and 'LP UCI and/or HP UCI' are multiplexed, if PUSCH transmission is canceled, the HP UCI may not be transmitted either.

Method 2.3-5: The terminal may derive an effective priority of the PUSCH based on the UCI or UL-SCH having the highest priority.

In an example, when HP UCI is multiplexed in a PUSCH scheduled by DCI allocating an LP UL-SCH, a priority of the PUSCH may be interpreted as high. Therefore, the terminal may transmit the PUSCH regardless of ULCI. The UCI may include at least HARQ-ACK for a DL-SCH or SL-SCH.

2.4 TPC Commands

In a DCI format for controlling a power of a PUCCH, powers (e.g., TPC commands) for a PCell and a PUCCH serving cell may be indicated at different positions. When PUCCHs are transmitted from the terminal in two serving cells, each of the positions (e.g., the positions of the TPC commands) for the PCell and an additional serving cell may be indicated to the terminal by RRC signaling.

Method 2.4-1: In a DCI format for controlling a power of a PUCCH, positions of all serving cells capable of PUCCH transmission (e.g., the positions of TPC commands) may be configured to the terminal by RRC signaling, and the TPC command for each serving cell may be independently indicated to the terminal.

Chapter 3 PUCCH Transmission Method

The terminal may transmit a PUCCH using Tx panel(s). The methods and exemplary embodiments below will be described with reference to one Tx panel, but may also be applied to two or more Tx panels.

3.1 PUCCH Transmission Power Control Method

A transmission power applied to a PUCCH may be calculated based on an equation defined in the technical specification. For example, a transmission power of a PUCCH may be calculated based on Equation 1 below. Here, P(i, u, d, l) may be applied to a transmission occasion i of the PUCCH, u may indicate an index of a DL-RS used by the terminal to calculate the power, d may indicate an index of a UL-RS used by the terminal to calculate the power, and l may indicate an index of a set managing TPC commands.

$$P(i,u,d,l) \text{ [dBm]} = P_O(u) + 10 \cdot \log_{10}(2^{\mu} \cdot M_{RB}(i)) + PL(d) + \Delta_F \Delta(i) + g(i,i) \quad \text{[Equation 1]}$$

$P_O(u)$ may be a reference variable for the transmission power of the PUCCH, and a value for the u-th power control loop may be indicated to the terminal by RRC signaling. $\mu$ may be a variable for a subcarrier spacing used by a PUSCH instance, and PL(d) may be the amount of a DL path loss calculated based on a reference RS d when the reference RS is defined by d. The terminal may estimate PL(d) based on a measurement result of the reference RS. g(i,l) may be an accumulated value of TPC commands for the l-th power control loop.

A value of $\Delta_F$ may be indicated to the terminal by RRC signaling. The value of $\Delta_F$ may be indicated differently according to a format of the PUCCH. A value of $\Delta(i)$ may be fixed to 0 according to a value indicated by RRC signaling. Alternatively, the value of $\Delta(i)$ may be calculated as a different value according to a value indicated by RRC signaling. A different equation may be applied according to the format of the PUCCH. The reason is to adjust an offset of the transmission power so that a PUCCH to which a spreading code is applied and a PUCCH having a different coding scheme experience a similar BLER. When the PUCCH format is a PUCCH format 0 or 1, $\Delta(i) = \Delta_{UCI}(i) + 10 \cdot \log_{10}(N/N(i))$ may be defined.

When the PUCCH format is the PUCCH format 2, 3, or 4, the UCI may be classified into a UCI having a size of 11 bits or less and a UCI having a size of 12 bits or more. When the size of UCI is 11 bits or less, $\Delta(i) = 10 \cdot \log_{10}(K_1 \cdot (n_{HARQ-ACK}(i) + O_{SR}(i) + O_{CSI}(i))/N(i))$ may be defined. When the size of UCI is 12 bits or more, $\Delta(i) = 10 \cdot \log_{10}(\{2^{K_2 \cdot BPRE} - 1\})$ may be defined. Here, $K_1$ and $K_2$ may be constants determined in the technical specification. A bits per resource element (BPRE) may be a variable related to a code rate, and may be defined by $(O_{HARQ-ACK}(i) + O_{SR}(i) + O_{CSI}(i) + O_{CRC}(i))/N(i)$. $O_{HARQ-ACK}(i)$ and $n_{HARQ-ACK}(i)$ may mean the amount of HARQ-ACK, $O_{SR}(i)$ may mean the amount of bits representing an SR, $O_{CSI}(i)$ may mean the amount of CSI. $O_{CRC}(i)$ may mean the amount of CRC. N(i) may mean the number of REs that the PUCCH resource has. In REs corresponding to N(i), RE(s) to which the DM-RS is mapped may be excluded.

g(i,l) may mean an accumulated value of TPC command(s) received through DCI(s) for a preset time. The preset time may be defined in the technical specification. A time of starting the accumulation of TPC commands for the PUCCH transmission occasion i may be after a time of ending the accumulation of TPC commands for the PUCCH transmission occasion i-i₀. The time of ending the accumulation of TPC commands for the PUCCH transmission occasion i may mean the last symbol of a CORESET to which the last DCI belongs among DCIs scheduling UCI transmissions in the PUCCH transmission occasion i. Here, i₀ may mean a minimum natural number that makes a time period for performing the accumulation of TPC commands greater than 0. The accumulation operation of TPC commands may be applied only to the same l.

UCIs having the same priority may be multiplexed in a PUCCH, and the PUCCH may be transmitted. Therefore, Equation 1 may be applied. When UCIs having different priorities are multiplexed, the power of the PUCCH may not be properly expressed only by Equation 1.

Method 3.1-1: In consideration of the amount of UCIs having different priorities, the transmission power of the PUCCH in which HP UCI and LP UCI are multiplexed may be corrected.

When LP UCI and HP UCI are multiplexed and the existing PUCCH resource set is used, an equation for deriving the transmission power may be different depending on the amount of UCI. When LP UCI and HP UCI are multiplexed and one PUCCH resource set is defined, it may be assumed that the amount of UCI is always larger than a predetermined amount. As an example, the terminal may assume that the amount of LP UCI is 12 bits or more in the calculation procedure of $\Delta(i)$.

Method 3.1-2: Depending on a format of the PUCCH in which LP UCI and HP UCI are multiplexed, $\Delta'(i)$ may be additionally added to the transmission power of the PUCCH.

When the PUCCH is indicated by LP DCI, $\Delta'(i)$ may be derived from the amount of HP UCI. For a PUCCH format indicated by the LP DCI, $\Delta'=10 \cdot \log_{10}(K_1 \cdot (n_{HARQ-ACK}(i)+O_{SR}(i)+O_{CSI}(i))/N(i))$ or $\Delta'(i)=10 \cdot \log_{10}(\{2^{K_2 \cdot BPRE}-1\})$ may be defined. When the PUCCH is indicated by HP DCI, $\Delta'(i)$ may be derived from the amount of LP UCI. For a PUCCH format indicated by the HP DCI, $\Delta'(i)=10 \cdot \log_{10}(K_1 \cdot (n_{HARQ-ACK}(i)+O_{SR}(i)+O_{CSI}(i))/N(i))$ or $\Delta'(i)=10 \cdot \log_{10}(\{2^{K_2 \cdot BPRE}-1\})$ may be defined. The BPRE may mean $(O_{HARQ-ACK}(i)+O_{SR}(i)+O_{CSI}(i)+O_{CRC}(i))/N(i)$. Here, the values of $K_1$ and $K_2$ may vary in the LP UCI and the HP UCI. Here, N(i) may have the same value in the HP UCI and the LP UCI. In the calculation procedure of $\Delta(i)$ and $\Delta'(i)$, since the number N(i) of REs to which the LP UCI is mapped and the number N'(i) of REs to which the HP UCI is mapped may be different, N(i) and N'(i) different from each other may be applied.

Method 3.1-3: When $\Delta(i)$ and/or $\Delta'(i)$ are calculated in Method 3.1-2, N(i) and N'(i) may be determined based on the number of REs to which rate-matched UCIs are mapped.

According to another method, the LP UCI and the HP UCI may not be distinguished from each other, and may be summed as the amount of UCI. A separate $\Delta'(i)$ may not be introduced, and $\Delta(i)$ may be defined differently. When the HP UCI and the LP UCI are multiplexed, multiplexed information may be limited to HARQ-ACK. In this case, $\Delta(i)$ may be calculated based on one offset.

Method 3.1-4: According to the format of the PUCCH in which LP UCI and HP UCI are multiplexed, in order to calculate $\Delta(i)$ for the transmission power, a priority based on the amount of HARQ-ACK and/or the amount of REs may be considered.

In an example, when the arithmetic sum of the LP UCI and the HP UCI is 11 bits or less, $\Delta(i)=10 \cdot \log_{10}(K_1 \cdot (n_{HARQ-ACK}(i)/N(i)+n'_{HARQ-ACK}(i)/N'(i))$ may be defined. When the arithmetic sum of the LP UCI and the HP UCI is 12 bits or more, in the calculation procedure of $\Delta'(i)=10 \cdot \log_{10}(\{2^{K_2 \cdot BPRE}-1\})$ BPRE=$(O_{HARQ-ACK}(i)+O_{CRC}(i))/N(i)+(O'_{HARQ-ACK}(i)+O_{CRC}(i))/N'(i)$ may be defined.

In another example, $\Delta(i)=10 \cdot \log_{10}(K_1 \cdot (n_{LP\ UCI}(i)/N(i)+n'_{HP\ UCI}(i)/N'(i))$ or $\Delta(i)=10 \cdot \log_{10}(\{2^{K_2 \cdot BPRE}-1\})$ may be defined. Here, the amount of the LP UCI may be defined as $nL_{P\ UCI}=n_{HARQ-ACK}(i)+O_{SR}(i)+O_{CSI}$, and the amount of the HP UCI may be defined as $n'_{HP\ UCI}=n_{HARQ-ACK}(i)+O_{SR}(i)$ The BPRE may be defined as $n_{LP\ UCI}/N(i)+n_{HP\ UCI}/N'(i)$, and the amounts of the LP UCI and HP UCI may be added.

3.2 PUCCH Carrier Changing Method

In a terminal supporting URLLC traffic, a smaller latency for transmitting and receiving control information may be advantageous. A difference between a reception time of DCI and a transmission time of UCI for the DCI (e.g., HARQ-ACK for a PDSCH allocated by the DCI) may occur, and it may be preferable that resources capable of transmitting different UCI types (CSI, SR) occur frequently. It may be preferable that resources capable of transmitting a PDSCH and/or PUSCH also occur frequently.

A full-duplex duplex operation may be performed in an FDD system (e.g., a system operating in an FDD scheme), and a half-duplex duplex operation may be performed in a TDD system (e.g., a system operating in a TDD scheme). A time (e.g., alignment delay) waiting for a DL slot and/or a UL slot in the terminal may be additionally required. For transmission of UCI, a PUCCH and/or PUSCH may be transmitted from the terminal. The PUCCH and/or PUSCH may be transmitted in one serving cell. One serving cell may be referred to as a special serving cell (SpCell) among a plurality of serving cells to which frequency aggregation is applied. The one serving cell may mean a PCell of a master cell group (MCG) and/or a PSCell of a secondary cell group (SCG). The one serving cell may mean a PUCCH-SCell of the MCG or SCG.

In the TDD system, a time waiting for a UL slot of a specific serving cell may be wasted. To solve this, it may be preferable to allow PUCCH transmission in several serving cells, not in a specific serving cell. The PUCCH transmission may be performed by one Tx panel according to spatial relation information (or Tx filter) configured to the terminal. When two or more spatial relations are indicated to the terminal, the PUCCH transmission may be performed by two or more Tx panels.

3.2.1 RRC Configured Pattern-Based Transmission Method

The base station may utilize multiple carriers. The base station may configure all or some of the carriers to the terminal by RRC signaling. That is, the base station may configure or instruct the terminal to perform a frequency aggregation operation using RRC signaling. All or some of configured serving cells may be activated or deactivated by MAC signaling from the base station. The activated serving cell may utilize one DL BWP and/or UL BWP by the technical specification or PHY signaling from the base station.

PUCCH resources may be configured for each UL BWP. PUCCH-config for the UL BWP may be configured, and a plurality of PUCCH resources may be configured by PUCCH-config. A plurality of serving cells may be configured for the terminal, and a case in which all or some of the configured serving cells are activated may be considered.

Method 3.2-1: PUCCH-config may be configured for all or some of the configured serving cells. Two or more PUCCH serving cells may exist in a PUCCH cell group.

The base station may inform the terminal of a serving cell in which a PUCCH is transmitted by using scheduling DCI. Alternatively, the base station may inform the terminal of which serving cell should be used to transmit a PUCCH in a specific slot using RRC signaling. A combination of the above methods may be used.

The base station may configure a PUCCH serving cell pattern to the terminal by using RRC signaling. Since two or more serving cells are utilized by frequency aggregation, two or more BWPs may be utilized. One PUCCH serving cell pattern configured by RRC signaling may be applied to a plurality of BWP combinations. A subcarrier spacing of a BWP of the PCell and a subcarrier spacing of a BWP of the SCell may be different.

Method 3.2-2: Information indicating the PUCCH serving cell pattern may include at least one of a reference subcarrier spacing, an index of a reference serving cell (e.g., a serving cell reference index), the length of the PUCCH serving cell pattern, a period in which the PUCCH serving cell pattern is applied, or index(es) of serving cell(s) belonging to a PUCCH cell group.

The base station may separately configure the reference subcarrier spacing to the terminal. Alternatively, the terminal may derive a subcarrier spacing (e.g., referenceSubcarrier- Spacing) for interpreting a TDD slot pattern from RRC signaling, and may determine the derived subcarrier spacing as the reference subcarrier spacing. The terminal may use the reference subcarrier spacing as a reference for interpreting the PUCCH serving cell pattern. Here, a specific combination of a periodicity of the PUCCH serving cell pattern and the reference subcarrier spacing may be indicated to the terminal.

The PUCCH serving cell pattern may be applied in a slot including at least UL symbols. According to a slot pattern and/or dynamic SFI, FL symbols may also be utilized for PUCCH transmission. When frequency aggregation is configured, instead of one serving cell, a plurality of serving cells may be configured as PUCCH serving cells. Therefore, the PUCCH serving cell pattern may preferably include information on all slots.

Method 3.2-3: In Method 3.2-2, the information indicating the PUCCH serving cell pattern may include one of the reference subcarrier spacing and the reference serving cell index.

A plurality of UL BWPs may operate in the reference serving cell. In this case, a subcarrier spacing of the UL BWP may be selected based on one UL BWP among the plurality of UL BWPs. The terminal may utilize the selected subcarrier spacing to interpret the PUCCH serving cell pattern. According to an example, the PUCCH serving cell pattern may be defined using one of the reference subcarrier spacing or the reference serving cell index. According to another example, one of the reference subcarrier spacing or the reference serving cell index may be selected by RRC signaling, and the selected information may be utilized to interpret the PUCCH serving cell pattern. In another example, when the reference serving cell index is fixed to indicate the PCell, separate information may not be indicated to the terminal. In this case, the reference subcarrier spacing may be indicated to the terminal using RRC signaling. Alternatively, the reference subcarrier spacing may be applied as the subcarrier spacing of the active UL BWP.

3.2.2 Method of not Following a PUCCH Serving Cell Pattern

The terminal may not always use the PUCCH serving cell pattern. After the PUCCH serving cell pattern is configured or indicated to the terminal, some serving cells belonging to the PUCCH cell group may be deactivated. In this case, the terminal may not be able to use the deactivated serving cell(s) to transmit a PUCCH. In a specific BWP (e.g., dormant BWP) for the activated serving cell belonging to the PUCCH cell group, the terminal cannot transmit a PUCCH. In this case, the terminal should transmit a PUCCH using a specific serving cell and an activated UL BWP (or reference BWP) according to the PUCCH serving cell pattern, but since the corresponding serving cell or UL BWP cannot be used, another reference serving cell and/or another reference UL BWP may be required.

Method 3.2-4: When a PUCCH cannot be transmitted according to the PUCCH serving cell pattern configured to the terminal, the terminal may transmit a PUCCH in the reference serving cell and the reference BWP.

For example, the reference serving cell may be the PCell, PSCell, or SpCell. Alternatively, a separate serving cell index may be configured to the terminal. For example, the reference BWP may be a BWP currently activated in the reference serving cell. In another example, the reference BWP may be a BWP initially activated in the reference serving cell (i.e., firstActiveUplinkBWP). In this case, in order to notify the terminal of firstActiveUplinkBWP, an BWP ID may be additionally indicated.

Method 3.2-5: In Method 3.2-4, the index and/or BWP ID of the reference serving cell may be additionally indicated to the terminal.

Meanwhile, the terminal may receive a PDSCH based on fallback DCI. In this case, the terminal may not follow the PUCCH serving cell pattern, and may transmit a PUCCH using the SpCell (or PUCCH-SCell). The fallback DCI format may be used for RRC connection re-establishment, handover, and/or load balancing. When RRC configuration parameters are changed, the PUCCH serving cell pattern may be changed. In this case, when the fallback DCI is received, the terminal may not transmit a PUCCH in the PUCCH serving cell indicated by the PUCCH serving cell pattern, and may transmit the PUCCH in the SpCell. In this case, the following methods may be applied.

Method 3.2-6: According to a format of the DCI for allocating the PDSCH, the terminal may or may not follow the PUCCH serving cell pattern.

For example, for a PDSCH scheduled by fallback DCI (e.g., DCI format 1_0), the terminal may not follow the PUCCH serving cell pattern in order to determine a serving cell for transmitting a PUCCH. On the other hand, for a PDSCH scheduled by non-fallback DCI (e.g., DCI format 1_1 or DCI format 1_2), the terminal may follow the PUCCH serving cell pattern. The PUCCH serving cell pattern may be configured or indicated to the terminal by RRC signaling.

The exemplary embodiment may be further specified in case that fallback DCI is utilized. In an example, regardless of a search space set in which the fallback DCI is detected, the terminal may transmit a PUCCH in the PCell, PSCell, PUCCH-SCell, or SpCell. In another example, the PUCCH serving cell in which the terminal transmits the PUCCH may be changed according to the search space set in which the fallback DCI is detected. For example, for a PDSCH allocated by fallback DCI, when the search space in which the fallback DCI is received is a CSS set, the terminal may not follow the PUCCH serving cell pattern. When the search space in which the fallback DCI is received is a USS set, the terminal may follow the PUCCH serving cell pattern.

Method 3.2-7: According to the search space set in which the fallback DCI is searched, the terminal may or may not follow the PUCCH serving cell pattern.

3.2.3 Method of Indicating a Slot Offset of a PUCCH Serving Cell

A method of determining a time resource for transmitting a HARQ-ACK by using DL-DCI may be considered. An offset (e.g., K1 offset) for a (sub)slot in which a PUCCH is transmitted may be indicated to the terminal, and a resource of the PUCCH within the (sub)slot may be given by a PRI and/or an index of CCE(s) occupied by the DL-DCI. When a PUCCH serving cell pattern is configured, the terminal may use a reference UL BWP or a reference subcarrier spacing of a reference serving cell to apply the K1 offset. The derived (sub)slot may not be aligned with a (sub)slot boundary or a symbol boundary of a PUCCH serving cell.

Figure 20:
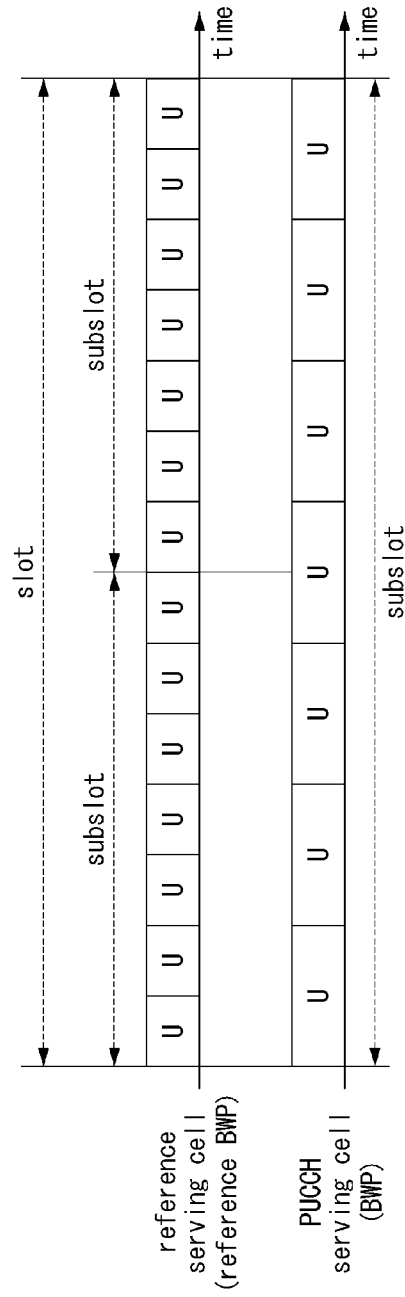
FIG. 20 is a conceptual diagram illustrating a first exemplary embodiment of (sub)slot configuration when a reference subcarrier spacing of a reference serving cell is different from a subcarrier spacing of a PUCCH serving cell.

FIG. 20 is a conceptual diagram illustrating a first exemplary embodiment of (sub)slot configuration when a reference subcarrier spacing of a reference serving cell is different from a subcarrier spacing of a PUCCH serving cell.

Referring to FIG. 20, when a reference subcarrier spacing of a reference serving cell is 30 kHz, a subcarrier spacing of a PUCCH serving cell is 15 kHz, and subslots each having 7 symbols are configured in the reference serving cell, (sub)slot boundaries and/or symbol boundaries of the reference serving cell and the PUCCH serving cell may not be aligned. Two subslots in the reference serving cell may correspond to one subslot in the PUCCH serving cell.

Figure 21:
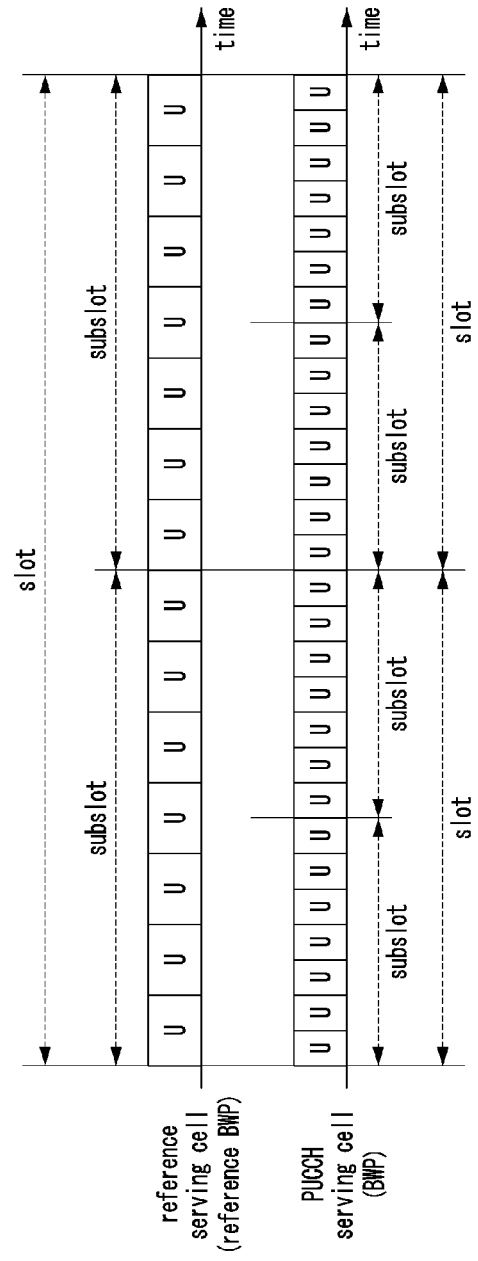
FIG. 21 is a conceptual diagram illustrating a second exemplary embodiment of (sub)slot configuration when a reference subcarrier spacing of a reference serving cell is different from a subcarrier spacing of a PUCCH serving cell.

FIG. 21 is a conceptual diagram illustrating a second exemplary embodiment of (sub)slot configuration when a reference subcarrier spacing of a reference serving cell is different from a subcarrier spacing of a PUCCH serving cell.

Referring to FIG. 21, when a reference subcarrier spacing of a reference serving cell is 15 kHz, a subcarrier spacing of a PUCCH serving cell is 30 kHz, and subslots each having 7 symbols are configured in the reference serving cell, (sub)slot boundaries and/or symbol boundaries of the reference serving cell and the PUCCH serving cell may not be aligned. One subslot in the reference serving cell may correspond to two subslots in the PUCCH serving cell.

When transmission in two reference subslots of the reference serving cell is to be performed in one subslot of the PUCCH serving cell, a scheduler of the base station may predict the above-described transmission. Accordingly, PUCCH load balancing may be maintained. One reference subslot in the reference serving cell may correspond to two subslots in the PUCCH serving cell. As a first method, one subslot among two subslots in the PUCCH serving cell, which corresponds to one reference subslot, may be defined by the technical specification. As a second method, the base station may dynamically indicate to the terminal one subslot among two subslots in the PUCCH serving cell, which corresponds to one reference subslot. A numerology ratio and/or a subslot length ratio may be variously indicated.

Method 3.2-8: One subslot among two subslots in a PUCCH serving cell, which corresponds to one reference subslot, may be defined by the technical specification.

One reference subslot (or one reference slot) may correspond to two or four subslots in the PUCCH serving cell. The terminal may select one subslot from among the two or four subslots in the PUCCH serving cell according to a method derived from the technical specification. For example, the terminal may select one subslot that is temporally (most) early or (most) late among the subslots. After selecting the subslot, the terminal may determine a PUCCH resource (e.g., one PUCCH resource) indicated by a PRI and/or CCE index included in DCI. When one reference subslot (or one reference slot) corresponds to two or four subslots in the PUCCH serving cell, the terminal may select the subslot among the two or four subslots in the PUCCH serving cell based on the information included in the DCI.

Method 3.2-9: An index indicating a specific subslot among subslots of the PUCCH serving cell may be derived from DCI.

Method 3.2-10: In Method 3.2-9, the DCI may include K1 and a (sub)slot offset. Method 3.2-11: In Method 3.2-9, the DCI may indicate a combination of K1 and (sub)slot offset. The combination of K1 and (sub)slot offset may be indicated by one index. Alternatively, a separate field included in the DCI may indicate the (sub)slot offset. In this case, the existing field of the DCI may be extended. Alternatively, a new field may be introduced in the DCI.

For example, since a subcarrier spacing ratio may be 2:1 or 4:1, an index of the subslot may be expressed by 1 bit or 2 bits. The above-described operation may be applied when the number of symbols (e.g., 2 or 7) belonging to the subslot(s) configured in the terminal are all the same.

Method 3.2-12: When subslot(s) are configured in the PUCCH serving cell (or PUCCH cell group), the number of symbols belonging to the subslot(s) may all be the same.

When the length of subslot(s) is different in some PUCCH serving cells or when subslots are not configured in some PUCCH serving cells, the subcarrier spacing ratio and the subslot ratio may be indicated more complexly. When Method 3.2-12 is not followed, the number of indexes required in the DCI may be significantly increased by applying Method 3.2-9. In order not to increase the size of the DCI, the (sub)slot offset may be determined based on implicit information derived from the DCI. For example, the (sub)slot offset may be determined based on CCEs occupied by a PDCCH on which the DCI is transmitted.

Method 3.2-13: In Method 3.2-9, the smallest index or the largest index among indexes of CCEs to which the DCI is mapped may be used to determine the (sub)slot offset.

For example, the maximum value or reference value of the subcarrier spacing ratio and/or the ratio of the number of symbols included in the subslot may be known to the terminal. The terminal may utilize a remainder obtained by dividing the CCE index by the above-described maximum value or reference value as the (sub)slot offset.

3.2.4 Method of Applying a Delay Time

The BWPs of some serving cells belonging to the PUCCH cell group may be changed. Alternatively, some serving cells (e.g., BWPs of some serving cells) may be activated or deactivated. Even when some serving cells (e.g., BWPs of some serving cells) are deactivated, the terminal may perform downlink communication and/or uplink communication in a predetermined BWP.

The BWPs of some serving cells belonging to the PUCCH serving cells may be changed. Some serving cells (e.g., BWPs of some serving cells) may be activated or deactivated. When a PUCCH serving cell pattern is configured to the terminal by RRC signaling, the terminal may not always be able to transmit a PUCCH.

When the PUCCH serving cell pattern is configured, a corresponding PUCCH serving cell may be configured not to be deactivated. Alternatively, the BWP may be configured not to be changed to a specific BWP (e.g., dormant BWP).

Method 3.2-14: When a PUCCH serving cell pattern is configured by RRC signaling, it may be assumed that the terminal can transmit a PUCCH in a PUCCH serving cell for a corresponding (sub)slot.

When a state or BWP of the PUCCH serving cell is limited in a specific (sub)slot, a constraint on scheduling of the base station may occur. The PUCCH serving cell pattern may be configured, and a complementary pattern may be known to the terminal. When the terminal cannot operate according to the PUCCH serving cell pattern, it may be preferable for the terminal to use another serving cell.

Method 3.2-15: When a PUCCH serving cell pattern is configured by RRC signaling and the terminal determines that the terminal cannot transmit a PUCCH in a PUCCH serving cell for a corresponding (sub)slot, the terminal may transmit a PUCCH in a PCell, SpCell, or PSCell.

The terminal may always select an activated serving cell. The selected serving cell may be a PCell. The terminal may transmit a PUCCH by using an activated BWP among BWPs of the PCell. When the state of some PUCCH serving cells is changed, the terminal may assume that the PUCCH serving cell(s) are activated or deactivated based on a predetermined (sub)slot. If the above-described reference (sub) slot is not clear, the terminal may determine whether to follow the PUCCH serving cell pattern or whether to use another serving cell.

When the state of the PUCCH serving cell is changed, a MAC CE may be received in a slot n, and a slot (n+k) may be defined by the technical specification. k may mean a value indicating a slot immediately after 3 ms from a slot (n+m) in which the terminal transmits a HARQ-ACK for the MAC CE (e.g., 3+1 in case of 15 kHz subcarrier spacing, 6+1 in case of 30 kHz subcarrier spacing). According to the technical specification, when the state of the serving cell is changed, the terminal may perform various operations according to the state change. For example, for the serving cell to be deactivated, the terminal may not perform an SRS transmission operation, CSI transmission operation, UL-SCH transmission operation, random access channel (RACH) transmission operation, PDCCH monitoring operation, PDSCH monitoring operation, and/or PUCCH transmission operation. For example, for the serving cell to be activated, the terminal may perform an SRS transmission operation, CSI transmission operation, UL-SCH transmission operation, random access channel (RACH) transmission operation, PDCCH monitoring operation, PDSCH monitoring operation, and/or PUCCH transmission operation.

The above-described operations may be performed no later than a minimum time defined by the technical specification. The above-described operations may be performed at a time not earlier than the slot (n+k). Roughly expressed, when the state of the PUCCH serving cell is changed, the terminal may perform operations according to the state change at a time not too early and not too late. A reference time for the operations according to the state change may be determined according to the technical specification.

When a PUCCH is transmitted in a PUCCH serving cell, operations in a specific slot may be defined. The specific slot may be determined as the slot (n+k). According to the technical specification, the terminal may not transmit a PUCCH in a deactivated serving cell. When a PUCCH serving cell is deactivated, the terminal may not transmit a PUCCH. When a deactivation timer of the PUCCH serving cell expires, the PUCCH serving cell may be deactivated. Even in this case, the terminal may perform the above-described operations in the slot (n+k). PUCCH transmission may be started in an activated serving cell. In this case, the terminal may perform the above-described operations in the slot (n+k).

Method 3.2-16: When the state of the serving cell is changed, it may be assumed that the state of the serving cell is changed based on a predetermined slot determined by the technical specification.

Figure 22:
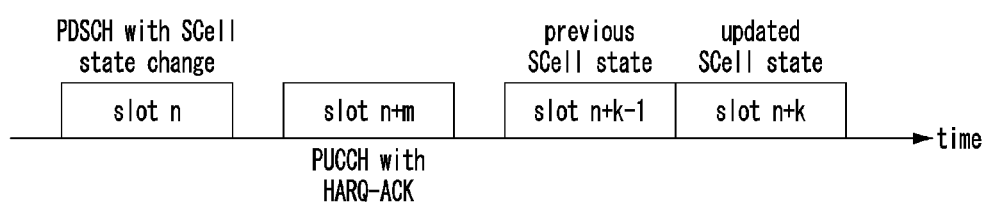
FIG. 22 is a conceptual diagram illustrating a first exemplary embodiment of a timing at which a state of a serving cell is changed.

FIG. 22 is a conceptual diagram illustrating a first exemplary embodiment of a timing at which a state of a serving cell is changed.

Referring to FIG. 22, in the technical specification, before and after a specific slot may not be clearly distinguished. According to Method 3.2-16, the changed state (e.g., updated state) of the serving cell may be applied from the predetermined slot (e.g., slot (n+k)).

Meanwhile, even when a BWP is switched, a time when the terminal cannot transmit a PUCCH may occur. For a serving cell in which a BWP is switched, the terminal may not perform a transmission operation and/or a reception operation at a predetermined time. According to the technical specification, symbols in which DCI indicating a BWP switching is received may be limited to the first three symbols of a slot. The three symbols may be determined based on the serving cell in which the terminal has received a corresponding PDCCH.

Figure 23:
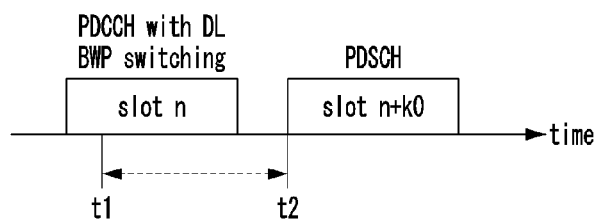
FIG. 23 is a conceptual diagram illustrating a first exemplary embodiment of a method for switching a DL BWP.

FIG. 23 is a conceptual diagram illustrating a first exemplary embodiment of a method for switching a DL BWP.

Referring to FIG. 23, a time (e.g., the fourth symbol) after a reception time of DCI in a serving cell in which a PDSCH is received may be interpreted as t1. A starting time of a slot in which the PDSCH is received may be interpreted as t2. The terminal may not perform a transmission operation and/or a reception operation for the corresponding serving cell in a period from t1 to t2.

Figure 24:
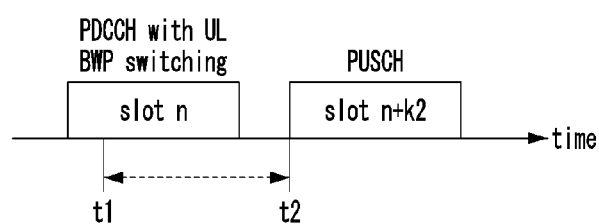
FIG. 24 is a conceptual diagram illustrating a first exemplary embodiment of a method for switching g a UL BWP.

FIG. 24 is a conceptual diagram illustrating a first exemplary embodiment of a method for switching g a UL BWP.

Referring to FIG. 24, the terminal may not perform a transmission operation and/or a reception operation for the corresponding serving cell in a period from the fourth symbol (e.g., t1) in a serving cell in which a PUSCH is transmitted to a starting time (e.g., t2) of a slot in which the PUSCH is transmitted.

When the BWP of the PUCCH serving cell is switched, the terminal cannot transmit a PUCCH in the PUCCH serving cell for a predetermined time. In this situation, when a PUCCH serving cell pattern is indicated to the terminal, it may be preferable for the base station not to switch the corresponding BWP. However, the above-described operation may not always be performed. The reason is that the BWP switching operation affects a plurality of terminals.

Alternatively, the terminal may select another serving cell to transmit a PUCCH. The method applied when the state of the serving cell is changed may be reused. In an example, Method 3.2-4 and/or Method 3.2-5 may be applied. The terminal may transmit a PUCCH in a separately configured reference serving cell and/or reference BWP. In another example, Method 3.2-14 and/or Method 3.2-15 may be applied. The terminal may transmit a PUCCH in an SpCell.

3.2.5 Method of Performing Repeated Transmissions

The terminal may transmit PUCCHs in two or more serving cells. If a PUCCH is repeatedly transmitted, a PUCCH serving cell pattern may be configured or indicated to the terminal by RRC signaling. The PUCCH serving cell pattern may be configured or indicated by RRC signaling and/or DCI. A PUCCH may be transmitted in a serving cell (e.g., PCell or PUCCH serving cell) of a (sub)slot, and a PUCCH may be transmitted in another serving cell of another (sub)slot.

Since different UL BWPs are activated in different serving cells, different numerologies may be applied. In the repeated PUCCH transmission procedure, a case in which a subcarrier spacing is changed may occur. In this case, as a method, repeated transmission of the PUCCH may not be performed. Alternatively, although repeated transmission of the PUCCH is allowed, the repeated transmission of the PUCCH may be performed in a limited situation.

Method 3.2-17: Repeated transmission of a PUCCH may be allowed when numerologies of UL BWPs in two serving cells are the same.

3.2.6 Method of Indicating a PUCCH Serving Cell Based on a Field of DCI

A field for notifying a PUCCH serving cell (hereinafter, referred to as 'PUCCH serving cell field') may be included in scheduling DCI. The size of the PUCCH serving cell field may be determined according to the number of cells that can be indicated by the PUCCH serving cell. In an example, the size of the PUCCH serving cell field may be 1 bit or 2 bits.

The terminal may know a value corresponding to an index of the PUCCH serving cell. For example, the index of the PUCCH serving cell indicated by RRC signaling may correspond to the value of the PUCCH serving cell field in the DCI.

Method 3.2-18: The DCI format 1_0 may indicate that a PUCCH is transmitted in a PCell, SpCell, PSCell, or PUCCH-SCell.

The DCI format 1_0, DCI format 1_1, and/or DCI format 1_2 may include the above-described field (e.g., PUCCH serving cell field). Alternatively, the DCI format 1_0, DCI format 1_1, and/or DCI format 1_2 may not include the above-described field. For example, the DCI format 1_0 used as a fallback DCI may not include the PUCCH serving cell field. In this case, the terminal may regard the PUCCH serving cell as the PCell, SpCell, PSCell, or PUCCH-SCell. On the other hand, the DCI format 1_1 or DCI format 1_2 may include the PUCCH serving cell field indicating the PUCCH serving cell.

Method 3.2-19: According to a search space set in which the DCI format 1_0 is detected, the terminal may differently interpret the PUCCH serving cell.

In an example, according to a search space set (e.g., CSS or USS) in which the DCI format 1_0 is searched, the terminal may interpret the PUCCH serving cell differently. When the DCI format 1_0 is detected in a CSS, the terminal may regard the PUCCH serving cell as the PCell. When the DCI format 1_0 is detected in a USS, the terminal may regard the PUCCH serving cell as a serving cell configured by RRC signaling.

Some of the serving cell(s) considered as the PUCCH serving cell may be deactivated. In this case, the terminal may not transmit a PUCCH in the deactivated serving cell. When the PUCCH serving cell is indicated by the DCI field (e.g., PUCCH serving cell field), since the base station knows the state of the serving cell(s), the deactivated serving cell may not be indicated to be used. When the terminal determines the PUCCH serving cell according to the DCI field (e.g., PUCCH serving cell field), it may be assumed that the corresponding serving cell (e.g., the PUCCH serving cell) is activated.

When the DCI format 1_0 is used, according to Method 3.2-18, the terminal may transmit a PUCCH in the PCell, SpCell, PSCell, or PUCCH-SCell. Therefore, the corresponding serving cell may be activated.

Scheduling DCI (e.g., DCI format 1_0, DCI format 1_1, DCI format 1_2) may indicate the PUCCH serving cell to the terminal. When a field (e.g., PUCCH serving cell field) of a non-fallback DCI has a first value, this may indicate transmission of a PUCCH using the SpCell. When the field (e.g., PUCCH serving cell field) of the non-fallback DCI has a second value, it may indicate transmission of a PUCCH using another serving cell. The fallback DCI may not include the field (e.g., PUCCH serving cell field) indicating the PUCCH serving cell. In this case, the terminal may transmit a PUCCH in the SpCell.

3.3 Retransmission of HARQ-ACK

UCI transmitted on a PUCCH may have a low priority derived from eMBB or a high priority derived from URLLC. The base station may configure or indicate a priority of the PUCCH or PUSCH on which the UCI is transmitted to the terminal by using RRC signaling and/or scheduling DCI. The priority of the PUCCH or PUSCH may be indicated by a priority index.

According to the technical specification, when the terminal cannot simultaneously transmit two or more UL channels, the terminal may select a UL channel having a high priority index and may transmit the selected UL channel. When a PUCCH including LP UCI (e.g., LP PUCCH) and a PUCCH including HP UCI (e.g., HP PUCCH) overlap in some symbols in the time domain, the terminal may transmit only the HP PUCCH. That is, the LP PUCCH may not be transmitted.

When the non-transmitted LP PUCCH includes a HARQ-ACK, the base station may perform scheduling of a HARQ process for the HARQ-ACK again. When the number of HARQ-ACK bits is large due to application of frequency aggregation, many resources may be consumed for scheduling the corresponding HARQ processes. Therefore, a method for retransmitting the PUCCH that has not been transmitted may be required.

In the transmission procedure of UCI, at least one of HARQ-ACK (e.g., HARQ codebook), CSI, or SR may be multiplexed in the PUCCH or PUSCH, and the PUCCH or PUSCH may be transmitted. When retransmission of the PUCCH is indicated, all or part of the UCI (e.g., UCI types) may be retransmitted.

Method 3.3-1: In the PUCCH retransmission procedure, all UCIs (e.g., UCI types) may be retransmission targets regardless of the UCI types.

In the PUCCH retransmission procedure, an operation of encoding the UCI may not be newly performed. However, a transmission opportunity of a periodic CSI, semi-persistent CSI, and/or positive SR may exist in the next period. Therefore, only the retransmission operation for the HARQ-ACK may be allowed, and in this case, resources for the remaining retransmission operations may be saved.

Method 3.3-2: In the PUCCH retransmission procedure, only the retransmission operation for HARQ-ACK may be allowed.

In the retransmission procedure, a priority according to the characteristics of traffic may be considered. Urgent data may be transmitted in a transmission procedure of URLLC traffic. A latency according to the retransmission of the PUCCH may be shorter than a time (e.g., round trip time (RTT)) for receiving a HARQ-ACK for a re-scheduled PDSCH. In this case, a PUCCH retransmission operation for the URLLC traffic may be performed.

Method 3.3-3: A HARQ codebook for a PDSCH (e.g., URLLC traffic) with a high priority index may be retransmitted.

eMBB traffic is not traffic that needs to be transmitted urgently, but a resource efficiency achieved by not rescheduling a PDSCH (e.g., eMBB traffic) may be significant. Accordingly, a retransmission operation for the PDSCH (e.g., eMBB traffic) may be supported.

Method 3.3-4: A HARQ codebook for a PDSCH (e.g., URLLC traffic and/or eMBB traffic) may be retransmitted regardless of a priority index.

3.3.1 Method of Indicating PUCCH Retransmission to the Terminal

The PUCCH retransmission procedure may be performed based on one scheme of triggering an (improved) type 3 HARQ codebook (e.g., type 3' HARQ codebook). In this case, retransmission of a PUCCH according to one of trigger states may be configured to the terminal. According to another method, a PUCCH including a separate indication other than the type 3 HARQ codebook may be retransmitted.

Method 3.3-5: DCI may indicate retransmission of a PUCCH to the terminal.

Retransmission of a PUCCH may be supported using DCI. In this case, the terminal may interpret a priority of a retransmitted HARQ codebook based on a priority index indicated by the DCI. The priority of the retransmitted HARQ codebook may be changed according to the priority index indicated by the DCI. For example, a specific HARQ-ACK bit(s) may have a low priority in an initial transmission procedure and may be considered to have a high priority in a retransmission procedure. Conversely, a specific HARQ-ACK bit(s) may have a high priority in an initial transmission procedure and may be considered to have a low priority in a retransmission procedure.

A specific field of the DCI may indicate retransmission of the HARQ-ACK codebook (e.g., HARQ-ACK information, HARQ-ACK bits). The terminal may know a slot offset and/or resource index for PUCCH transmission by using information included in the DCI. That is, the terminal may perform a PUCCH retransmission procedure, and PUCCH resources (e.g., PUCCH format, number of PRBs, number of symbols, etc.) may be changed. When LP UCI is canceled, at least HARQ-ACK may be retransmitted.

Method 3.3-6: In Method 3.3-5, one field in the DCI may be utilized to indicate retransmission of the PUCCH.

As an example, a new feedback indicator (NFI) in the DCI may be used to indicate the retransmission of the PUCCH. According to the technical specification, the NFI may be used in an unlicensed band. When the NFI field has a first value, the terminal may generate a HARQ codebook for one PDSCH group, and may transmit the HARQ codebook on the PUCCH. When the NFI field has a second value, the terminal may generate a HARQ codebook for two PDSCH groups, and may transmit the HARQ codebook on the PUCCH. The above-described operation may be applied to a licensed band.

In an example, the field triggering the type 3 HARQ codebook may be reused to indicate the retransmission of the PUCCH. In another example, a field of the DCI may be extended, and the extended field may include two or more bits. The terminal may select one of the type 3' HARQ codebooks according to a value of the corresponding field in the DCI. The existing fields (e.g., HARQ process number (HPN) field and/or modulation and coding scheme (MCS) field) included in the DCI may be reinterpreted. In this case, the DCI may be limited to a non-scheduling DCI that does not schedule a TB. Alternatively, the DCI may support a TB scheduling operation and the type 3' HARQ codebook triggering operation. In this case, a new field for triggering one of the type 3' HARQ codebooks may be introduced into the DCI. Therefore, it may be preferable that the DCI described above be limited to a non-scheduling DCI that does not schedule a TB.

In order to determine whether the DCI is a scheduling DCI or a non-scheduling DCI, the terminal may identify whether the field of the DCI validly or invalidly represents a frequency resource. When the DCI indicates an invalid frequency resource (e.g., frequency domain resource allocation (FDRA)) to the terminal, the terminal may regard the DCI as a non-scheduling DCI. For example, a FDRA included in the non-scheduling DCI may be expressed as 0.

In the DCI format, the length of the specific field may vary. For example, in the DCI format 1_1 and DCI format 1_0, the HPN field may be configured as 4 bits, and in the DCI format 1_2, the HPN field may be configured as less than 4 bits. For example, in the DCI format 1_2, the HPN field may be configured as 0, 1, 2, or 3 bits.

Method 3.3-7: When the indexes (or code points) derived by applying the same rule to fields having different lengths in the DCI format has the same value, the terminal may generate the same type 3' HARQ codebook.

In the HPN field of the DCI format 1_2, a known bit(s) may be added to the MSB or LSB, and in this case, the size of the HPN field may be interpreted as 4 bits. For example, 0 may be added to the MSB in the value indicated by the HPN field, and in this case, the value of the HPN field may be interpreted as a binary number read from the LSB. If the HPN field of DCI format 1_1 and the HPN field of DCI format 1_2 have the same value, the terminal may always interpret it as triggering the same type 3' HARQ codebook. For example, the MCS field included in the DCI format may always be configured as 5 bits regardless of the format of the DCI.

Method 3.3-8: DCI format configuration information may indicate a method of generating a type 3' HARQ codebook.

HARQ codebooks respectively derived from the same fields included in the DCI format 1_1 and DCI format 1_2 may be configured independently of each other. In an example, the terminal may assume that a method of interpreting the HPN field is different for each DCI format. A serving cell in which a PUCCH is transmitted (e.g., PUCCH serving cell) may be changed. An index of the PUCCH serving cell may be indicated from a field of the DCI. When two serving cells are involved, a serving cell in which a PUCCH is transmitted may be derived from a field having a size of 1 bit in the DCI.

As another method of performing Method 3.3-5 or 3.3-6, a new field independent of the type 3 HARQ codebook or the type 3' HARQ codebook may be introduced into the DCI. When the field (e.g., new field) included in the DCI has a first value, this may indicate to the terminal transmission of a HARQ codebook 1 that has failed to be transmitted or is scheduled to be transmitted. When the field (e.g., new field) included in the DCI has a second value, this may indicate to the terminal not to transmit the HARQ codebook 1. Here, the transmission failure may mean that channel access has failed in an unlicensed band and/or that transmission has been dropped by a comparison result of priority fields (priority indexes) allocated to scheduling of data in a licensed band or unlicensed band.

The DCI received by the terminal may not be a scheduling DCI. In an example, the DCI may include a field indicating whether a HARQ codebook 2 having a different priority index is multiplexed. In another example, RRC signaling may indicate whether a HARQ codebook 2 having a different priority index is multiplexed, and in this case, the DCI may indicate whether to transmit the HARQ codebook 1 or not. When multiplexing of the HARQ codebook 2 is indicated (e.g., when UCIs having different priorities are multiplexed), the HARQ codebook 1 and the HARQ codebook 2 may be concatenated according to priority indexes. When it is indicated that the HARQ codebook 2 is not multiplexed (e.g., when RRC signaling indicating multiplexing of UCIs having different priorities is not received or when RRC signaling indicates that UCIs having different priorities are not multiplexed, the terminal may select a HARQ codebook having a high priority index, and may transmit the selected HARQ codebook.

Method 3.3-9: One field included in the DCI format indicating PUCCH retransmission may indicate multiplexing of HARQ-ACKs having different priorities to the terminal.

The DCI indicating PUCCH retransmission may include time resource information for PUCCH transmission. The first PUCCH on which the HARQ codebook 1 is transmitted may be indicated to the terminal, and a timing 2 at which the HARQ codebook 1 is transmitted (e.g., the first symbol of a PUCCH resource) may not be earlier than a timing 1 of the first PUCCH resource in which the HARQ codebook 1 is transmitted (e.g., the first symbol of the first PUCCH resource). Therefore, the timing 1 may occur before the timing 2. Alternatively, the timing 1 and the timing 2 may occur simultaneously.

A PUCCH resource 1 for retransmission may be indicated to the terminal, and the terminal may perform a multiplexing procedure for another PUCCH and/or PUSCH with a PUCCH for the PUCCH resource 1. For example, the PUCCH resource 1 may temporally overlap with a PUCCH resource 2 corresponding to HARQ codebook 2. In this case, the terminal may multiplex HARQ-ACK bits belonging to the HARQ codebook 1 and the HARQ codebook 2 in one PUCCH resource 3. The terminal may identify whether another UL transmission temporally overlapping with a UL transmission in the PUCCH resource 3 exists. The terminal may perform a separate UL transmission or the UL transmission in the PUCCH resource 3. The terminal may perform the same encoding operation or different encoding operations according to the priority indexes. The multiplexed HARQ codebooks (e.g., HARQ-ACK bits, HARQ-ACK information) may have the same priority index.

When it is assumed that a PUCCH on which the HARQ codebook 1 is to be transmitted has a priority index 0, the DCI indicating transmission of the HARQ codebook 2 may include information indicating the priority index 0 or priority index 1. When Method 3.3-5 and/or Method 3.3-6 is applied, the terminal may generate one codeword by performing the same encoding operation on two HARQ codebooks having the same priority index 0. When the priority indexes of the two HARQ codebooks are different from each other, the terminal may generate two codewords by performing different encoding operations on the two HARQ codebooks. The HARQ codebook 1 and the HARQ codebook 2 may have different priority indexes.

When the DCI indicates retransmission of the HARQ codebook 1, the terminal may retransmit up to m HARQ codebooks. Here, m may be 1. m=2 may not be supported. When a type 2 HARQ codebook is configured to the terminal, the DCI may include a downlink assignment index (DAI) field. A counter (C)-DAI and a total (T)-DAI may be indicated. The C-DAI and T-DAI may be used to derive the size of the type 2 HARQ codebook. As in Method 3.3-5, in order for a DCI 2 to indicate PUCCH retransmission (e.g., retransmission of the HARQ codebook 1), both the size of HARQ codebook 1 and the size of HARQ codebook 2 may be known to the terminal.

When a DTX occurs in the terminal, the terminal may not detect a DCI 1. In this case, the terminal may not know that the HARQ codebook 1 is to be transmitted on the PUCCH. In this case, the base station may indicate to the terminal transmission of the HARQ codebook 2. In order to transmit the HARQ codebook 1 and the HARQ codebook 2 on the same PUCCH, information required for deriving the size of HARQ codebook 1 may be provided to the terminal through the DCI 2. The DCI may be DL-DCI or UL-DCI.

Method 3.3-10: DL-DCI may include two or more (C-DAI, T-DAI).

Method 3.3-11: DL-DCI may include two or more T-DAIs and one or more C-DAIs.

Method 3.3-12: UL-DCI may include two or more T-DAIs.

When the DCI includes two (C-DAI, T-DAI) (or two T-DAIs), the two (C-DAI, T-DAI) (or two T-DAIs) each may correspond to information on the HARQ codebook 1 and the HARQ codebook 2. If the DCI includes one C-DAI, one C-DAI may correspond to the HARQ codebook 2. The concatenation order of the DAIs may be specified in the technical specification. The concatenation order of the DAIs may correspond to 'HARQ codebook 2→HARQ codebook 1' or 'HARQ codebook 1→HARQ codebook 2'. Initial transmission for HP UCI and LP UCI may be performed on a PUCCH, and the LP UCI (e.g., HARQ-ACK) may be retransmitted on a PUCCH. In this case, the number of HARQ codebooks may be three. In this case, the DCI may include three (C-DAI, T-DAI) and/or three T-DAIs.

Meanwhile, in the retransmission procedure of the HARQ codebook, it may be preferable that the base station do not schedule a new DL-SCH by using a HARQ process for the corresponding HARQ codebook. The above-described operation may be guaranteed in an SPS PDSCH transmission procedure. An HPN for an SPS PDSCH may be defined based on a predetermined function. A HARQ-ACK bit for an HPN associated with an activated SPS may be included in the HARQ codebook of the terminal. Here, the HARQ codebook may be retransmitted. The retransmission procedure of the HARQ codebook may be affected by whether an information word and a codeword are updated and/or a reference time of the update.

In the transmission procedure of the HARQ codebook, HARQ-ACK bits may be referred to as an information word, and the terminal may generate a codeword by performing an encoding operation on the information word. The terminal may generate symbol(s) by performing a modulation operation on the codeword. When retransmission of the HARQ codebook is indicated to the terminal, the terminal may not generate a new HARQ codebook, and may perform a part of the PUCCH (or PUSCH) transmission procedure again.

Method 3.3-13: When retransmission of the HARQ codebook (or PUCCH) is indicated to the terminal, the terminal may update HARQ-ACK bits (e.g., information word) constituting the HARQ codebook.

The terminal may update the information word and may generate a code word. The terminal may generate the HARQ codebook in the same manner by using the HARQ-ACK bit for the same HARQ process ID (or HPN) at a predetermined time. In this case, a new HARQ-ACK bit for the same HPN may be generated. For example, when considering SPS, the HARQ-ACK may be replaced with new information.

According to Method 3.3-13, the predetermined time may be a boundary, and if retransmission of the HARQ codebook is indicated to the terminal before the predetermined time, the terminal may not update the HARQ-ACK of the corresponding HPN, and if retransmission of the HARQ codebook is indicated to the terminal at or after the predetermined time, the terminal may update the HARQ-ACK of the corresponding HPN. The predetermined time may be determined based on an equation defined by the technical specification. The base station may configure or indicate parameter(s) required for calculating the equation to the terminal using RRC signaling in consideration of capability of the terminal. Alternatively, the parameter(s) required for calculating the equation may be derived from the BWP.

Method 3.3-14: In Method 3.3-13, the predetermined time (e.g., time boundary) for updating the information word may be introduced.

When the terminal fails to transmit the HARQ-ACK to the base station, it may not be preferable to replace the untransmitted HARQ-ACK with a new HARQ-ACK. Therefore, it may be preferable to keep the information word as it is.

Method 3.3-15: When retransmission of a HARQ codebook (or PUCCH) is indicated to the terminal, the terminal may maintain HARQ-ACK bits (e.g., information word) constituting the HARQ codebook as the same values, and update a codeword.

The terminal may maintain the information word as it is, and may update the codeword. A code rate applied to an encoding operation may be a code rate applied in a new PUCCH resource indicated to the terminal for the retransmission.

The terminal may not know when to receive the HARQ codebook (or PUCCH) retransmission indication. Therefore, when the terminal stores the information word as it is, a separate memory may be required in the corresponding terminal. The terminal may store the information word for a predetermined time. The maximum value of the predetermined time may be determined according to capability of the terminal. Alternatively, the base station may configure or indicate the maximum value of the predetermined time to the terminal using RRC signaling. After the predetermined time elapses, the terminal may not maintain the information word, and the base station may not request the terminal to retransmit the HARQ codebook (or PUCCH).

Method 3.3-16: After a predetermined time elapses, the terminal may not perform retransmission of the HARQ codebook (or PUCCH).

When retransmission of the HARQ codebook is performed, the maximum number of HARQ codebooks (e.g., retransmission HARQ codebooks) may be derived. The reason is that when the terminal stores the information word and/or the codeword, the memory of the corresponding terminal is additionally occupied. The maximum number of HARQ codebooks capable of being retransmitted may be limited in consideration of capability of the terminal.

Method 3.3-17: The base station may configure or indicate to the terminal the maximum number of HARQ codebooks (or PUCCHs) that can be retransmitted by RRC signaling.

Alternatively, the maximum number of HARQ codebooks (or PUCCHs) capable of being retransmitted may be defined in the technical specification. For example, the maximum number of HARQ codebooks (or PUCCHs) capable of being retransmitted may be 1.

Method 3.3-18: The maximum number of HARQ codebooks (or PUCCHs) that can be transmitted by the terminal may be defined in the technical specification.

The amount and number of HARQ codebooks may be determined, and the maximum number of HARQ-ACK bits capable of being retransmitted may be limited according to the capability of the terminal. The maximum number of HARQ-ACK bits capable of being retransmitted may be indicated or configured to the terminal. In addition, a maximum retention time of the maximum number of HARQ-ACK bits may be indicated or configured to the terminal.

When the DCI indicating retransmission of the HARQ codebook is a scheduling DCI, the terminal may perform retransmission of the PUCCH based on a field included in the DCI. In this case, the retransmitted PUCCH may be different from a HARQ-ACK for a PDSCH scheduled by the DCI. The terminal may derive two or more PUCCHs from one DCI. A DL-DCI may schedule TB(s), HARQ-ACK bit(s) for the TB(s) may be derived, and a PUCCH 0 may be transmitted. In addition, one field of the DL-DCI may indicate that a separate PUCCH 1 is transmitted. Alternatively, one field of the DL-DCI may indicate that the retransmitted HARQ codebook is multiplexed in the same PUCCH 0.

A time resource in which the PUCCH 0 is transmitted may be indicated by DL-DCI to the terminal as a (sub)slot offset 0, and a time resource for the retransmission may be indicated to the terminal as a (sub)slot offset 1.

When the DCI indicating retransmission is a non-scheduling DCI, only the PUCCH 1 may be indicated to the terminal. In this case, the offset 0 may mean a time of the PUCCH 0 on which the retransmitted HARQ codebook is transmitted, and the offset 1 may be utilized to specify the retransmitted HARQ codebook. In exemplary embodiments, the retransmission HARQ codebook may mean a retransmitted HARQ codebook, and the initial transmission HARQ codebook may mean an initially transmitted HARQ codebook.

The offset 0 may represent a different between a (sub)slot in which the DCI (e.g., when a non-scheduling DCI indicates the retransmission) or PDSCH (e.g., when a scheduling DCI indicates the retransmission) indicating the retransmission is received and a (sub)slot in which the PUCCH 0 is transmitted. The offset 1 may be interpreted based on the method(s) below.

Method 3.3-19: The offset 1 may be derived from a difference between the (sub)slot in which the PUCCH 0 is transmitted and the (sub)slot in which the PUCCH 1 is initially intended to be transmitted.

Method 3.3-20: The offset 1 may be derived from a difference between the (sub)slot in which the PDCCH is received and the (sub)slot in which the PUCCH 1 is transmitted.

In an example, the offset 1 may not accurately indicate the (sub)slot in which the terminal intends to transmit the PUCCH 1. The terminal may derive a time window from the offset 1, and the PUCCH 1 may be the last or first PUCCH occurring in the time window. This may be applied to both Method 3.3-17 and Method 3.3-18.

When the terminal fails to transmit the PUCCH 1, the base station may trigger the terminal to transmit the PUCCH 1 (or HARQ codebook 1) by an additional DL-DCI. Since there may be multiple PUCCHs that the terminal has failed to transmit, the base station may indicate to the terminal which PUCCH (or HARQ codebook) is retransmitted from among the plurality of PUCCHs. In this case, the base station may specify the PUCCH 1 to the terminal in the form of the offset 1. It may be assumed that the terminal transmits one PUCCH 1 (or HARQ codebook 1) in the corresponding (sub)slot.

Method 3.3-21: The terminal may generate one HARQ-ACK bit stream by concatenating the retransmission HARQ codebook 1 and the initial transmission HARQ codebook 0, and may perform an encoding operation on the one HARQ-ACK bit stream.

The terminal may arrange the HARQ codebook 0 (e.g., initial transmission HARQ codebook) first, and may arrange the HARQ codebook 1 (e.g., retransmission HARQ codebook) after the HARQ codebook 0. According to the above-described operation, one HARQ-ACK bit stream may be generated. Thereafter, when necessary, the terminal may consider multiplexing with a HARQ-ACK bit stream having a different priority index.

Figure 25:
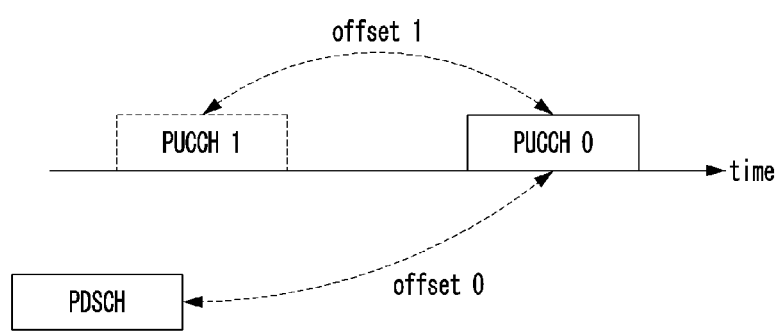
FIG. 25 is a conceptual diagram illustrating a first exemplary embodiment of a method for interpreting the offset 1 indicating PUCCH retransmission.

FIG. 25 is a conceptual diagram illustrating a first exemplary embodiment of a method for interpreting the offset 1 indicating PUCCH retransmission.

Referring to FIG. 25, the offset 1 may be the offset 1 according to Method 3.3-19. The offset 1 may be a difference between a (sub)slot in which the PUCCH 1 is initially intended to be transmitted and a (sub)slot in which the PUCCH 0 is transmitted.

Figure 26:
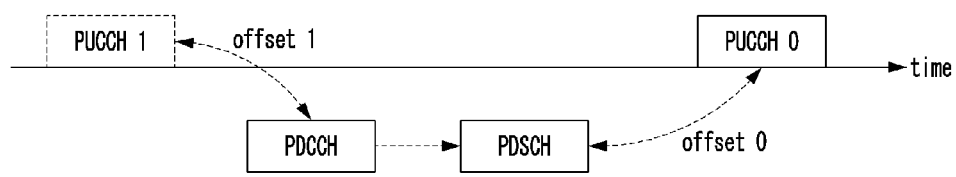
FIG. 26 is a conceptual diagram illustrating a second exemplary embodiment of a method for interpreting the offset 1 indicating PUCCH retransmission.

FIG. 26 is a conceptual diagram illustrating a second exemplary embodiment of a method for interpreting the offset 1 indicating PUCCH retransmission.

Referring to FIG. 26, the offset 1 may be the offset 1 according to Method 3.3-20. The offset 1 may be a difference between a (sub)slot in which the PDCCH is received and a (sub)slot in which the PUCCH 1 is transmitted.

Figure 27:
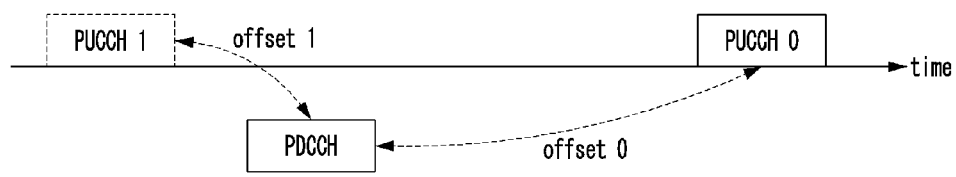
FIG. 27 is a conceptual diagram illustrating a third exemplary embodiment of a method for interpreting the offset 1 indicating PUCCH retransmission.

FIG. 27 is a conceptual diagram illustrating a third exemplary embodiment of a method for interpreting the offset 1 indicating PUCCH retransmission.

Referring to FIG. 27, the offset 1 may be the offset 1 according to Method 3.3-20. The offset 1 may be a difference between a (sub)slot in which the PDCCH is received and a (sub)slot in which the PUCCH 1 is transmitted.

In the above-described exemplary embodiments, the terminal may transmit the PUCCH 0 based on the offset 0. The retransmission HARQ codebook 1 may be concatenated with the HARQ codebook 0 according to Method 3.3-21. According to Method 3.3-17 or Method 3.3-18, the terminal may store all of the HARQ codebooks that have not been transmitted. In order to support this operation, an additional storage device or storage space may be required in the terminal. Alternatively, the terminal may regenerate the HARQ codebook 1 triggered to retransmit. The procedure of arranging HPNs in a predetermined order in the configured serving cell may be performed again. Since this operation does not require the terminal to decode an additional TB, a time required for the above-described operation may not be large.

A maximum delay time for transmission of a TB for URLLC traffic may be defined. In this case, a maximum retention time for the terminal may be defined. The terminal may assume that the PUCCH 1 (or HARQ codebook 1) is not retransmitted after the maximum storage time. The maximum number of HARQ codebooks that the terminal can store may be limited.

Method 3.3-22: The base station may configure or indicate the maximum time during which the PUCCH 1 (or HARQ codebook 1) can be retransmitted to the terminal by RRC signaling.

Method 3.3-23: The base station may configure or indicate the maximum number of retransmittable PUCCH 1 (or HARQ codebook 1) to the terminal by RRC signaling.

Method 3.3-24: The maximum time during which the PUCCH 1 (or HARQ codebook 1) can be retransmitted may be determined according to capability of the terminal. Therefore, the terminal may transmit, to the base station, a terminal (i.e., UE) capability report including a configuration variable indicating the maximum time during which the PUCCH 1 (or HARQ codebook 1) can be retransmitted. The terminal capability report may be transmitted to the base station by RRC signaling.

The base station may receive the terminal capability report from the terminal, and may identify the configuration variable indicating the maximum time during which the PUCCH 1 (or HARQ codebook 1) can be transmitted, which is included in the terminal capability report. The base station may perform scheduling according to a combination of the above-described method(s) in consideration of the identified configuration variable. When the size of the PUCCH 1 (or HARQ codebook 1) that the terminal intends to retransmit (e.g., the number of HARQ-ACK bits) exceeds the maximum size or when the maximum time during which the PUCCH 1 (or HARQ codebook 1) can be retransmitted elapses, it may be assumed that the terminal does not receive the above-described indication from the base station.

When the PUCCH 1 (or HARQ codebook 1) is retransmitted, the terminal may not store information on the HARQ codebook 1 included in the PUCCH 1. The above-described operation may be explicitly indicated by the base station, and the terminal may not store the HARQ codebook 1 based on the explicit indication of the base station. When a new HARQ codebook is generated, the HARQ-ACK bits (or HARQ codebook) may be replaced as a new HARQ codebook in the oldest stored order.

While retransmission of the PUCCH (or HARQ codebook) is indicated to the terminal, a BWP may be changed. A DL BWP of a serving cell in which a PDSCH is received may be changed. Alternatively, if a UL BWP of a serving cell in which a PUCCH (or HARQ codebook) is transmitted is changed, a HARQ-ACK may not be reported to the base station. For example, in case of a type 1 HARQ codebook, a HARQ-ACK for a PDSCH candidate received before the BWP is changed may not be included in the type 1 HARQ codebook. For example, in case of a type 2 HARQ codebook, all HARQ-ACKs for a serving cell in which a BWP is changed may not be included in the type 2 HARQ codebook.

In the PUCCH (or HARQ codebook) retransmission procedure, the above-described method may be modified and applied. When a BWP is changed, in order not to report a HARQ-ACK generated before the change of the BWP, the terminal may not store a corresponding HARQ codebook. After the BWP is indicated to change, the terminal may not perform retransmission of the PUCCH. This operation may be performed based on a combination of the method(s) below.

Method 3.3-25: After a DL BWP of a serving cell in which a PDSCH is received is changed or after a UL BWP of a serving cell in which a PUCCH is transmitted is changed, retransmission of the PUCCH (or HARQ codebook) may not be indicated or configured to the terminal.

Method 3.3-26: After the BWP change is indicated, the terminal may perform retransmission of the PUCCH (or HARQ codebook). However, the terminal may not expect the above-described retransmission of the PUCCH (or HARQ codebook).

In another example, HARQ-ACK bit(s) received before a slot in which the change of BWP is triggered, HARQ-ACK bit(s) received in the slot in which the change of BWP is triggered, and HARQ-ACK bit(s) received after the slot in which the change of BWP is triggered may be distinguished. The terminal may regenerate the HARQ codebook with only the corresponding HARQ-ACK bits. In this case, the terminal may additionally perform a subsequent procedure of the above-described procedure.

Method 3.3-27: When retransmission of the PUCCH (or HARQ codebook) is indicated to the terminal, the terminal may newly generate a HARQ codebook using only HARQ-ACKs occurring after the DL BWP of the serving cell in which the PDSCH is received is changed or after the UL BWP of the serving cell in which the PUCCH is transmitted is changed, and retransmit the HARQ codebook. In this case, the size of the HARQ codebook retransmitted by the terminal may be reduced.

3.3.2 Case where UCI Repetition is Configured and/or Indicated

The terminal may repeatedly transmit UCI. When the UCI is transmitted on PUCCH(s), the base station may indicate or configure the number of UCI (e.g., PUCCH) repetitions to the terminal by using RRC signaling. The number of repetitions of UCI may be determined for each format of the PUCCH. Alternatively, the number of UCI repetitions may be determined as a part of resources of the PUCCH. In the former case, the number of PUCCH (e.g., UCI) repetitions may be determined by RRC signaling. In the latter case, the number of PUCCH repetitions may be derived by DCI and/or RRC signaling allocating the PUCCH.

If the terminal is indicated that the UCI is repeatedly transmitted two or more times, retransmission of the PUCCH may be considered. A PUCCH including only one UCI type (e.g., SR, CSI, or HARQ-ACK) may be repeatedly transmitted. For repeated transmission of two or more UCI types, one UCI type may be repeatedly transmitted according to an order defined in the technical specification (e.g., HARQ-ACK>SR>CSI). The number of PUCCH repetitions may be determined by the format of the PUCCH. With RRC signaling, one value for each PUCCH format may be configured as the number of repetitions.

Alternatively, the number of PUCCH repetitions may be known by a resource configuration of the PUCCH. One value for each PUCCH resource may be indicated as the number of PUCCH repetitions. When one value for each PUCCH format is determined as the number of PUCCH repetitions, it may mean that the number of PUCCH repetitions is indicated for the PUCCH resource and the PUCCH format, respectively. In this case, the terminal may utilize one of different values according to a predetermined rule. For example, when one value is indicated for each PUCCH resource, the terminal may interpret the value associated with the PUCCH resource as the number of repetitions even if the value associated with the PUCCH format is indicated.

When retransmission of the type 3 HARQ codebook or HARQ-ACK is triggered in the same slot, another PUCCH may not be transmitted, and only one PUCCH may be transmitted. Even when the repeated transmission procedure of the PUCCH 1 including the HARQ codebook 1 is not terminated, the base station may indicate to the terminal retransmission of the HARQ codebook 1. In this case, the initial transmission HARQ codebook 2 may be transmitted in the retransmitted PUCCH 2 (or PUSCH), the HARQ codebook 2 and the HARQ codebook 1 may be concatenated, and the concatenated HARQ codebooks may be repeatedly transmitted. For example, the number of repetitions of PUCCH 1 may be indicated to N1, and the number of repetitions of PUCCH 2 may be indicated to N2. The HARQ codebook 1 may be repeated up to N1+N2 times. Because of dropping for a slot pattern, slot format, and/or priority index, the HARQ codebook 1 may be transmitted less than N1+N2.

If the number of repeatedly transmitted HARQ codebook 1 is sufficient, it may be preferable that the terminal does not transmit HARQ codebook 1 anymore. In order to support this operation, the number of repetitions may be counted as the number of transmissions of the HARQ codebook.

Method 3.3-28: The number of transmissions of the HARQ codebook (e.g., the number of repetitions) may be a sum of the number of HARQ codebooks transmitted on the PUCCH 1, a sum of the number of HARQ codebooks transmitted on the PUCCH 2, or a sum of the number of HARQ codebooks transmitted on the PUCCH 1 and the number of HARQ codebooks transmitted on the PUCCH 2.

Method 3.3-29: When the number of transmissions of the HARQ codebook is greater than or equal to a pre-configured maximum number, the terminal may not transmit the PUCCH 1.

When the number of transmissions of the HARQ codebook 1 (e.g., N1) is indicated to the terminal, the terminal may transmit the HARQ codebook 1 on the PUCCH 1 and PUCCH 2, and the number of transmissions of the PUCCH 1 may be smaller than N1 (e.g., the maximum number of times).

Figure 28:
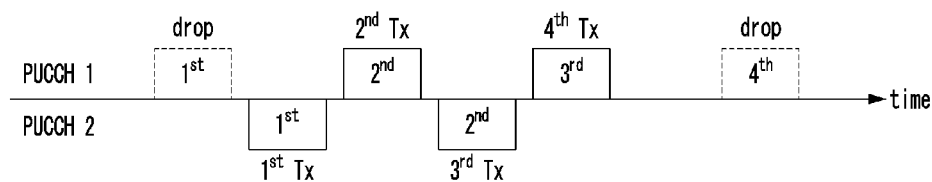
FIG. 28 is a conceptual diagram illustrating a first exemplary embodiment of a PUCCH transmission method based on the number of HARQ-ACK codebook repetitions.

FIG. 28 is a conceptual diagram illustrating a first exemplary embodiment of a PUCCH transmission method based on the number of HARQ-ACK codebook repetitions.

Referring to FIG. 28, N1 may be indicated to 4, and N2 may be indicated to 2. In an initial transmission procedure of the PUCCH 1 (or HARQ codebook 1), the terminal may consider a case in which the PUCCH 1 cannot be transmitted due to a low priority index. The terminal may receive DCI indicating retransmission, and may perform an initial transmission procedure for the HARQ codebook 1 on the PUCCH 2. When HARQ codebook 1 is transmitted four times on the PUCCH 1 and the PUCCH 2, the terminal may no longer need to transmit the HARQ codebook 1. Therefore, the terminal may not perform the fourth transmission of the PUCCH 1. In the case of the PUCCH 2, the HARQ codebook 1 and the HARQ codebook 2 may be concatenated. When necessary, the HARQ codebook 1 and the HARQ codebook 2 may be configured as one codeword. The PUCCH 2 may be transmitted as many times as the repetition number of the HARQ codebook 2. Even when the HARQ codebook 1 is transmitted by the number of repetitions, transmission of the PUCCH 2 (e.g., HARQ codebook 2) may not be dropped.

The PUCCH 1 may not include only the HARQ codebook 1, and the HARQ codebook 1 may be multiplexed with another HARQ codebook 0 in the PUCCH 1. Even in this case, Method 3.3-28 or Method 3.3-29 may be applied, and the minimum transmission(s) that satisfies the number of repetitions of the HARQ codebook 1 may be performed. Here, since the PUCCH is retransmitted, when the HARQ codebook 0 and/or the HARQ codebook 2 are involved, the number of actual transmissions of HARQ codebook 1 may be greater than the required number of repetitions. Alternatively, when retransmission of the HARQ codebook 1 is indicated to the terminal, the PUCCH 1 may not be transmitted.

Method 3.3-30: The terminal may receive a DCI indicating retransmission of the HARQ codebook 1, may drop the PUCCH 1 after a predetermined processing time, and may transmit the HARQ codebook 1 on the PUCCH 2.

A polar code or a Reed Muller code may be applied to the HARQ codebook 1. In this case, it may be preferable to perform a soft combining operation (e.g., chase combining operation). Therefore, the terminal may newly calculate the number of PUCCH repetitions and transmit the PUCCH 2.

Figure 29:
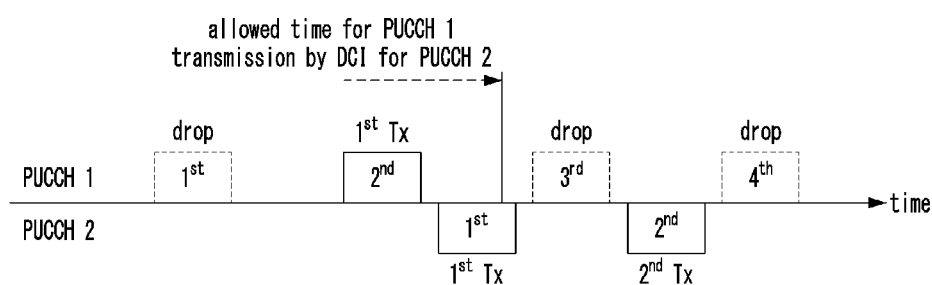
FIG. 29 is a conceptual diagram illustrating a first exemplary embodiment of a PUCCH repeated transmission cancellation method.

FIG. 29 is a conceptual diagram illustrating a first exemplary embodiment of a PUCCH repeated transmission cancellation method.

Referring to FIG. 29, during transmission of the PUCCH 1, retransmission of the HARQ codebook 1 on the PUCCH 2 may be indicated to the terminal. The terminal may receive DCI, and the terminal may expect not to transmit the PUCCH 1 after a processing time for the DCI elapses.

3.3.3 Method of Multiplexing Retransmitted PUCCHs (or HARQ Codebooks)

When a plurality of PUCCHs overlap in the same symbol, all or part of UCIs for the plurality of PUCCHs may be multiplexed, and the multiplexed UCIs may be transmitted on a PUCCH. When HARQ codebook retransmission is indicated, a retransmission procedure of all or some of HARQ codebooks may be required. A field of DCI may indicate retransmission of the HARQ codebook(s) on a PUCCH in a specific slot. A case where slots in which PUCCHs are transmitted are the same and the DCIs indicating retransmission are limited to the maximum number or a case where the slots in which the PUCCHs are transmitted are the same and two or more DCIs indicating retransmission are received may occur.

Method 3.3-31: In the transmission procedure of PUCCH, the maximum number of retransmission HARQ codebooks may be limited to K.

In an example, K may be 1. In another example, the base station may indicate or configure a value of K, configured by consideration of the terminal capability to the terminal using RRC signaling.

Method 3.3-32: In Method 3.3-31, the terminal may assume that DCIs are not received so that K>1.

Method 3.3-33: In Method 3.3-31, when DCIs are received so that K>1, the terminal may select one DCI from among the DCIs, and may assume that only one HARQ codebook is retransmitted based on the selected DCI.

The selected DCI may be a DCI received first or a DCI last received in the terminal, and retransmission of the HARQ codebook may be performed based on the selected DCI.

Method 3.3-34: In Method 3.3-31, all DCIs indicating retransmission may indicate retransmission of the same HARQ codebook.

A (sub)slot offset for the retransmission HARQ codebook may be indicated as 1, and a (sub)slot associated with the retransmission HARQ codebook may be calculated from a slot n in which the DCI is received. The retransmission HARQ codebook may be determined as the HARQ codebook intended to be transmitted in a (sub)slot (m=n−1). The terminal may retransmit the HARQ codebook in a (sub)slot (n+k). The (sub)slot offset k may be derived from a HARQ-ACK feedback timing field indicated by the DCI. According to Method 3.3-34, in order to indicate the same HARQ codebook, it may be assumed that the (sub)slot m indicated by all the DCIs received by the terminal are the same.

Method 3.3-35: When retransmission of two or more HARQ codebooks is allowed, the terminal may generate one HARQ codebook by concatenating two or more HARQ codebooks.

Considering a case where a DCI i is indicated to retransmit a HARQ codebook i, DCIs may be received by the terminal in the order of i. Here, i may be a natural number. In an example, the HARQ codebooks may be concatenated in the order of reception of the DCIs triggering retransmission. The HARQ codebook 1 may be arranged first, and the HARQ codebook 2 may be arranged after the HARQ codebook 1.

When the terminal transmits a PUCCH (or PUSCH) in the (sub)slot (n+k), the initial transmission HARQ codebook 0 and the retransmission HARQ codebook may be sequentially concatenated. Here, the retransmission HARQ codebook may be concatenated in the order of the HARQ codebook 1 and the HARQ codebook 2.

When two priority indexes are indicated to the terminal, the terminal may generate a HARQ codebook for each priority index, and then generate a HARQ-ACK bit stream for different priority indexes.

3.3.4 Exemplary Embodiments

A HARQ codebook A including initial HARQ-ACK bits, SPS HARQ-ACK bits, and retransmission HARQ-ACK bits may be considered. The initial HARQ-ACK bits may mean HARQ-ACK bits included in the initial transmission HARQ-ACK codebook. Here, a method of arranging the SPS HARQ-ACK bits will be described in detail in Sections 3.4 and 3.4.1. In an exemplary embodiment, it may be assumed that the terminal transmits a PUCCH (or PUSCH) including the HARQ codebook A in the (sub)slot n+k.

Considering that the terminal receives an indication of retransmission of the HARQ codebook A again, all or part of the HARQ codebook A may be retransmitted on a PUCCH (or PUSCH) in a (sub)slot y. The (sub)slot y may be located after the (sub)slot n+k in the time domain. All of the HARQ codebook A may be retransmitted, and a HARQ-ACK bitstream for the HARQ codebook A may be concatenated with another HARQ-ACK bitstream. Here, the HARQ-ACK bit stream may be the initial transmission HARQ codebook or the retransmission HARQ codebook transmitted in the (sub)slot y.

Method 3.3-36: The initial HARQ codebook, SPS HARQ codebook, and retransmission HARQ codebook constituting the HARQ codebook A may be (re)transmitted.

In another method, a part of the HARQ codebook A may be retransmitted. In an example, in a process of generating the initial transmission SPS HARQ codebook transmitted in the (sub)slot y, the SPS HARQ-ACK bits belonging to the HARQ codebook A may be included in the SPS HARQ codebook. Therefore, in order to prevent redundant transmission, the SPS HARQ codebook constituting the HARQ codebook A may not be retransmitted.

Method 3.3-37: The SPS HARQ codebook constituting the HARQ codebook A may not be retransmitted.

In another example, there may be no initial transmission SPS HARQ codebook in the (sub)slot y. In this case, it may be preferable that the SPS HARQ-ACK bits included in the HARQ codebook A are retransmitted. Therefore, whether to retransmit the SPS HARQ-ACK bits included in the HARQ codebook A may be determined according to the existence of the initial transmission SPS HARQ codebook in the (sub)slot y.

Method 3.3-38: When the initial transmission SPS HARQ codebook exists in the (sub)slot y, the SPS HARQ-ACK bits included in the HARQ codebook A may not be retransmitted. When the initial transmission SPS HARQ codebook does not exist in the (sub)slot y, the SPS HARQ-ACK bits included in the HARQ codebook A may be retransmitted.

When the SPS HARQ-ACK bits included in the HARQ codebook A are retransmitted, the HARQ codebook may be composed of the SPS HARQ-ACK bits included in the HARQ codebook A. According to another method, the SPS HARQ-ACK bits may not be included in the HARQ codebook A, and may be regarded as the initial transmission SPS HARQ codebook in the (sub)slot y. In this case, the retransmission SPS HARQ codebook may be arranged first, and a part of the HARQ codebook A composed of the remaining HARQ-ACK bits may be arranged after the retransmission SPS HARQ codebook. In order to prevent redundant transmission of the retransmission HARQ codebook among HARQ-ACK bits constituting the HARQ codebook A, the retransmission HARQ codebook may not be retransmitted. In this case, the HARQ codebook A may be composed of the initial HARQ codebook and/or the SPS HARQ-ACK bits.

Method 3.3-39: The retransmission HARQ-ACK bits constituting the HARQ codebook A may not be retransmitted.

When two or more priority indexes are considered, a HARQ-ACK bit stream for the same priority index may be configured. After the above-described operation, a concatenation operation of HARQ-ACK bit streams for different priority indexes may be performed.

3.4 Deferred PUCCH Transmission

For transmission of a HARQ-ACK for an SPS PDSCH, a time resource for transmission of an SPS PUCCH may be indicated to the terminal by an activating DCI and/or higher layer signaling. In a TDD system or a system operating in an unlicensed band, the PUCCH resource for HARQ-ACK transmission may not always be utilized. In the TDD system, since an SPS PUCCH may be transmitted in a UL symbol, the terminal may not transmit the PUCCH in a symbol (e.g., DL symbol, FL symbol, etc.) other than the UL symbol. In the unlicensed band, when the terminal does not secure a COT, when a COT is not shared with the terminal, or when a symbol belonging to an idle period exists, the terminal may not transmit the PUCCH.

In an exemplary embodiment, a HARQ-ACK for an SPS PDSCH and/or a HARQ-ACK for release DCI for releasing SPS may be referred to as an SPS HARQ-ACK. In the TDD system, a slot pattern may be indicated or configured to the terminal using RRC signaling and/or DCI. The slot pattern may have a specific periodicity, and the specific periodicity of the slot pattern may be indicated to the terminal. A pattern of DL, UL, and FL symbols may be indicated to the terminal. Some of the FL symbols indicated by RRC signaling may be changed or determined to be DL, UL, or FL symbols through specific DCI (e.g., DCI format 2_0).

The terminal may perform a DL signal/channel reception operation or a UL signal/channel transmission operation in semi-static FL symbols according to configuration or scheduling. The terminal may not perform a periodic reception operation or a periodic transmission operation in semi-static FL symbols. For example, a symbol in which an SPS PDSCH can be received may be a semi-static DL symbol. For example, a symbol in which a PUCCH including an SPS HARQ-ACK is transmitted may be limited to a semi-static UL symbol. Since UL signals/channels allocated by DCIs may be multiplexed, in transmissions involving DCI(s), UL signals/channels may be transmitted in semi-static FL symbols.

When frame based equipment (FBE) is supported in an unlicensed band, the terminal cannot transmit a UL signal/channel in an idle period. Here, the idle period may be derived based on specific DCI (e.g., DCI format 2_0). Alternatively, the terminal may implicitly derive the idle period. When a fixed frame period (FFP) is initiated by the terminal, the terminal cannot transmit in an idle period. When an FFP is initiated by the base station, the base station cannot transmit in an idle period.

If an SPS PUCCH is expected to be invalid, the base station may not transmit an SPS PDSCH. If an SPS PUCCH is expected to be invalid, the terminal may not transmit an SPS PUCCH (e.g., SPS HARQ-ACK). When the SPS PDSCH is not transmitted, the base station may transmit a DCI to schedule a PDSCH. The DCI may indicate a valid PUCCH. In order to perform the above-described operation in an unlicensed band, the base station may secure a COT. Alternatively, the base station may share the COT (e.g., the COT secured by the terminal or another base station). Otherwise, the base station cannot transmit a PDCCH outside the COT.

An HPN of an SPS PDSCH may be determined according to an equation defined in the technical specification. The HPN may be determined according to a time resource in which the SPS PDSCH is received. According to a configuration of the base station, an HPN offset may be indicated to the terminal by RRC signaling. In an SPS PDSCH transmission/reception procedure, SPS PDSCHs belonging to different SPS configurations may have the same HPN. Alternatively, different SPS PDSCHs belonging to the same SPS configuration may have the same HPN. The base station may appropriately configure the HPN offset to the terminal so that the HPNs do not collide. However, when HARQ-ACK transmission is deferred in the TDD system or an unlicensed band, different SPS PDSCHs may use the same HPN. In this case, for different SPS PDSCHs using the same HPN, the HARQ-ACK may be replaced with a HARQ-ACK for an SPS PDSCH received later in the time domain.

An HPN of a PDSCH scheduled by a DCI may be the same. In this case, according to the technical specification, the corresponding HPN may be utilized in the PDSCH scheduled by the DCI. Therefore, HPN collision of only SPS PDSCHs may be considered. When considering one HPN, the corresponding HPN may be utilized in two or more SPS PDSCHs. For example, the HPN may be utilized in both an SPS PDSCH candidate 1 belonging to the HARQ codebook 1 and an SPS PDSCH candidate 0 belonging to the HARQ codebook 0. If the SPS PDSCH candidate 0 is received later in the time domain, the HARQ-ACK corresponding to the HPN may be derived from the SPS PDSCH candidate 0. Therefore, the size of the HARQ codebooks may be maintained, and only an update operation for the HARQ-ACK may be performed.

According to another method, the terminal may not report the HARQ-ACK for the SPS PDSCH candidate 1 to the base station. This operation may be applied to a plurality of HARQ codebooks (e.g., HARQ codebook i). i may be a natural number. A deferred HARQ codebook may not include a HARQ-ACK for a specific HPN (e.g., HPN for a HARQ-ACK replaced with a new value because the HPN is shared between PDSCHs). Since the above-described HARQ-ACK for the HPN is not included in the HARQ codebook i, the size of the HARQ codebook i may be reduced.

Meanwhile, an arrangement order of HARQ codebooks generated in units of deferred HARQ codebooks may not be considered. A method in which the deferred HARQ codebooks are generated at a time may be considered. In the procedure of generating the deferred HARQ codebook, the terminal may arrange the deferred HARQ-ACK bits from one HARQ codebook. A method for the terminal to generate the SPS HARQ codebook will be described. In the SPS HARQ codebook, HARQ-ACKs (e.g., HARQ-ACK bits) may be arranged in the order of reception of the SPS PDSCHs, then in the order of the SPS configuration indexes, and then in the order of the serving cell indexes.

The base station may indicate or configure (sub)slot offsets applied to PDSCH-to-HARQ-feedback to the terminal using RRC signaling. For a (sub)slot in which the terminal intends to transmit a PUCCH, candidates in which a SPS PDSCH can be received may be derived. The aforementioned (sub)slots may be limited to Nc (sub)slots in a serving cell c. In the SPS HARQ codebook generation procedure, Nc may be increased by a deferred window. If the transmission is deferred once, the value of Nc may be doubled. That is, the value of Nc may be a value of the deferred Nc+a value of the non-deferred Nc. If the transmission is deferred twice, the value of Nc may increase by a factor of 3.

3.4.1 Method of Operating with PUCCH Retransmission

When an SPS HARQ codebook is deferred and transmitted in a target (sub)slot, the terminal may perform a PUCCH retransmission operation together. The base station may transmit a DCI to the terminal so that the terminal transmits a PUCCH (or PUSCH) in the target (sub)slot. In this case, the terminal may consider the initial HARQ codebook 0, the deferred HARQ codebook, and/or the retransmission HARQ codebook. The terminal may assume a combination of at least one of the initial HARQ codebook 0, the deferred HARQ codebook, or the retransmission HARQ codebook. Alternatively, the terminal may assume that the initial HARQ codebook 0, the deferred HARQ codebook, and/or the retransmission HARQ codebook are multiplexed in a predetermined order.

Method 3.4-1: The terminal may assume that operations (e.g., multiplexing operation and/or transmission operation) for the deferred HARQ codebook and the retransmission HARQ codebook are not performed at the same time.

Method 3.4-2: The deferred SPS HARQ codebook and the retransmission HARQ codebook may be arranged in a time order (or reverse time order) that the terminal initially intends to perform transmissions, and the deferred SPS HARQ codebook and the retransmission HARQ codebook may be concatenated with the HARQ codebook 0.

When generating an information word based on a HARQ-ACK bit stream, the concatenation may mean that the HARQ codebook 0 is arranged first, and then the deferred SPS HARQ codebook and/or retransmission HARQ codebook is arranged, or that the deferred SPS HARQ codebook and/or retransmission HARQ codebook is arranged first, and then the HARQ codebook 0 is arranged. The HARQ codebook 0 (e.g., initial HARQ codebook 0) may be arranged first, then the SPS HARQ codebook may be arranged, and then the retransmission HARQ codebook(s) may be arranged. That is, in the HARQ-ACK bit stream, the ACK bits may be arranged in the order of 'initial HARQ-ACK bit(s)→SPS HARQ-ACK bit(s)→retransmission HARQ-ACK bit(s)'. Alternatively, in the HARQ-ACK bit stream, the ACK bits may be arranged in the order of 'initial HARQ-ACK bit(s)→retransmission HARQ-ACK bit(s) →SPS HARQ-ACK bit(s)'. The number of retransmission HARQ codebooks may be limited to one. Two or more HARQ codebooks may be arranged in a predetermined order.

When two or more priority indexes are considered, the terminal may generate a HARQ-ACK bit stream for the same priority index. Thereafter, the terminal may perform a concatenation operation of HARQ-ACK bit streams for different priority indexes.

3.4.2 Simultaneous Support of Sidelink HARQ and Uu UCI

The terminal may not transmit a PUCCH and/or PUSCH in which a sidelink HARQ-ACK (e.g., sidelink HARQ-ACK codebook) and Uu UCI are multiplexed. The reason is that it is difficult to determine the size of a type 2 HARQ codebook or a type 1 HARQ codebook when the sidelink HARQ-ACK and a HARQ-ACK for the PDSCH are multiplexed.

For example, the size of the type 1 HARQ codebook may be determined regardless of the number of scheduling DCIs, but the amount of sidelink HARQ-ACK may depend on the scheduling DCI. A field for counting the number of scheduling DCIs may be introduced to determine the size of the type 2 HARQ codebook, but a field for counting the number of sidelink HARQ-ACKs and a field for counting the number of HARQ-ACKs for PDSCHs may be separately needed. In this case, the size of the scheduling DCI may increase. Since a field of DCI is configured by RRC signaling, the additional field may be continuously included in the DCI even when a sidelink or PDSCH is not frequently allocated. This may reduce the performance of DCI.

For a terminal supporting a deferred SPS HARQ-ACK, the base station may schedule so that the sidelink HARQ-ACK and the SPS HARQ-ACK are not multiplexed. Since a slot in which the SPS HARQ-ACK is transmitted is predictable by the base station, the base station may schedule so that the sidelink HARQ-ACK is not transmitted in the corresponding slot. A slot in which the deferred SPS HARQ-ACK is transmitted may depend on a slot pattern in the TDD system. Since the slot in which the deferred SPS HARQ-ACK is transmitted does not depend on DCI, the base station may predict the slot in which the deferred SPS HARQ-ACK is transmitted in advance.

That UCIs having different priorities are not multiplexed may be configured to the terminal by RRC signaling. Considering this case, since the terminal multiplexes one of the sidelink HARQ-ACK and Uu UCI using their priority indexes, multiplexing of the deferred SPS HARQ-ACK and the sidelink HARQ-ACK may not occur. The base station may accurately predict the priority index of the sidelink HARQ-ACK. The base station may transmit a scheduling DCI (DCI format 3_0) that does not include a priority index. The terminal may determine the priority of the sidelink using a channel busy ratio (CBR) and/or a channel occupancy ratio (CR). A priority of an SL-SCH, inter-UE coordination (IUC) message and/or SL-CSI may be appropriately derived. If the priority of the sidelink HARQ-ACK and the priority of the Uu UCI are the same, the sidelink HARQ-ACK and the Uu UCI may be multiplexed. According to the above method, it may be preferable that a case where the priority of the sidelink HARQ-ACK and the priority of the Uu UCI are the same does not occur.

Method 3.4-3: The base station may indicate to the terminal that the terminal does not multiplex UCIs having different priorities by using RRC signaling. In this case, the terminal may determine (e.g., assume) that the Uu UCI and the sidelink HARQ-ACK have different priorities.

When a Uu UCI type having a priority index 1 and a Uu UCI type having a priority index 0 are derived, a Uu UCI type having the same priority index as the sidelink HARQ-ACK may exist. Therefore, the base station may not perform the above-described scheduling. The base station may indicate or configure the terminal to multiplex UCIs having different priorities using RRC signaling. Considering this case, it may be preferable that the sidelink HARQ-ACK and Uu UCI having different priorities do not occur.

Based on assumption that scheduling of the base station is error-free, the terminal may be implemented. The terminal may determine that multiplexing of the sidelink HARQ-ACK and Uu UCI does not occur. When multiplexing of the sidelink HARQ-ACK and Uu UCI occurs, the terminal may consider that an error has occurred. For example, the terminal may drop PUCCH transmission or PUSCH transmission. That is, the terminal may drop transmission of the sidelink HARQ-ACK and/or Uu UCI.

Method 3.4-4: The base station may indicate to the terminal to multiplex UCIs having different priorities using RRC signaling. In this case, if it is determined that the Uu UCI and the sidelink HARQ-ACK have different priorities, multiplexing of the sidelink HARQ-ACK and the Uu UCI may not be allowed.

3.5 Method of Generating a HARQ Codebook Considering Priority

3.5.1 Type 1 HARQ Codebook

The base station may indicate or configure generation of a type 1 HARQ codebook to the terminal by using RRC signaling. In this case, considering the priority indexes, UCI 1 and UCI 0 may be multiplexed in the type 1 HARQ codebook. Alternatively, the terminal may select only the UCI 1 and may generate the type 1 HARQ codebook including the UCI 1. In a PUSCH transmission procedure, a T-DAI field of UL-DCI may indicate to the terminal the multiplexing of the HARQ codebook(s).

Method 3.5-1: When transmission of the type 1 HARQ codebook is configured to the terminal, the size of the T-DAI included in the UL-DCI may be extended to 2 bits. One bit among 2 bits of the T-DAI may indicate whether the HARQ codebook is multiplexed.

Method 3.5-2: One bit of the T-DAI may indicate multiplexing of the HARQ codebook having the same priority index as the UL-DCI, and the remaining bits of the T-DAI may indicate multiplexing of the HARQ codebook having a priority index different from that of the UL-DCI.

Method 3.5-3: One bit of the T-DAI may indicate multiplexing of a HARQ codebook for URLLC, and the remaining bits of the T-DAI may indicate multiplexing of a HARQ codebook for eMBB.

Here, the order of bits constituting the T-DAI field may be defined in the technical specification. For example, in the UL-DCI, two or more T-DAI fields may be arranged as being concatenated with each other. As another example, in the UL-DCI, the T-DAI fields may be arranged without concatenation, and information related to the same priority may be collectively arranged in the UL-DCI.

The UL-DCI may include a separate field indicating multiplexing of UCI 1 and UCI 0. For example, a first value of the specific field included in the UL-DCI may indicate multiplexing of UCI 1 and UCI 0, and a second value of the specific field may indicate multiplexing of UCI 1 or UCI 0. As another example, a first value of a code point indicated by a field included in the UL-DCI may indicate multiplexing of UCI 1 and UCI 0, and a second value of the corresponding code point may indicate multiplexing of UCI 1 or UCI 0.

The terminal may derive a resource in which UCI 1, UCI 0, and/or TB are multiplexed with reference to both the DL-DCI and UL-DCI, and may transmit a PUSCH including UCI 1, UCI 0, and/or TB. In this case, the terminal may assume that the indication of the DL-DCI and the indication of the UL-DCI are not different from each other. The above-described operation may be applied regardless of the type of codebook configured to the terminal.

Method 3.5-4: Multiplexing indication in the DL-DCI (e.g., indication of multiplexing of UCI 1 and UCI 0) and multiplexing indication in the UL-DCI (e.g., indication of multiplexing of UCI 1 and UCI 0) may be the same.

Considering a reception time of the UL-DCI in the terminal, even when the DL-DCI indicates multiplexing of all UCIs, the terminal may select some UCIs from among all the UCIs and may transmit the selected some UCIs. If the DL-DCI indicates selection of some UCIs, the terminal may not expect the UL-DCI to indicate multiplexing of all the UCIs.

Method 3.5-5: If the DL-DCI indicates selection of some UCI (e.g., UCI 1), the terminal may not expect that the UL DCI indicates multiplexing of UCIs (e.g., UCI 1 and UCI 0) more than the UCIs indicated by the DL-DCI.

3.5.2 Type 2 HARQ Codebook

The base station may indicate or configure the terminal to generate a type 2 HARQ codebook by using RRC signaling. In this case, a DL-DCI and/or UL-DCI may include a C-DAI and T-DAI. In this case, a method of arranging the C-DAI and T-DAI in the DCI may be considered. In an exemplary embodiment, UCI 1 may be described as corresponding to a C-DAI1 and T-DAI1, and UCI 0 may be described as corresponding to a C-DAI0 and T-DAI0.

Method 3.5-6: The size of each of the C-DAI field and the T-DAI field may be doubled. For example, the C-DAI field may be configured as [C-DAI0, C-DAI1] or [C-DAI1, C-DAI0], and the T-DAI field may be configured as [T-DAI0, T-DAH] or [T-DAH, T-DAI0].

Method 3.5-7: When the priorities of the C-DAI field and the T-DAI field are the same, a concatenation operation for the C-DAI field and the T-DAI field may be performed. For example, [C-DAI0, T-DAI0] or [T-DAI0, C-DAI0] may be configured in the DCI, and [C-DAI1, T-DAI1] or [T-DAI1, C-DAI1] may be configured in the DCI. A separate field may exist between the C-DAI field and the T-DAI field.

3.5.3 PUCCH Format 2 Transmission Method Considering Priority

One codeword may be modulated, and a modulation result (e.g., modulation symbols) may be mapped to a PUCCH format 2. The UCI type may be SR, LRR, HARQ-ACK, and/or CSI. The UCI type may be regarded as an information word. The terminal may generate one codeword by performing the same encoding operation on the UCI type(s). The priority indexes of the UCI types may be the same.

A case in which eMBB UCI and URLLC UCI (e.g., LP UCI and HP UCI) are multiplexed and mapped in one PUCCH resource may be considered. A codeword other than an information word may be separately generated, and the codeword may be mapped to a PUCCH resource. The PUCCH format 2 may be distinguished from other PUCCH formats (e.g., PUCCH formats 3 and/or 4).

When the PUCCH format 3 or 4 is used, a PUCCH DM-RS may use all subcarriers of an OFDM symbol. The OFDM symbol to which the codeword of UCI is mapped may be distinguished based on a distance from the DM-RS symbol. The DM-RS symbol may mean a symbol to which the PUCCH DM-RS is mapped. A codeword of UCI having a high importance may be mapped to a symbol close to the DM-RS symbol, and a codeword of a UCI having a low importance may be mapped to a symbol far from the DM-RS symbol.

Figure 30:
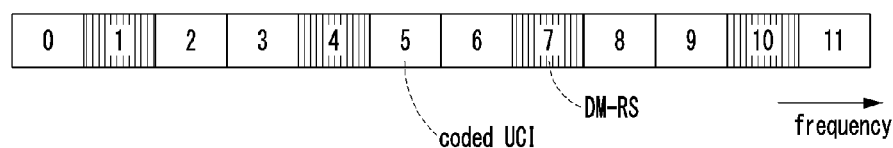
FIG. 30 is a conceptual diagram illustrating a first exemplary embodiment of PRBs belonging to a PUCCH format 2.

FIG. 30 is a conceptual diagram illustrating a first exemplary embodiment of PRBs belonging to a PUCCH format 2.

Referring to FIG. 30, a DM-RS of the PUCCH format 2 may use some subcarriers in an OFDM symbol. The DM-RS may be mapped to subcarriers 1, 4, 7, and 10 in a PRB belonging to the PUCCH. All PRBs belonging to the PUCCH format 2 may have the same subcarrier indexes. The encoded UCI may be adjacent to the DM-RS. That is, the codeword of UCI may maintain the same distance with the DM-RS. It may not be necessary to map the codeword of UCI differently based on the distance from the DM-RS.

When the codeword of UCI is mapped to some subcarriers in one OFDM symbol, in order to obtain a frequency multiplexing gain, it may be preferable to map the UCI codeword in a wide band. Accordingly, an interval between subcarriers to which the UCI codeword is mapped may be the same. The UCI codeword may be preferably mapped to all PRBs corresponding to the PUCCH resource. In order to support the above-described operation, a PUCCH having a sufficiently large bandwidth may be indicated. Alternatively, frequency gain may be achieved by frequency hopping. In this case, the PUCCH resource may have two symbols.

When the PUCCH resource consists of two OFDM symbols, encoded HP UCI may be mapped first, and then encoded LP UCI may be mapped. When the amount of HP UCI is small, the HP UCI may be limited to one OFDM symbol and may be mapped. In this case, the frequency multiplexing gain may not be obtained. To solve this problem, a method for mapping the HP UCI to both OFDM symbols may be needed.

Method 3.5-8: The encoded HP UCI may be divided into first encoded HP UCI and second encoded HP UCI, each of the first encoded HP UCI and the second encoded HP UCI may be mapped to one OFDM symbol. Each of the first encoded HP UCI and the second encoded HP UCI may be mapped to subcarriers at the same interval in one OFDM symbol.

Figure 31:
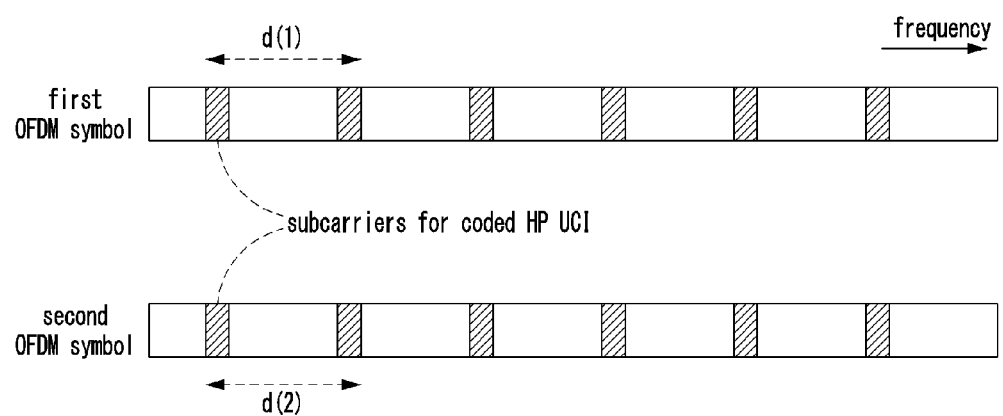
FIG. 31 is a conceptual diagram illustrating a first exemplary embodiment of a multiplexing method of HP UCI and LP UCI in a PUCCH format 2 having two OFDM symbols.

FIG. 31 is a conceptual diagram illustrating a first exemplary embodiment of a multiplexing method of HP UCI and LP UCI in a PUCCH format 2 having two OFDM symbols.

Referring to FIG. 31, the encoded HP UCI may be composed of $K_{HP}$ bits, the number of PRBs in the PUCCH may be N, and a modulation rate may be Q. When Quadrature Phase Shift Keying (QPSK) is used, Q may be 2. When n/2 Binary Phase Shift Keying (BPSK) is used, Q may be regarded as 1.

$G(1)=\lfloor K_{HP}/(2 \cdot Q) \rfloor$ may indicate the number of resource elements (REs) occupied by the HP UCI codeword in the first OFDM symbol. $G(2)=\lceil K_{HO}/(2 \cdot Q) \rceil$ may indicate the number of REs occupied by the HP UCI codeword in the second OFDM symbol. The number of REs occupied by the codeword of the LP UCI may be the number of remaining REs to which the codeword of the HP UCI is not mapped.

The interval between the subcarriers to which the UCI codeword is mapped in one OFDM symbol may be expressed as $d(1)=\lfloor ((12-4) \cdot N \cdot Q)/G(1) \rfloor$ or $d(1)=\lceil ((12-4) \cdot N \cdot Q)/G(1) \rceil$. (12-4) may mean the number of subcarriers remaining except for the four subcarriers to which the DM-RS is mapped among twelve subcarriers of the PRB. In addition, the interval between the subcarriers to which the UCI codeword is mapped in one OFDM symbol may be expressed as $d(2)=\lfloor ((12-4) \cdot N \cdot Q)/G(2) \rfloor$ or $d(2)=\lceil ((12-4) \cdot N \cdot (2)/G(2) \rceil$. The encoded HP UCI may be mapped to a position of the subcarriers and the OFDM symbol obtained by the above-described method. In this case, the RE mapping operation may be performed first in the frequency domain and then in the time domain.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, comprising:
receiving, from a base station, downlink control information (DCI) including a first field indicating hybrid automatic repeat request-acknowledgement (HARQ-ACK) retransmission and a second field indicating a priority;
identifying first HARQ-ACK information having a priority identical to the priority indicated by the second field; and
transmitting, to the base station, a first HARQ-ACK codebook including the first HARQ-ACK information based on the indication of the first field,
wherein, based on a first reference signal (RS) group for a physical uplink control channel (PUCCH) being identical to a second RS group for a physical uplink shared channel (PUSCH), the first HARQ-ACK codebook is transmitted in the PUSCH, or
based on the first RS group for the PUCCH being different from the second RS group for the PUSCH, the first HARQ-ACK codebook is transmitted in the PUCCH, and
wherein the first RS group corresponds to a first beam of the terminal and the second RS group corresponds to a second beam of the terminal.

2. The method according to claim 1, further comprising identifying second HARQ-ACK information having a priority identical to the priority indicated by the second field, wherein a second HARQ-ACK codebook including the second HARQ-ACK information is transmitted to the base station together with the first HARQ-ACK codebook.

3. The method according to claim 2, wherein the first HARQ-ACK codebook is a retransmission HARQ-ACK codebook, the second HARQ-ACK codebook is an initial transmission codebook, and the second HARQ-ACK codebook is arranged before the first HARQ-ACK codebook within a HARQ-ACK bitstream.

4. The method according to claim 1, further comprising:
identifying second HARQ-ACK information having a priority identical to the priority indicated by the second field; and
identifying third HARQ-ACK information having a priority identical to the priority indicated by the second field,
wherein a second HARQ-ACK codebook including the second HARQ-ACK information and a third HARQ-ACK codebook including the third HARQ-ACK information are transmitted to the base station together with the first HARQ-ACK codebook.

5. The method according to claim 4, wherein the first HARQ-ACK codebook is a retransmission HARQ-ACK codebook, the second HARQ-ACK codebook is an initial transmission codebook, the third HARQ-ACK codebook is a deferred semi-persistent scheduling (SPS) HARQ-ACK codebook, the second HARQ-ACK codebook is arranged first within a HARQ-ACK bit stream, the third HARQ-ACK codebook is arranged after the second HARQ-ACK codebook within the HARQ-ACK bitstream, and the first HARQ-ACK codebook is arranged after the third HARQ-ACK codebook within the HARQ-ACK bitstream.

6. The method according to claim 1, wherein a cell in which the first HARQ-ACK codebook is transmitted is determined based on a format of the DCI.

7. The method according to claim 1, wherein when the DCI is fallback DCI, the first HARQ-ACK codebook is transmitted in a PCell.

8. The method according to claim 1, further comprising receiving, from the base station, configuration information of a PUCCH serving cell, wherein when the DCI is non-fallback DCI, the first HARQ-ACK codebook is transmitted in the PUCCH serving cell according to the configuration information.

9. The method according to claim 1, further comprising receiving, from the base station, configuration information of a PUCCH serving cell, wherein when the DCI is non-fallback DCI and the DCI includes a third field indicating a cell in which PUCCH transmission is performed, the first HARQ-ACK codebook is transmitted in a PCell or the PUCCH serving cell based on a value of the third field.

10. The method according to claim 1, wherein the DCI is non-scheduling DCI.

11. A method of a base station, comprising:
generating downlink control information (DCI) including a first field indicating whether to perform hybrid automatic repeat request-acknowledgement (HARQ-ACK) retransmission and a second field indicating a priority;
transmitting the DCI to a terminal; and
in response to the first field indicating the HARQ-ACK retransmission, receiving, from the terminal, a first HARQ-ACK codebook including first HARQ-ACK information having a priority identical to the priority indicated by the second field,
wherein, based on a first reference signal (RS) group for a physical uplink control channel (PUCCH) being identical to a second RS group for a physical uplink shared channel (PUSCH), the first HARQ-ACK codebook is received in the PUSCH, or
based on the first RS group for the PUCCH being different from the second RS group for the PUSCH, the first HARQ-ACK codebook is received in the PUCCH, and
wherein the first RS group corresponds to a first beam of the terminal and the second RS group corresponds to a second beam of the terminal.

12. The method according to claim 11, wherein a second HARQ-ACK codebook including second HARQ-ACK information having a priority identical to the priority indicated by the second field is received from the terminal together with the first HARQ-ACK codebook, the first HARQ-ACK codebook is a retransmission HARQ-ACK codebook, the second HARQ-ACK codebook is an initial transmission codebook, and the second HARQ-ACK codebook is arranged before the first HARQ-ACK codebook within a HARQ-ACK bitstream.

13. The method according to claim 11, wherein a second HARQ-ACK codebook including second HARQ-ACK information having a priority identical to the priority indicated by the second field and a third HARQ-ACK codebook including third HARQ-ACK information having a priority identical to the priority indicated by the second field are received from the terminal together with the first HARQ-ACK codebook, the first HARQ-ACK codebook is a retransmission HARQ-ACK codebook, the second HARQ-ACK codebook is an initial transmission codebook, the third HARQ-ACK codebook is a deferred semi-persistent scheduling (SPS) HARQ-ACK codebook, the second HARQ-ACK codebook is arranged first within a HARQ-ACK bit stream, the third HARQ-ACK codebook is arranged after the second HARQ-ACK codebook within the HARQ-ACK bitstream, and the first HARQ-ACK codebook is arranged after the third HARQ-ACK codebook within the HARQ-ACK bitstream.

14. The method according to claim 11, wherein a cell in which the first HARQ-ACK codebook is received is determined based on a format of the DCI, the first HARQ-ACK codebook is received in a PCell when the DCI is fallback DCI, or the first HARQ-ACK codebook is received in the PCell or a PUCCH serving cell when the DCI is non-fallback DCI.

15. The method according to claim 11, further comprising transmitting configuration information of a PUCCH serving cell to the terminal, wherein the first HARQ-ACK codebook is received in the PUCCH serving cell.

16. A terminal comprising:
a processor;
a memory electronically communicating with the processor; and
instructions stored in the memory,
wherein when executed by the processor, the instructions cause the terminal to:
receive, from a base station, downlink control information (DCI) including a first field indicating hybrid automatic repeat request-acknowledgement (HARQ-ACK) retransmission and a second field indicating a priority;
identify first HARQ-ACK information having a priority identical to the priority indicated by the second field; and
transmit, to the base station, a first HARQ-ACK codebook including the first HARQ-ACK information based on the indication of the first field,
wherein, based on a first reference signal (RS) group for a physical uplink control channel (PUCCH) being identical to a second RS group for a physical uplink shared channel (PUSCH), the first HARQ-ACK codebook is transmitted in the PUSCH, or
based on the first RS group for the PUCCH being different from the second RS group for the PUSCH, the first HARQ-ACK codebook is transmitted in the PUCCH, and
wherein the first RS group corresponds to a first beam of the terminal and the second RS group corresponds to a second beam of the terminal.

17. The terminal according to claim 16, wherein the instructions further cause the terminal to identify second HARQ-ACK information having a priority identical to the priority indicated by the second field, wherein a second HARQ-ACK codebook including the second HARQ-ACK information is transmitted to the base station together with the first HARQ-ACK codebook, the first HARQ-ACK codebook is a retransmission HARQ-ACK codebook, the second HARQ-ACK codebook is an initial transmission codebook, and the second HARQ-ACK codebook is arranged before the first HARQ-ACK codebook within a HARQ-ACK bitstream.

18. The terminal according to claim 16, wherein the instructions further cause the terminal to:
identify second HARQ-ACK information having a priority identical to the priority indicated by the second field; and
identify third HARQ-ACK information having a priority identical to the priority indicated by the second field, wherein a second HARQ-ACK codebook including the second HARQ-ACK information and a third HARQ-ACK codebook including the third HARQ-ACK information are transmitted to the base station together with the first HARQ-ACK codebook, the first HARQ-ACK codebook is a retransmission HARQ-ACK codebook, the second HARQ-ACK codebook is an initial transmission codebook, the third HARQ-ACK codebook is a deferred semi-persistent scheduling (SPS) HARQ-ACK codebook, the second HARQ-ACK codebook is arranged first within a HARQ-ACK bit stream, the third HARQ-ACK codebook is arranged after the second HARQ-ACK codebook within the HARQ-ACK bitstream, and the first HARQ-ACK codebook is arranged after the third HARQ-ACK codebook within the HARQ-ACK bitstream.

19. The terminal according to claim 16, wherein a cell in which the first HARQ-ACK codebook is transmitted is determined based on a format of the DCI, the first HARQ-ACK codebook is transmitted in a PCell when the DCI is fallback DCI, or the first HARQ-ACK codebook is transmitted in the PCell or a PUCCH serving cell when the DCI is non-fallback DCI.

20. The terminal according to claim 16, wherein the instructions further cause the terminal to receive, from the base station, configuration information of a PUCCH serving cell, wherein the first HARQ-ACK codebook is transmitted in the PUCCH serving cell.

* * * * *